United States Patent
Sapienza et al.

(10) Patent No.: US 11,558,551 B2
(45) Date of Patent: Jan. 17, 2023

(54) SEMANTIC MAPPING FOR LOW-POWER AUGMENTED REALITY USING DYNAMIC VISION SENSOR

(71) Applicant: Samsung Electronics Co., Ltd., Suwon-si (KR)

(72) Inventors: Michael Sapienza, Mountain View, CA (US); Ankur Gupta, Santa Clara, CA (US); Abhijit Bendale, Sunnyvale, CA (US); Fannie Fontanel, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 17/012,005

(22) Filed: Sep. 3, 2020

(65) Prior Publication Data

US 2020/0404177 A1 Dec. 24, 2020

Related U.S. Application Data

(62) Division of application No. 16/415,860, filed on May 17, 2019, now Pat. No. 10,812,711.
(Continued)

(51) Int. Cl.
*G06T 7/11* (2017.01)
*G06T 15/00* (2011.01)
(Continued)

(52) U.S. Cl.
CPC ....... *H04N 5/23241* (2013.01); *G02B 27/017* (2013.01); *G06K 9/628* (2013.01);
(Continued)

(58) Field of Classification Search
CPC .. H04N 5/23241; H04N 5/2327; H04N 5/343; H04N 5/357; H04N 5/374;
(Continued)

(56) References Cited

U.S. PATENT DOCUMENTS 9,001,220 B2    4/2015  Kim et al.
2015/0070387 A1*  3/2015  Schmalstieg .......... H04N 13/00
                                                      345/633
(Continued)

OTHER PUBLICATIONS

Supplementary European Search Report dated May 20, 2021, in connection with European Patent Application No. 19804289.7, 6 pages.
(Continued)

*Primary Examiner* — King Y Poon
*Assistant Examiner* — Vincent Peren

(57) ABSTRACT

A system and method for a master platform includes receiving first pose data associated with an image sensor of a first device, and a first semantic map generated by the first device, the first semantic map including a simplified object representation in a coordinate space of the first device. The master platform also receives second pose data associated with an image sensor of a second device, and a second semantic map generated by the second device, the second semantic map including a simplified object representation in a coordinate space of the second device. A shared simplified object representation common to the first and semantic maps is identified. The master platform further combines the first semantic and second semantic maps based on the first and second pose data. The first pose data, first semantic map, second pose data, and second semantic map are associated with a common time interval.

20 Claims, 38 Drawing Sheets

Related U.S. Application Data

(60) Provisional application No. 62/698,740, filed on Jul. 16, 2018, provisional application No. 62/678,071, filed on May 30, 2018, provisional application No. 62/673,402, filed on May 18, 2018, provisional application No. 62/673,771, filed on May 18, 2018.

(51) Int. Cl.
| | |
|---|---|
| *G06T 15/10* | (2011.01) |
| *G06T 19/00* | (2011.01) |
| *H04N 5/232* | (2006.01) |
| *H04N 5/343* | (2011.01) |
| *G02B 27/01* | (2006.01) |
| *H04N 5/357* | (2011.01) |
| *H04N 5/374* | (2011.01) |
| *G06K 9/62* | (2022.01) |

(52) U.S. Cl.
CPC .............. *G06T 7/11* (2017.01); *G06T 15/005* (2013.01); *G06T 15/10* (2013.01); *G06T 19/006* (2013.01); *H04N 5/2327* (2013.01); *H04N 5/343* (2013.01); *H04N 5/357* (2013.01); *H04N 5/374* (2013.01); *H04N 5/3741* (2013.01); *G06T 2207/10028* (2013.01); *G06T 2207/20084* (2013.01); *G06T 2210/12* (2013.01)

(58) Field of Classification Search
CPC ....... H04N 5/3741; G06T 7/11; G06T 15/005; G06T 15/10; G06T 19/006; G06T 2207/1002; G06T 2207/2008; G06T 2207/12; G02B 27/017; G06K 9/628
See application file for complete search history.

(56) References Cited

U.S. PATENT DOCUMENTS

| | | | |
|---|---|---|---|
| 2015/0193971 A1* | 7/2015 | Dryanovski | ............ G06T 17/05 345/419 |
| 2017/0084044 A1 | 3/2017 | Keh et al. | |
| 2018/0174323 A1 | 6/2018 | Ji et al. | |

OTHER PUBLICATIONS

Jeong, et al., "Multimodal Sensor-Based Semantic 3D Mapping for a Large-Scale Environment", ARXIV.org, Cornell University Library, 201 Olin Library Cornell University Ithaca, NY, Feb. 28, 2018, 10 pages.

* cited by examiner

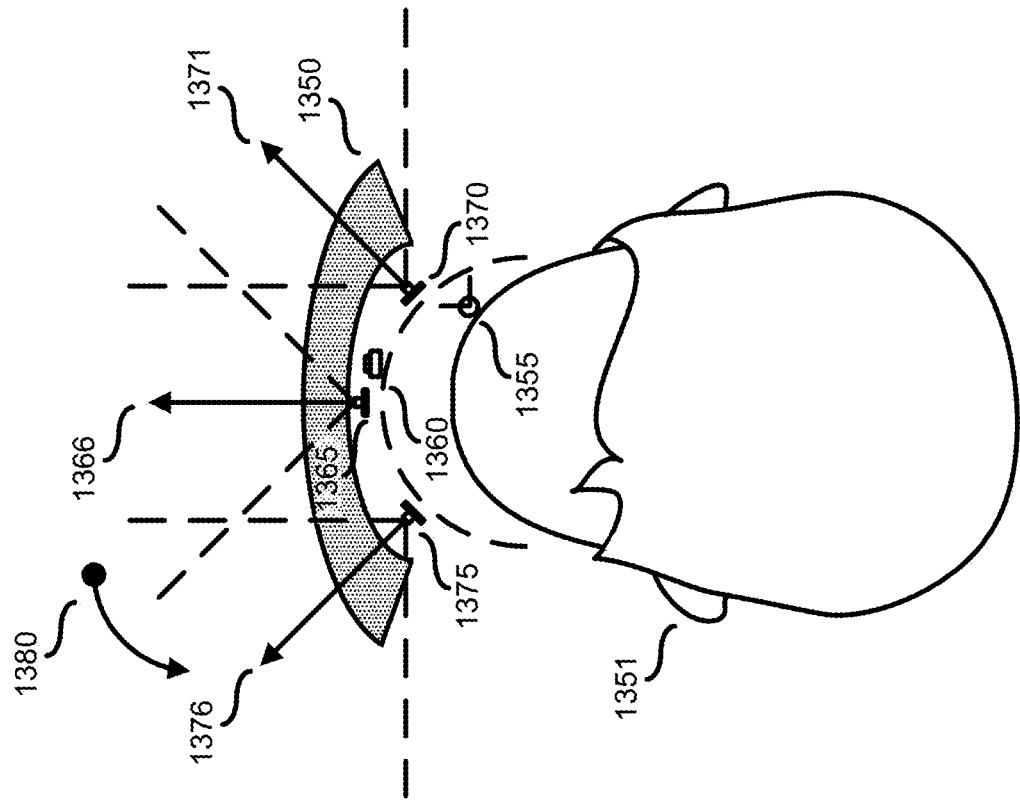
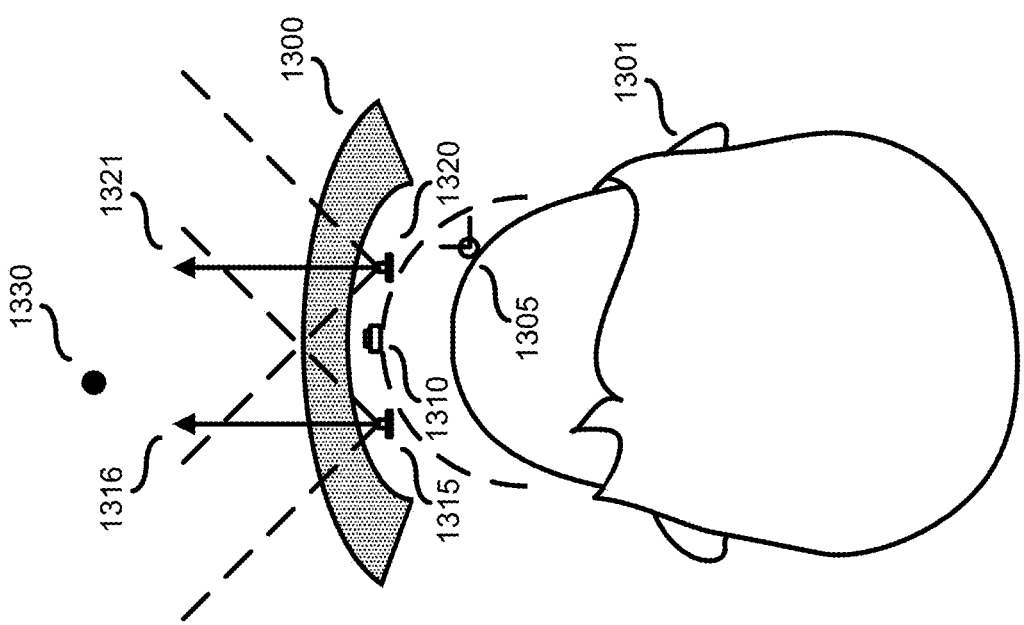
FIG. 13A

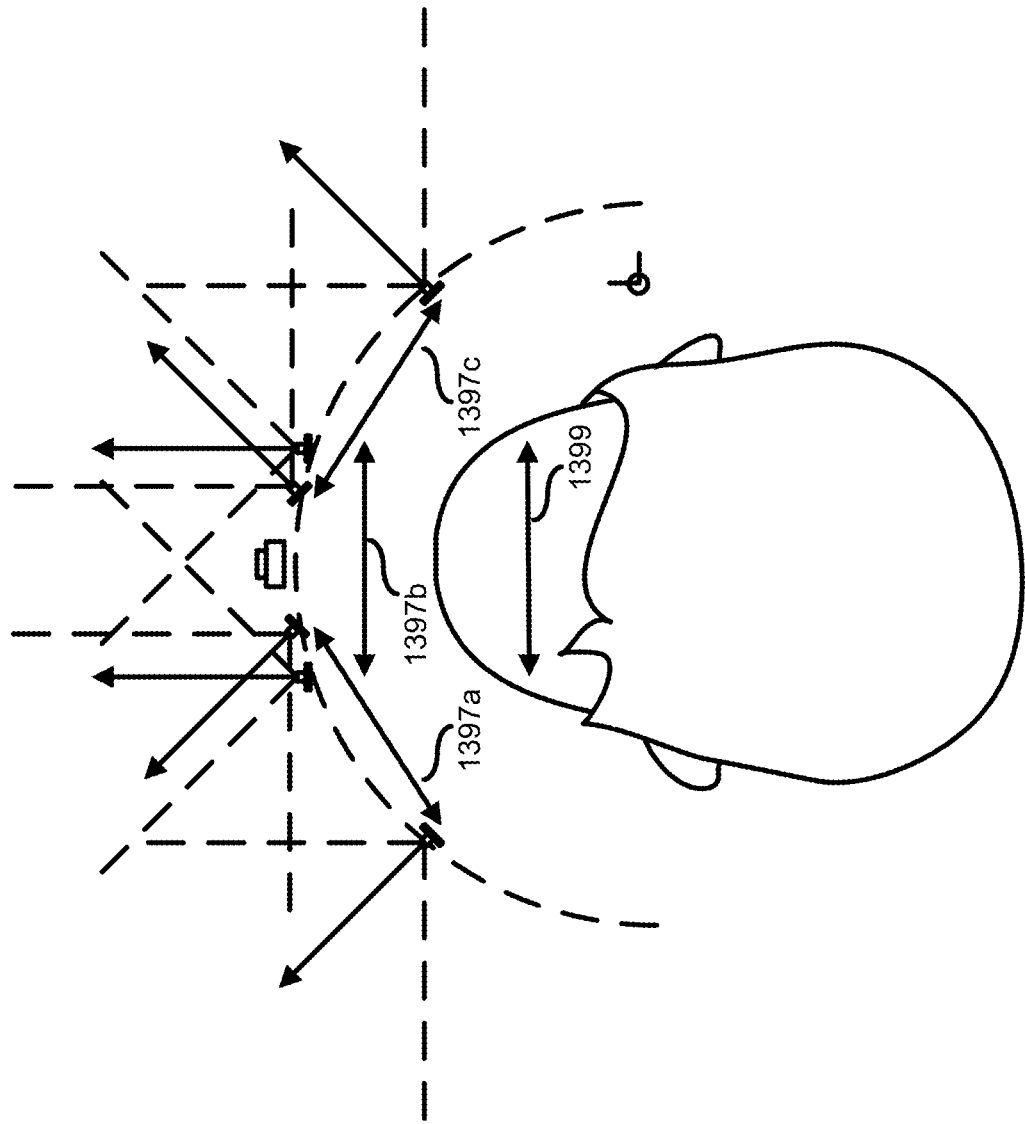

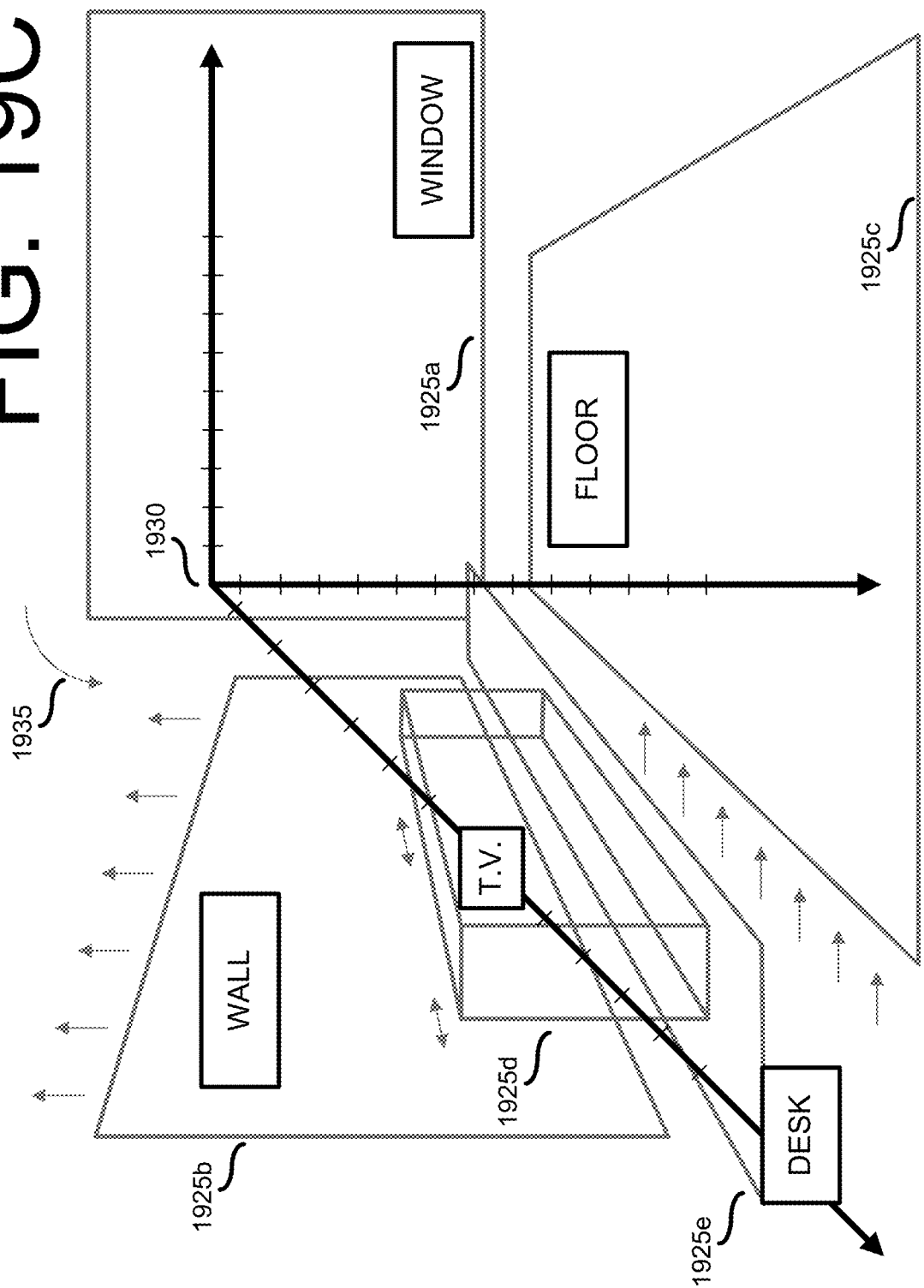

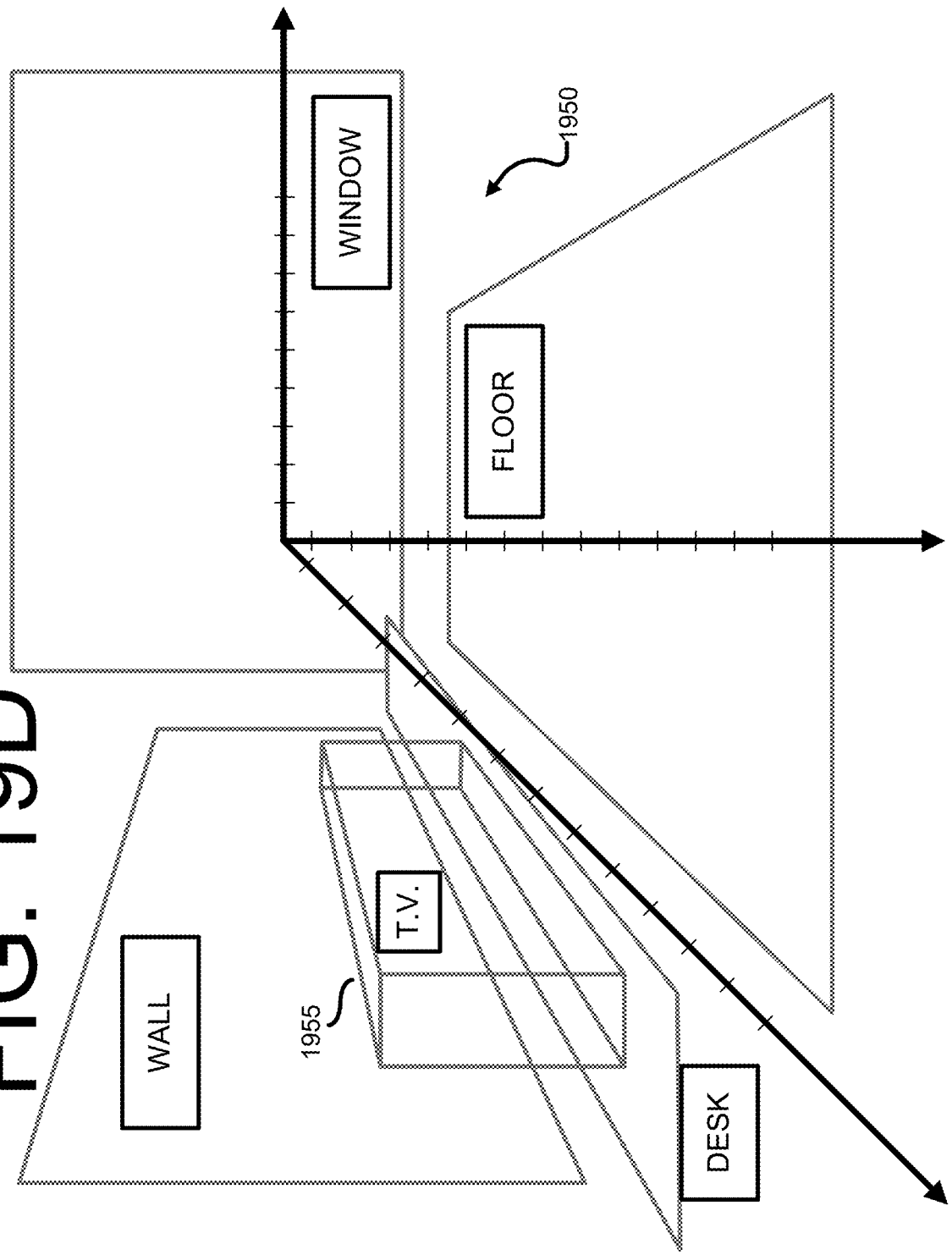

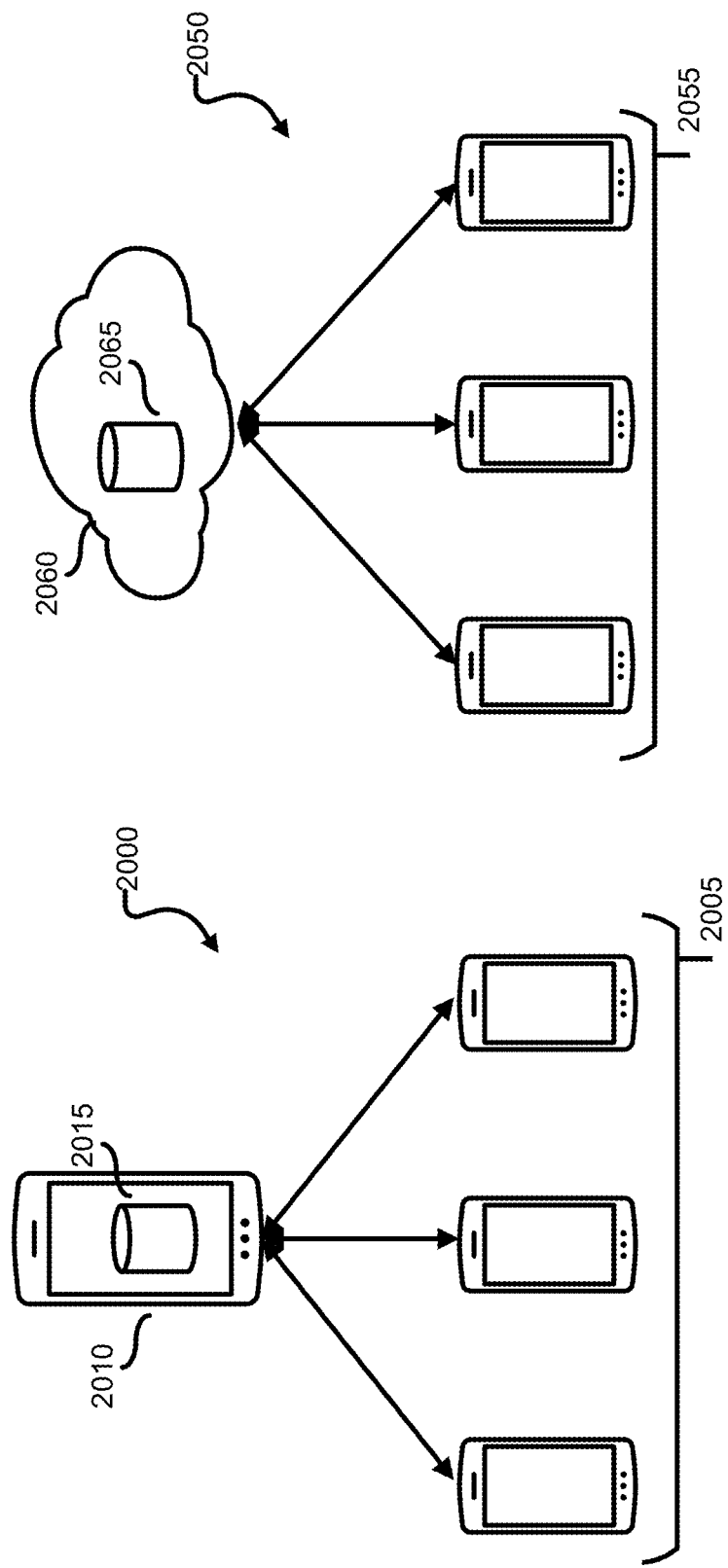

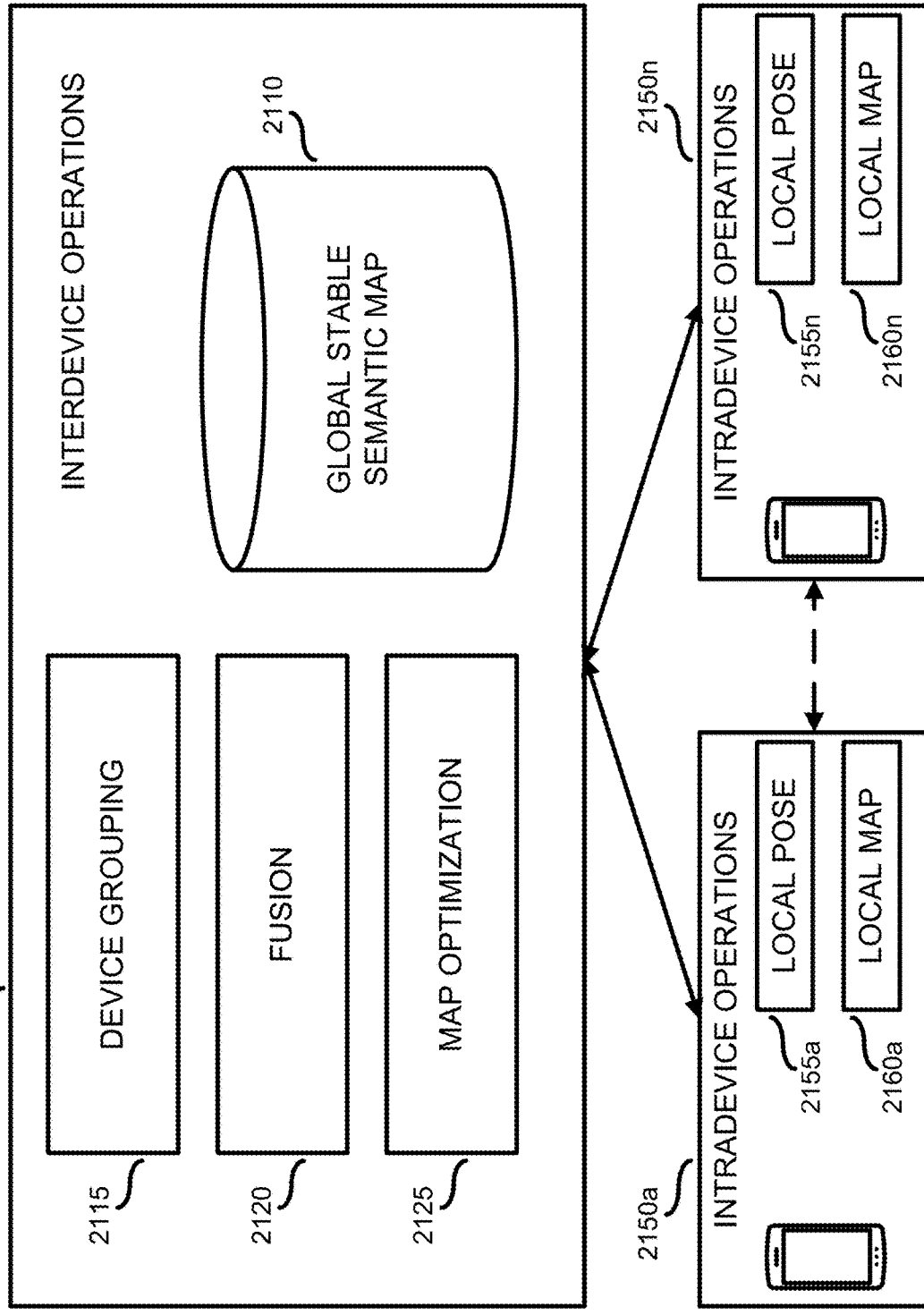

FIG. 23A
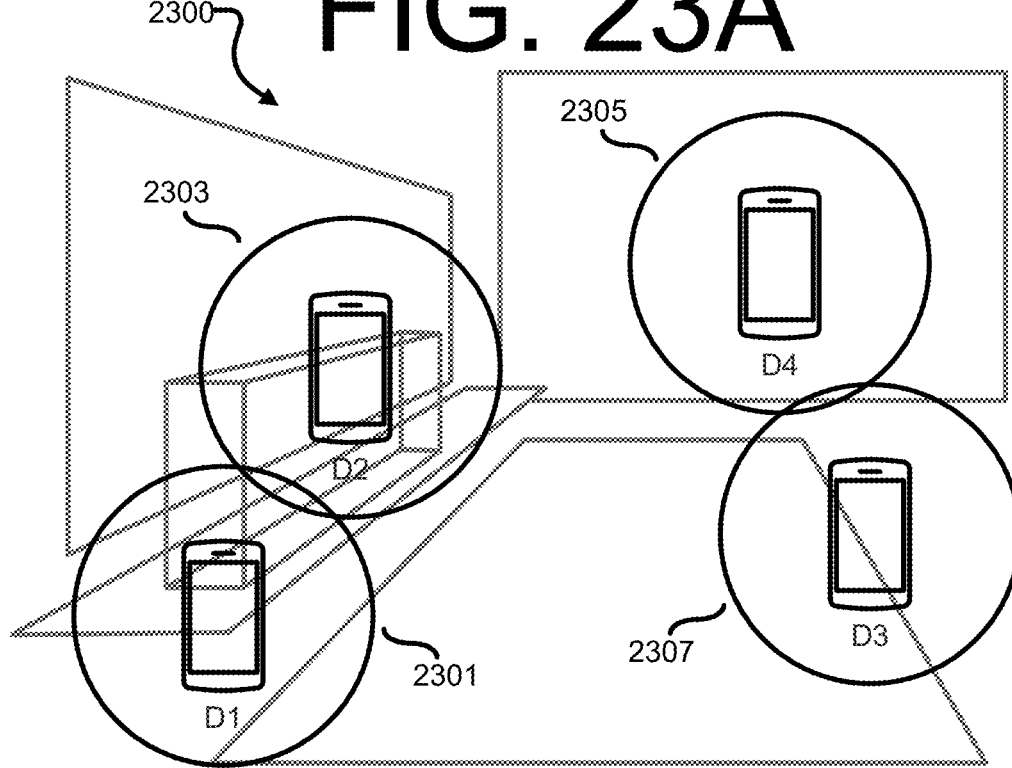
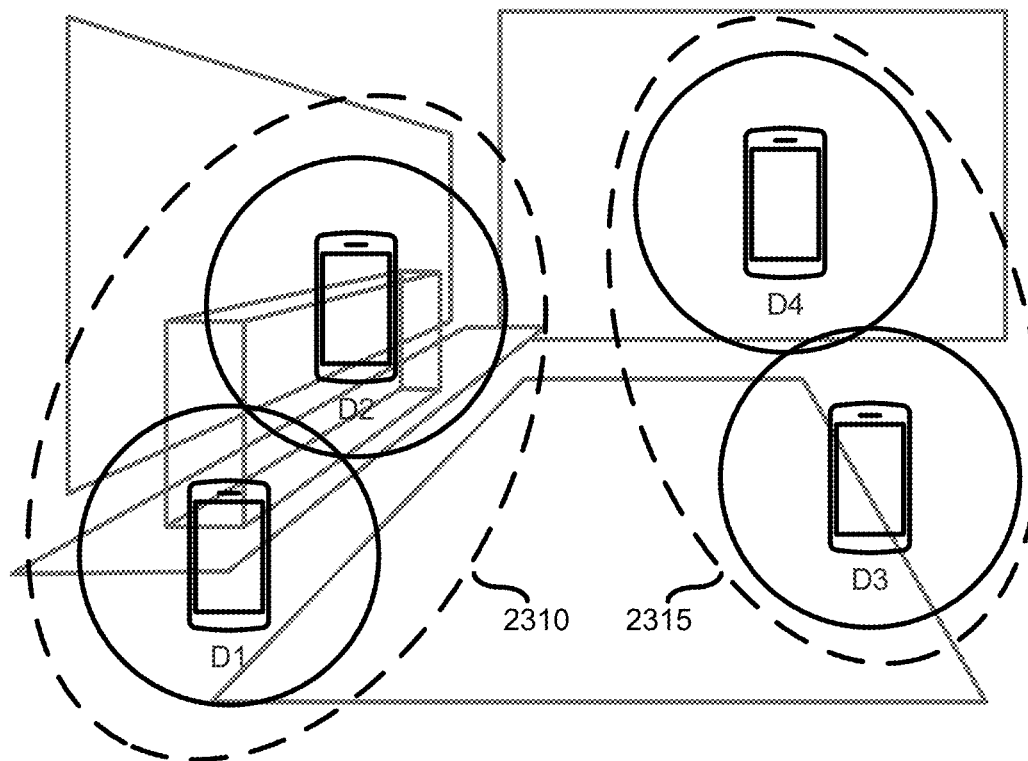

FIG. 23B
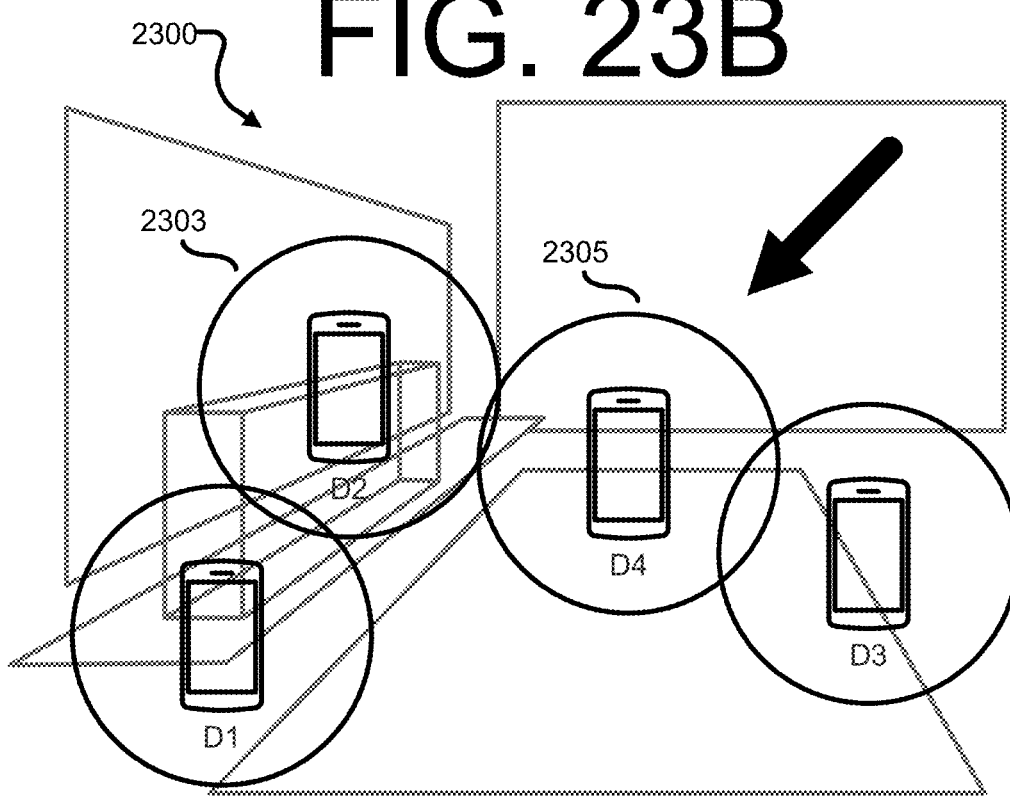
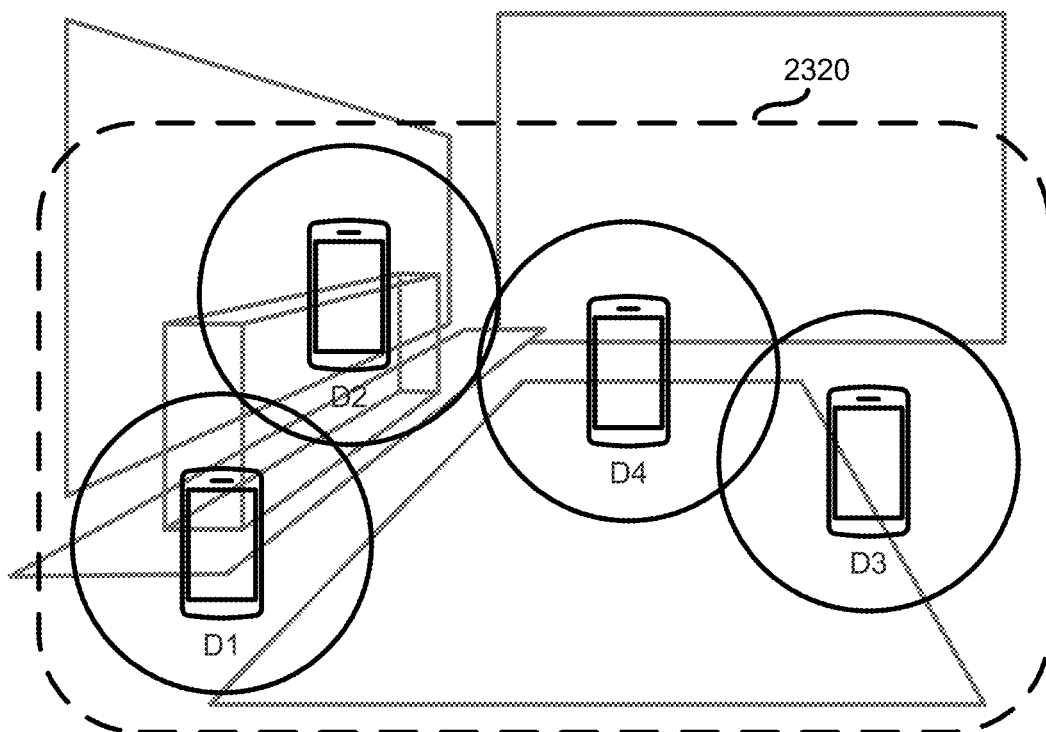

FIG. 23C
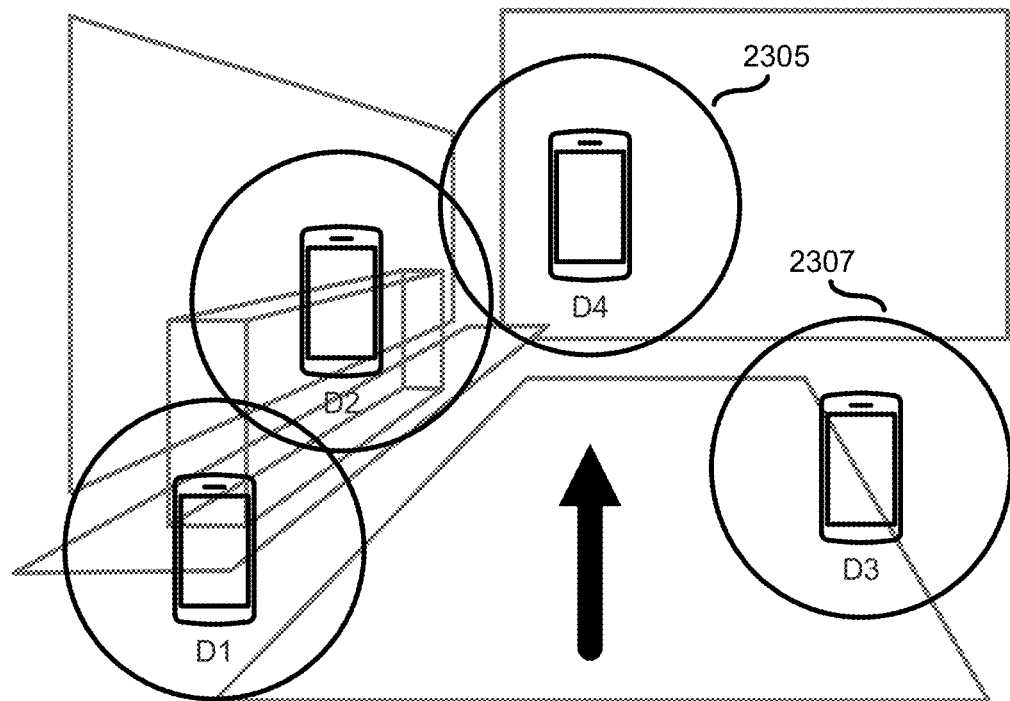
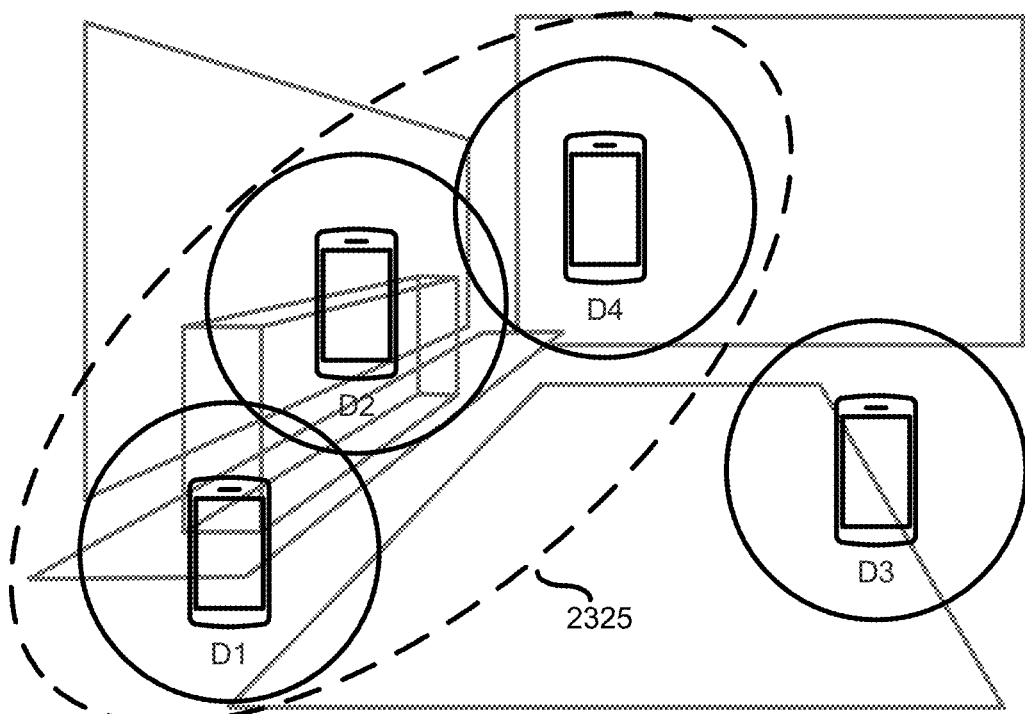

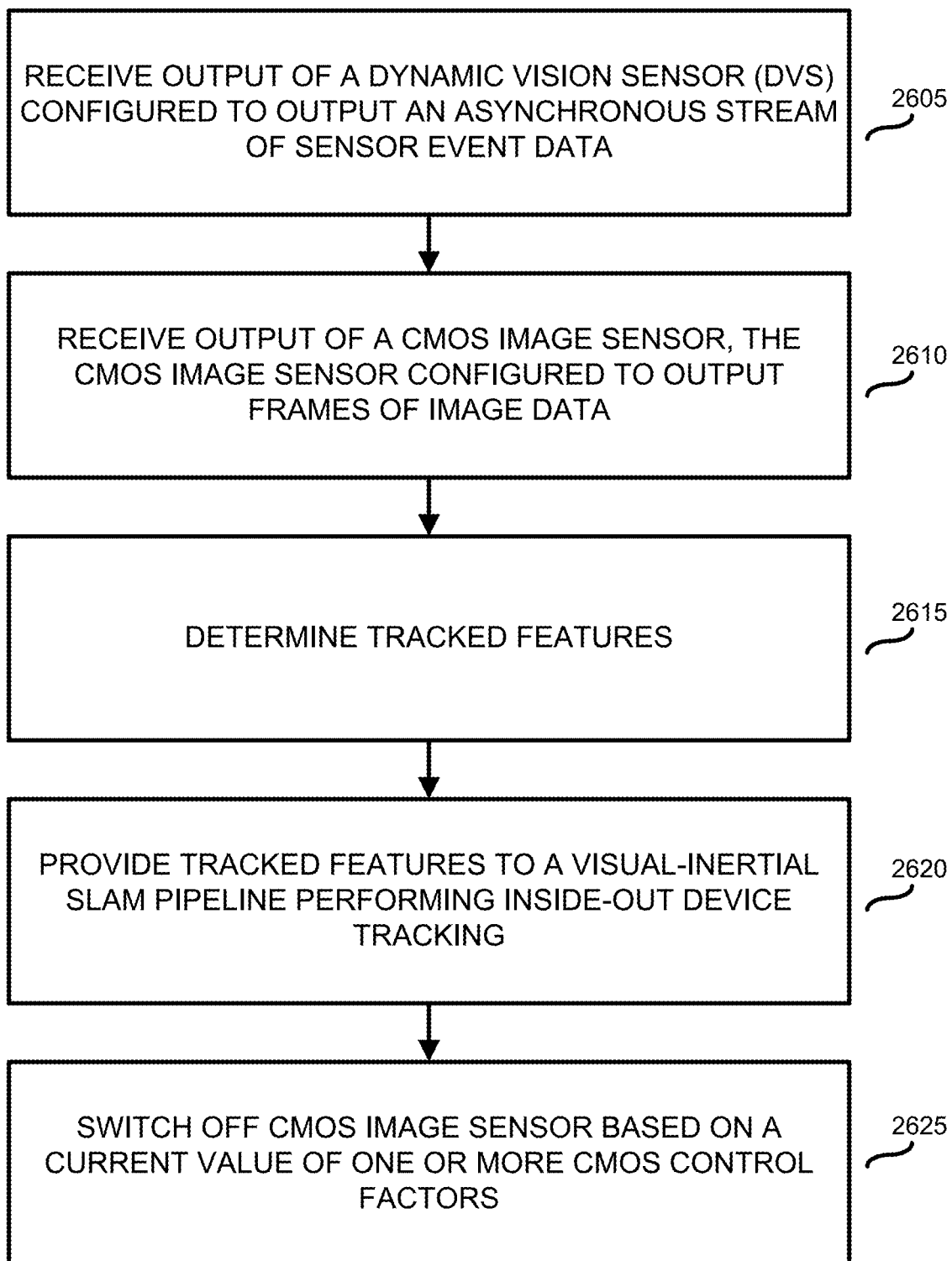

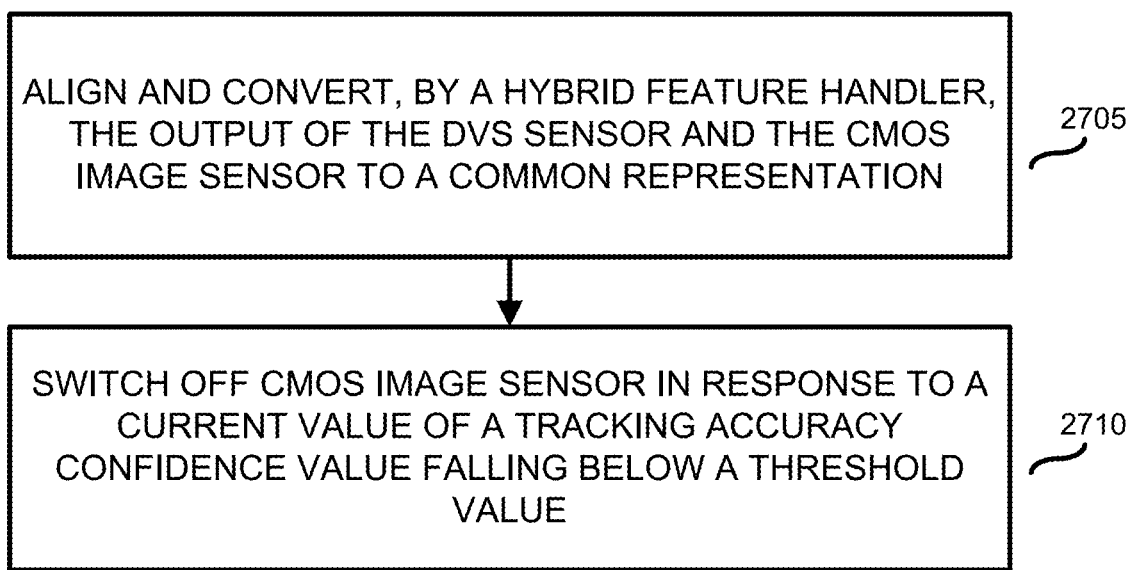

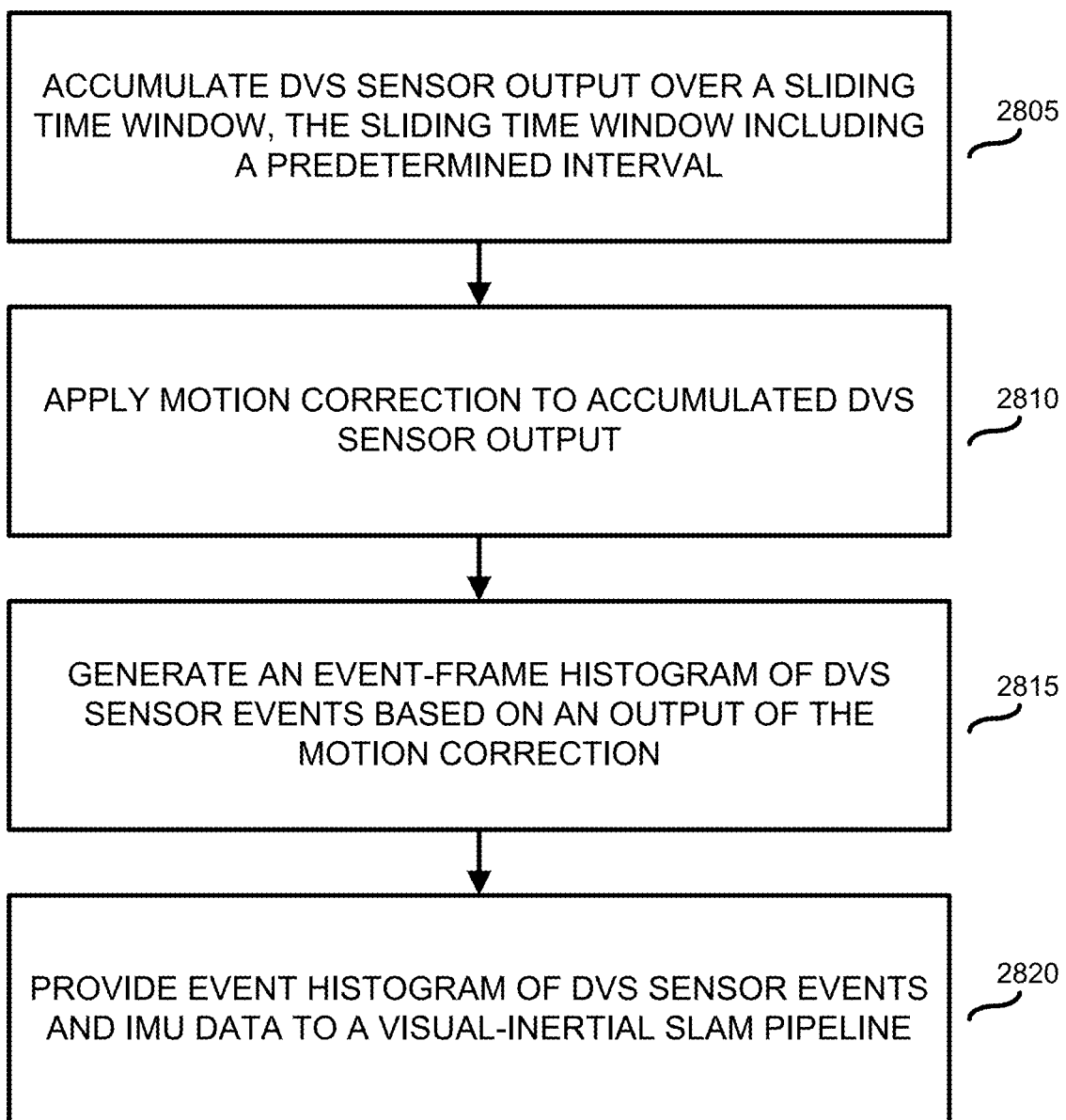

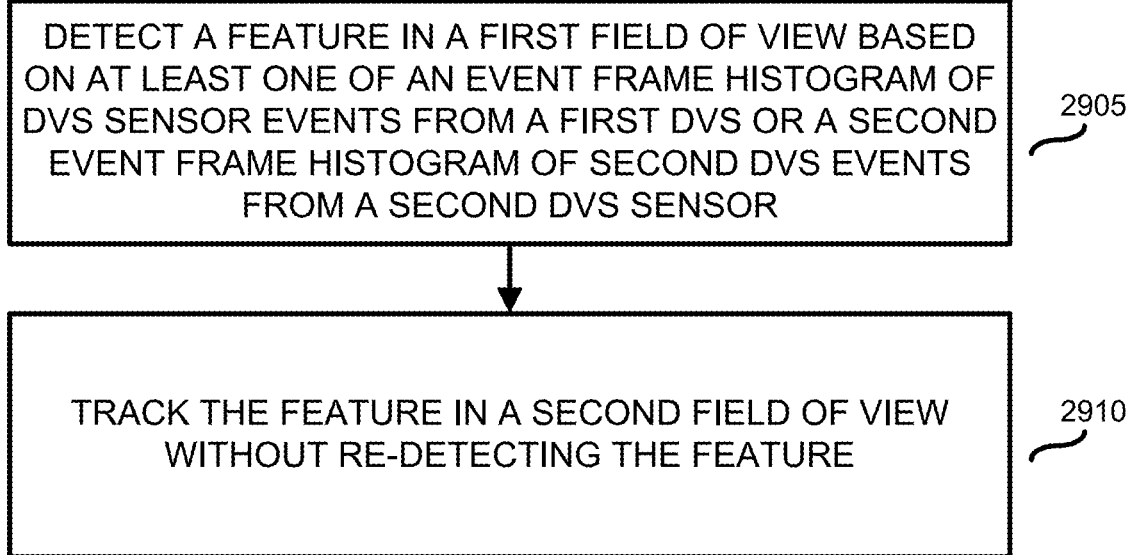

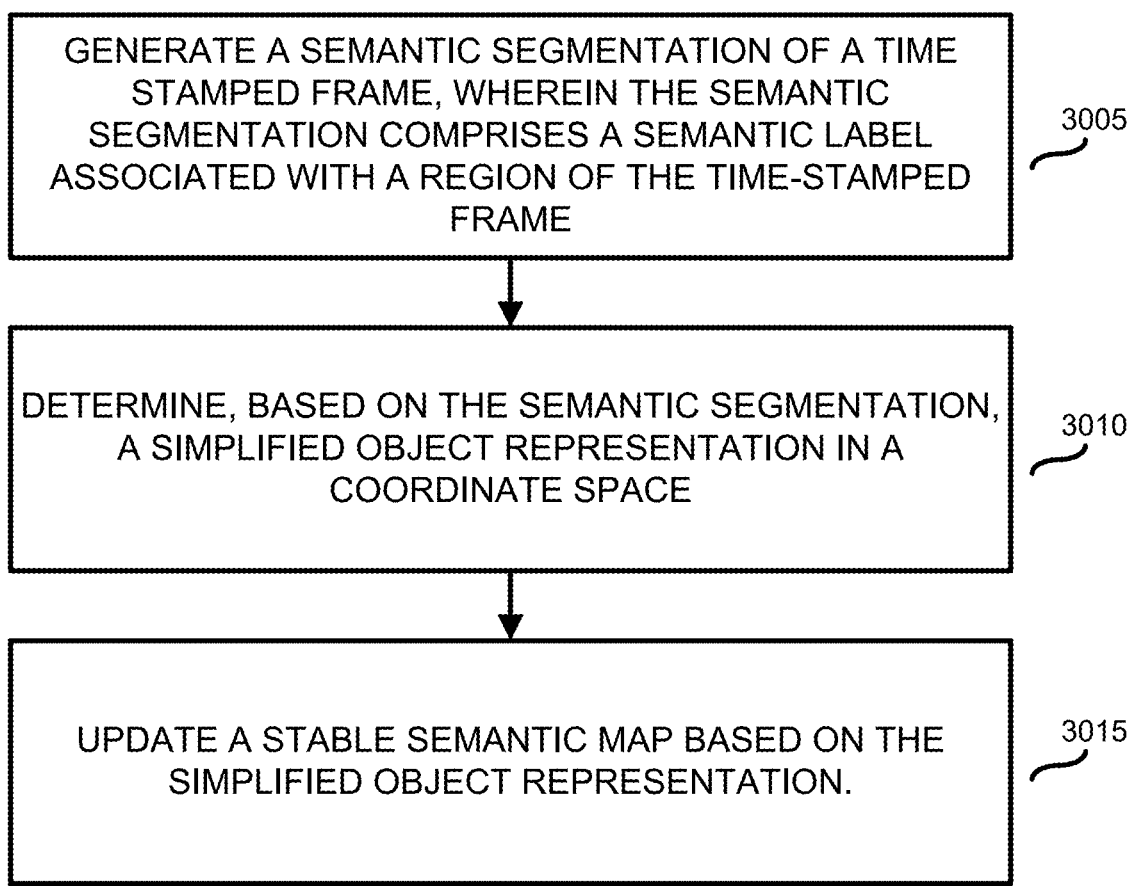

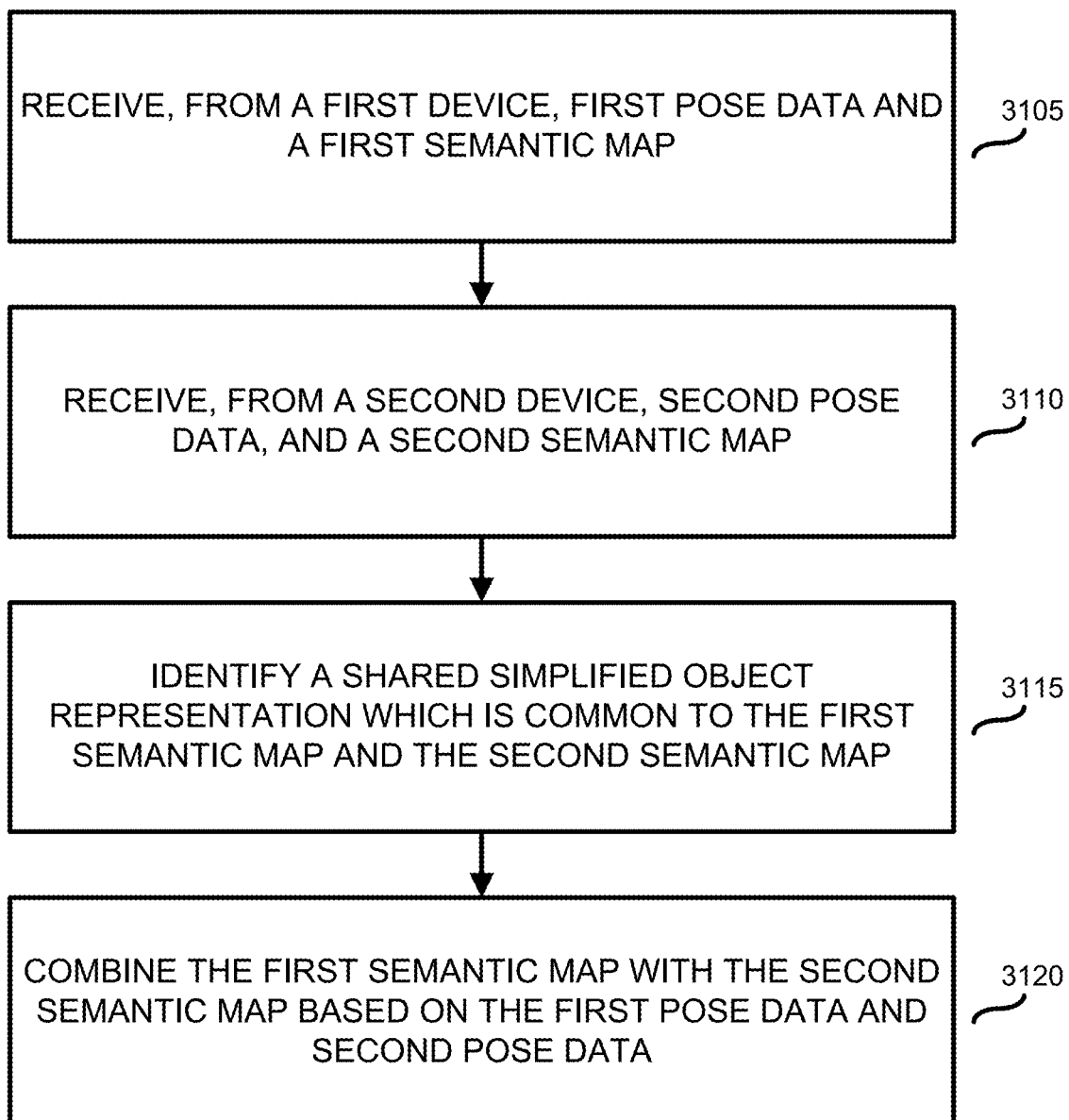

SEMANTIC MAPPING FOR LOW-POWER AUGMENTED REALITY USING DYNAMIC VISION SENSOR

CROSS-REFERENCE TO RELATED APPLICATION AND CLAIM OF PRIORITY

This application is a divisional of U.S. Non-Provisional patent application Ser. No. 16/415,860 filed May 17, 2019, which claims priority under 35 U.S.C. § 119(e) to U.S. Provisional Patent Application No. 62/673,402 filed on May 18, 2018, U.S. Provisional Patent Application No. 62/673,771 filed May 18, 2018, U.S. Provisional Patent Application No. 62/678,071 filed May 30, 2018 and U.S. Provisional Patent Application No. 62/698,740 filed Jul. 16, 2018. The above-identified provisional patent applications are hereby incorporated by reference in their entireties.

TECHNICAL FIELD

This disclosure relates generally to computer vision and platforms for augmented reality (AR). More specifically, this disclosure relates to semantic mapping for low-power augmented reality using one or more dynamic vision sensors.

BACKGROUND

Augmented reality (AR) experiences, which incorporate digitally controlled AR content into a user's view of an operating environment (e.g., a real-world environment) provided by the AR platform, such that the positional behavior of the AR content appears to mimic that of a physical object (for example, an AR object which appears to "stick" to a wall of the environment without jittering, or appearing to "sink" into the wall), as the user moves within the operating environment, can require that the AR platform generate and continuously update a digital understanding of its world based on image sensor data provided to the AR platform (such as device cameras).

In many cases, the processing loads and power consumption associated with maintaining an AR platform's world understanding can diminish the quality of an AR experience—for example, by requiring that AR apparatus be "tethered" (e.g., wired) to a more powerful processing platform, or that AR applications rapidly consume the available battery resources of untethered (e.g., wireless) AR platforms.

Accordingly, reducing the power consumption and processing loads associated with generating the accurate and stable world understanding underlying a desirable AR experience remains a source of technical challenges and opportunities for improvement in the fields of computer vision and augmented reality.

SUMMARY

This disclosure provides systems and methods for semantic mapping for low-power augmented reality using one or more dynamic vision sensors.

In a first embodiment, an apparatus includes a dynamic vision sensor (DVS) configured to output an asynchronous stream of sensor event data, and a complementary metal-oxide-semiconductor (CMOS) image sensor configured to output frames of image data. The apparatus further includes a hybrid feature handler configured to receive, as an input, one or more of a DVS output or a CMOS image sensor output, and provide tracked features to a visual-inertial simultaneous location and mapping (SLAM) pipeline performing inside-out device tracking, and a sensor scheduler configured to switch off the CMOS image sensor based on a current value of one or more CMOS control factors.

In a second embodiment, a method includes receiving, at a hybrid feature handler of an apparatus, an output of a dynamic vision sensor (DVS) configured to output an asynchronous stream of sensor event data, receiving, at the hybrid feature handler, an output of a complementary metal-oxide-semiconductor (CMOS) image sensor, the CMOS image sensor configured to output frames of image data, and determining, by the hybrid feature handler, based on one or more of the output of the DVS sensor or the output of the CMOS image sensor, tracked features. The method further includes providing the tracked features to a visual-inertial simultaneous location and mapping (SLAM) pipeline performing inside-out device tracking, and switching off the CMOS image sensor, by a sensor scheduler, based on a current value of one or more CMOS control factors.

In a third embodiment, a non-transitory computer-readable medium includes program code, which when executed by a processor, causes the apparatus to receive, at a hybrid feature handler of an apparatus, an output of a dynamic vision sensor (DVS) configured to output an asynchronous stream of sensor event data, receive, at the hybrid feature handler, an output of a complementary metal-oxide-semiconductor (CMOS) image sensor, the CMOS image sensor configured to output frames of image data, and determine, by the hybrid feature handler, based on one or more of the output of the DVS sensor or the output of the CMOS image sensor, tracked features. The non-transitory computer-readable medium further includes program code, which, when executed by the processor, causes the apparatus to provide the tracked features to a visual-inertial simultaneous location and mapping (SLAM) pipeline performing inside-out device tracking, and switch off the CMOS image sensor, by a sensor scheduler, based on a current value of one or more CMOS control factors.

In a fourth embodiment, an untethered apparatus for performing inside-out device tracking based on visual-inertial simultaneous location and mapping (SLAM) includes a dynamic vision sensor (DVS) configured to output an asynchronous stream of sensor event data from within a first field of view, an inertial measurement unit (IMU) sensor configured to collect IMU data associated with motion of the apparatus at a predetermined interval, a processor and a memory. Further, the memory includes instructions, which when executed by the processor, cause the apparatus to accumulate DVS sensor output over a sliding time window, the sliding time window including the predetermined interval, apply a motion correction to the accumulated DVS sensor output, the motion correction based on the IMU data collected over the predetermined interval, generate an event-frame histogram of DVS sensor events based on the motion correction, and provide the event-frame histogram of the DVS sensor events and the IMU data to a visual inertial SLAM pipeline.

In a fifth embodiment, an apparatus includes a dynamic vision sensor (DVS) configured to output an asynchronous stream of sensor event data, a complementary metal-oxide-semiconductor (CMOS) image sensor configured to output frames of image data, an inertial measurement unit (IMU), a processor and a memory. The memory contains instructions, which when executed by the processor, cause the apparatus to generate a semantic segmentation of a time-stamped frame, the time-stamped frame based on one or more of an output of the CMOS image sensor, or a synthesized event frame based on an output from the DVS and an output from the IMU over a time interval, wherein the semantic segmentation includes a semantic label associated with a region of the time-stamped frame. When executed by the processor, the instructions further cause the apparatus to determine, based on the semantic segmentation, a simplified object representation in a coordinate space, and update a stable semantic map based on the simplified object representation.

In a sixth embodiment, a computer-implemented method includes generating, at an apparatus having a processor and a memory, a semantic segmentation of a time-stamped frame. The time-stamped frame is based on one or more of an output of a CMOS image sensor configured to output frames of image data, or a synthesized image frame, the synthesized image frame being based on an output of a dynamic vision sensor (DVS) configured to output an asynchronous stream of sensor event data, and an inertial measurement unit, and the semantic segmentation includes a semantic label associated with a region of the time-stamped frame. The computer-implemented method also includes determining, based on the semantic segmentation, a simplified object representation in a coordinate space and updating a stable semantic map based on the simplified object representation.

In a seventh embodiment, a non-transitory computer-readable medium includes program code, which, when executed by a processor, causes an apparatus to generate, a semantic segmentation of a time-stamped frame. The time-stamped frame is based on one or more of an output of a CMOS image sensor configured to output frames of image data, or a synthesized image frame, the synthesized image frame being based on an output of a dynamic vision sensor (DVS) configured to output an asynchronous stream of sensor event data, and an inertial measurement unit. Additionally, the semantic segmentation includes a semantic label associated with a region of the time-stamped frame. When executed by the processor, the program code further causes the apparatus to determine, based on the semantic segmentation, a simplified object representation in a coordinate space, and update a stable semantic map based on the simplified object representation.

In an eighth embodiment, a computer-implemented method includes receiving, at a master platform, from a first device, first pose data associated with an image sensor of the first device, and a first semantic map generated by the first device, the first semantic map including at least one simplified object representation in a coordinate space of the first device. The computer-implemented method further includes receiving, at the master platform, from a second device, second pose data associated with an image sensor of the second device, and a second semantic map generated by the second device, the second semantic map including at least one simplified object representation in a coordinate space of the second device. Additionally, the method includes identifying a shared simplified object representation common to the first semantic map and the second semantic map and combining the first semantic map with the second semantic map based on the first pose data and the second pose data, wherein the first pose data, the first semantic map, the second pose data, and the second semantic map are associated with a common time interval.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 13A, 13B and 13C illustrate examples of hardware configurations for mobile platforms for implementing CMOS-assisted inside-out tracking utilizing multiple DVS sensors, according to certain embodiments of this disclosure;

FIGS. 19A, 19B, 19C and 19D illustrate certain aspects of inside-out device tracking and generation of a stable semantic map, according to certain embodiments of this disclosure;

FIG. 20 illustrates examples of system architectures for generating and updating a global stable semantic map, according to certain embodiments of this disclosure;

FIG. 21 illustrates an example of an architecture for generating and updating a multi-platform based global stable semantic map, according to certain embodiments of this disclosure;

FIGS. 23A, 23B and 23C provide a visual illustration of aspects of device grouping of mobile platforms at a master platform, according to certain embodiments of this disclosure;

FIG. 26 illustrates operations of one example of a method for performing CMOS-assisted inside-out DVS tracking on a low-power mobile device, according to certain embodiments of this disclosure;

FIG. 27 illustrates operations of methods for performing CMOS-assisted inside-out DVS tracking on a low-power mobile device, according to certain embodiments of this disclosure;

FIG. 28 illustrates operations of an example of a method for performing inside-out device tracking based on visual-inertial SLAM, according to certain embodiments of this disclosure;

FIG. 29 illustrates operations of methods for performing inside-out device tracking based on visual-inertial SLAM, according to certain embodiments of this disclosure;

FIG. 30 illustrates operations of one example of a method for updating a stable semantic map, according to certain embodiments of this disclosure; and FIG. 31 illustrates operations of an example of a method for combining local semantic maps as part of a larger process of updating a global semantic map, according to certain embodiments of this disclosure.

DETAILED DESCRIPTION

FIGS. 1 through 31, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

Figure 1:
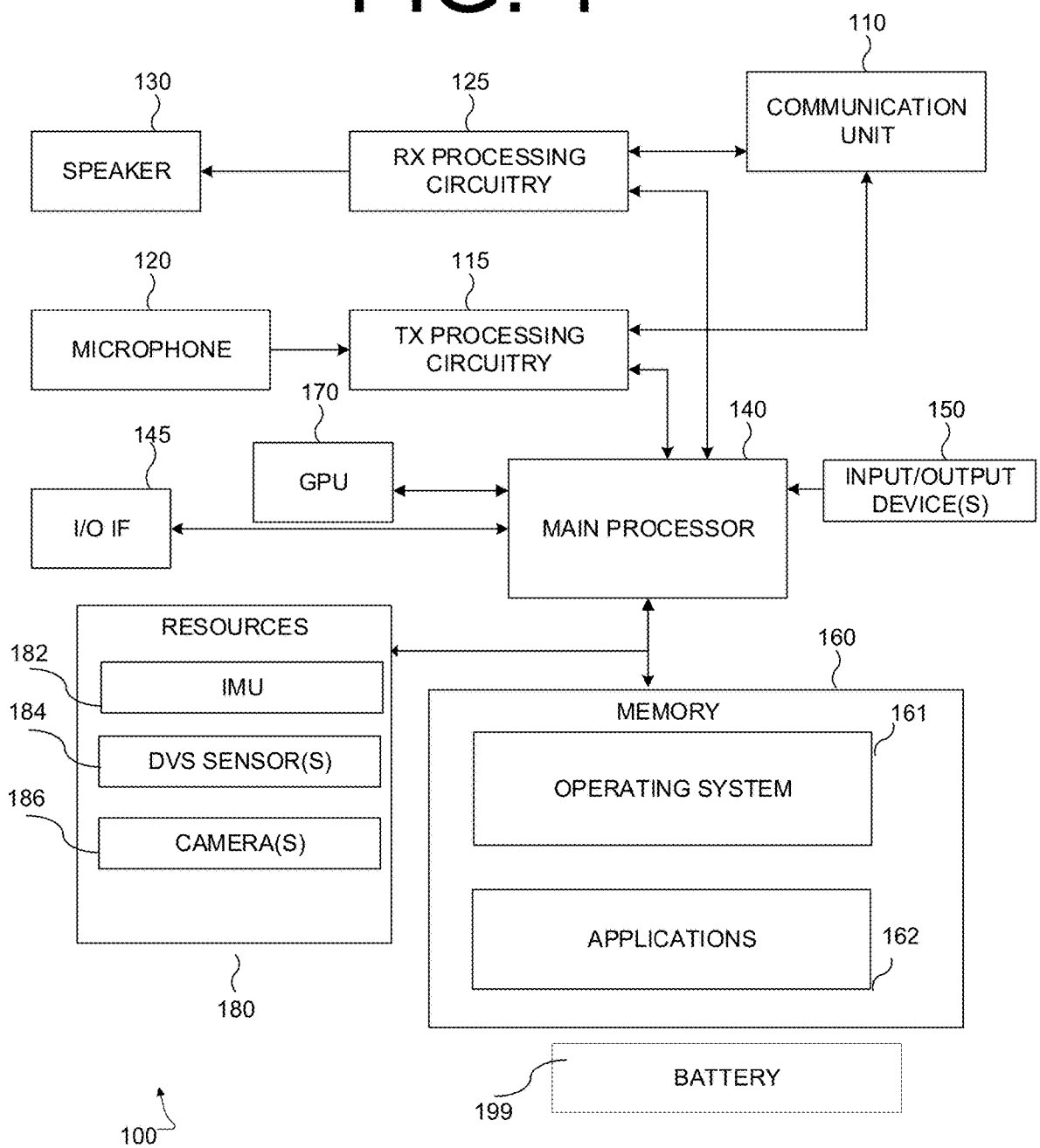
FIG. 1 illustrates an example of a device operating as a low power AR platform, according to certain embodiments of this disclosure.

FIG. 1 illustrates a non-limiting example of a device 100 operating as a low-power AR platform according to some embodiments of this disclosure. According to various embodiments of this disclosure, device 100 could be implemented as one or more of a smartphone, a tablet, or a head-mounted device (HMD) for providing an augmented reality (AR) experience. The embodiment of device 100 illustrated in FIG. 1 is for illustration only, and other configurations are possible. However, suitable devices come in a wide variety of configurations, and FIG. 1 does not limit the scope of this disclosure to any particular implementation of a device. For example, while certain embodiments according to this disclosure are described as being implemented on mobile AR platforms, embodiments according to this disclosure are not so limited, and embodiments implemented on virtual reality (VR) platforms are within the contemplated scope of this disclosure.

As shown in the non-limiting example of FIG. 1, the device 100 includes a communication unit 110 that may include, for example, a radio frequency (RF) transceiver, a BLUETOOTH transceiver, or a WI-FI transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications which can consume or otherwise utilize semantic maps of physical objects in a field of view of visual sensors of device 100.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller. According to certain embodiments, main processor 140 is a low-power processor, such as a processor which includes control logic for minimizing consumption of battery 199, or minimizing heat buildup in device 100.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with device 100. In some embodiments, input/output device(s) 150 can include a touch panel, an augmented or virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, device 100 includes a variety of additional resources 180 which can, if permitted, be accessed by applications 162. According to certain embodiments, additional resources 180 include an accelerometer or inertial measurement unit (IMU) 182, which can detect movements of the electronic device along one or more degrees of freedom. Additional resources 180 include, in some embodiments, one or more dynamic vision sensors 184, and one or more cameras 186 (for example, complementary metal oxide semiconductor (CMOS) sensor type cameras) of device 100. According to various embodiments, DVS sensor(s) 184 comprises a pair of dynamic vision sensors spaced at a stereoscopically appropriate distance for estimating depth at over a field of depth of interest. According to some embodiments DVS sensor(s) 184 comprise a plurality of DVS sensors with overlapping, or partially overlapping fields of view.

According to various embodiments, the above-described components of device 100 are powered by battery 199 (for example, a rechargeable lithium-ion battery), whose size, charge capacity and load capacity are, in some embodiments, constrained by the form factor and user demands of the device. As a non-limiting example, in embodiments where device 100 is a smartphone, battery 199 is configured to fit within the housing of the smartphone, and is configured not to support current loads (for example, by running a graphics processing unit at full power for sustained periods) causing heat buildup. As a further example, in embodiments where device 100 is a head mounted device, the size (and by implication, charge capacity) of battery 199 may be constrained by a need to keep device 100 as light as possible, to reduce neck strain on users and facilitate easy head movement.

Although FIG. 1 illustrates one example of a device 100 for performing CMOS-assisted dynamic vision sensor (DVS) tracking for low power mobile platforms according to some embodiments of this disclosure, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operating environment in which various features disclosed in this patent document can be used, these features could be used in any other suitable system.

Figure 2:
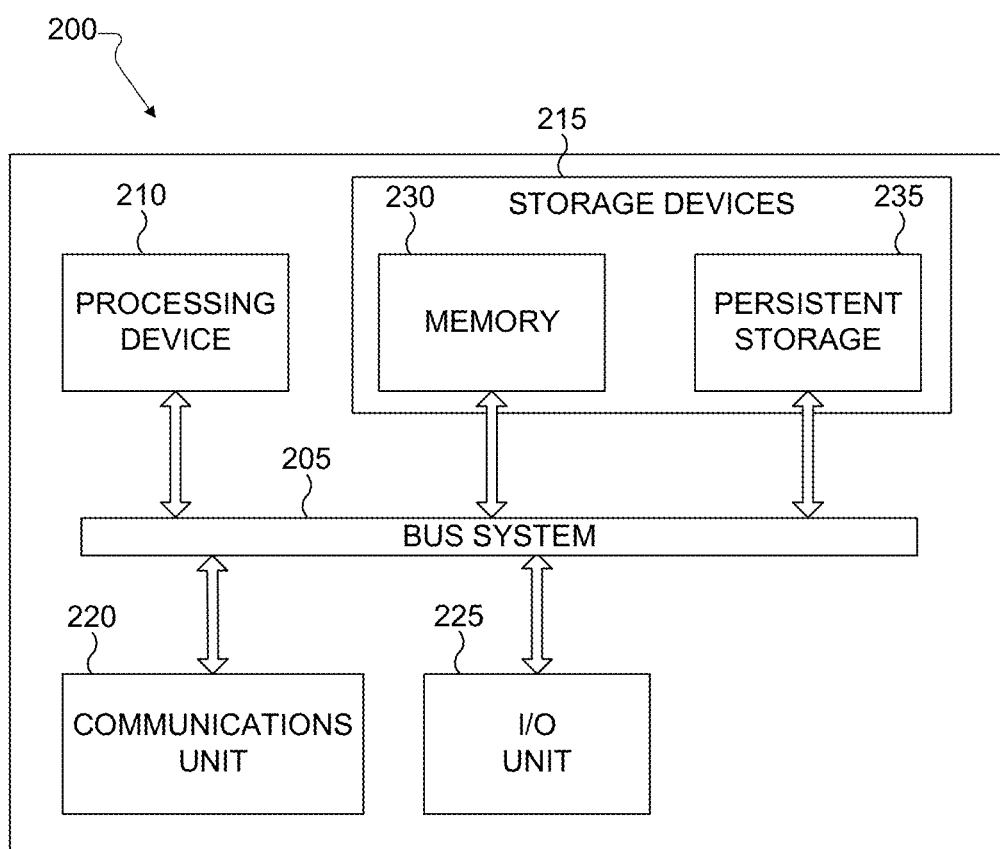
FIG. 2 illustrates an example of a server according to certain embodiments of this disclosure.

FIG. 2 illustrates an example of a server 200 according to certain embodiments of this disclosure. The embodiment of the server 200 shown in FIG. 2 is for illustration only and other embodiments could be used without departing from the scope of the present disclosure. According to certain embodiments, server 200 serves as a master platform for maintaining and updating a global stable semantic map, or as a platform for maintaining and provisioning AR visual assets to client devices (for example, device 100 in FIG. 1).

In the example shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. According to certain embodiments, memory 230 is provides non-transitory storage for a global stable semantic map or visual assets to be provided as augmented reality content to defined locations within a stable semantic map.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Figure 3:
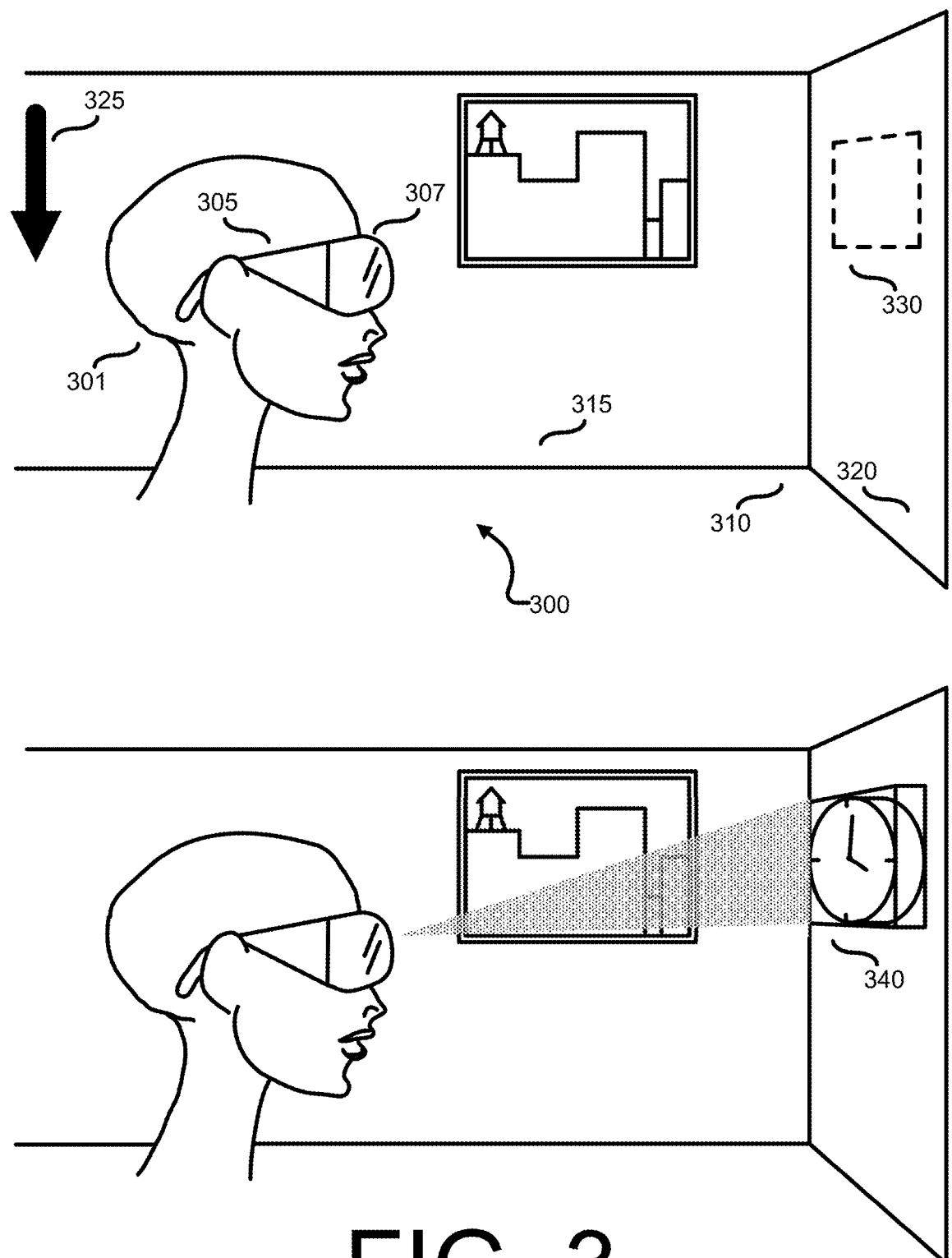
FIG. 3 illustrates aspects of CMOS-assisted inside-out feature tracking on a low-power platform in conjunction with providing augmented reality content based on a stable semantic map, according to certain embodiments of this disclosure.

FIG. 3 illustrates aspects of CMOS-assisted inside-out feature tracking on a low-power platform in conjunction with providing augmented reality content based on a stable semantic map, according to various embodiments of this disclosure. The example shown in FIG. 3 is for illustration only and other examples could be used without departing from the scope of the present disclosure.

In the example shown in FIG. 3, an operating environment 300 for a low-power AR platform 305 is shown in the top half of the figure. As shown in this illustrative example, operating environment 300 is associated with a room, which comprises at least three fixed planar surfaces: floor 310, first wall 315 and second wall 320, each of which are associated with fixed dimensions, and spatial relationships to each other and to a reference direction (for example, the direction of gravity 325).

According to certain embodiments, low-power AR platform 305 comprises an untethered head-mounted display (for example, device 100 in FIG. 1) worn on user's 301 head like a pair of sunglasses. In some embodiments, low-power AR platform 305 comprises a clear lens 307 through which user 301 can view objects in operating environment 300, and upon which low-power AR platform 305 can project AR objects, or visual assets, into user 301's field of view to provide an augmented reality ("AR") experience. As used in this disclosure, the term "AR experience" encompasses a hybrid view of an operating environment, comprising a native view of the operating environment (for example, a straight-out-of-camera ("SOOC") view, or a view through a clear screen), as well as visual assets, or AR objects which are rendered to have the appearance of physical objects within the operating environment.

One dimension of the quality of an AR experience is the extent to which AR objects' positional behavior mimics that of real-world physical objects. As one example, a situation where AR objects appear to jitter, or fail to stay still relative to an anchor point, may be correlative of a poor AR experience. As a further example, where AR objects fail to adhere to the plane structure of an operating environment (for example, where an AR coffee cup appears to float above a real-world table) may also be characteristic of a poor AR experience. Accordingly, the quality of an AR experience can, in some embodiments, be enhanced by provisioning AR content based on a stable and accurate world understanding of the operating environment. As used in this disclosure, the term "world understanding" encompasses a map or other digital representation of the geometry and structural features of an operating environment, which can be consumed or utilized by an AR application to position and determine the positional behavior (for example, making AR objects grow as a user moves towards them) of AR objects provided in an AR experience.

Another dimension of the quality of an AR experience is the extent to which the operating environment of the AR platform is geographically bounded by the hardware used to generate the world understanding of the operating environment. For example, certain approaches to generating a world understanding require that a user's viewing platform (for example, a headset) be tethered, such as by a high-speed data cable, to a desktop computer or other high-power processing platform. In such systems, the extent of operating environment is geographically bounded by the length of the cable tethering the headset to the desktop. As a second example, certain "outside in" approaches to generating positional and pose components (for example, determining the AR platform's location and direction of view within the operating environment) of the world understanding rely on external cameras within the operating environment to obtain data for determining the positional and pose components of the world understanding. In such cases, the operating environment of the AR platform is limited to the spaces containing the external cameras. For these reasons, a less geographically bounded AR experience is, ceteris paribus, often more preferable to a more geographically bounded AR experience.

A further dimension of the quality of the quality of an AR experience is the effect that providing the AR experience has on the hardware of the AR platform. For example, certain power-hungry image sensors or configurations of image sensors (for example, multiple CMOS image sensors) and computationally expensive processing logic for generating a world understanding can translate to one or more undesirable hardware characteristics, including, without limitation, short battery life, excess heat generation or bulky, heavy apparatus (for example, to hold large batteries and dissipate processor heat). By contrast, AR platforms which are power efficient and light are generally associated with an improved AR experience.

As illustrated in FIG. 3, low power AR platform 305 provides one example of an apparatus according to various embodiments of this disclosure which provides improvements in each of the above-described dimensions of the quality of an AR experience. As shown in the non-limiting example of FIG. 3, low-power AR platform 305 is not tethered to a separate processing platform to generate a world understanding. Rather, according to some embodiments, low-power AR platform 305 utilizes one or more dynamic vision sensors (DVS) with intermittent assistance from a CMOS image sensor to generate a stable semantic map providing a lightweight, extensible world understanding of operating environment 300, as well as of spaces outside of the operating environment 300 shown in FIG. 3. In some embodiments, the DVS sensors' energy efficiency and simplicity of the stable semantic map allow low-power AR platform 305 to generate a world understanding without placing a heavy load on its battery (for example, by continuously running a CMOS image sensor) or processing resources (for example, by maintaining a point cloud based world understanding).

As shown in the illustrative example of FIG. 3, low-power AR platform 305 generates a world understanding sufficient to consistently identify coordinate regions (for example, coordinate region 330 on second wall 320) within a stable semantic map and project AR content (for example, clock 340) to user 301, which appears as a clock on second wall 320 within coordinate region 330.

Figure 4:
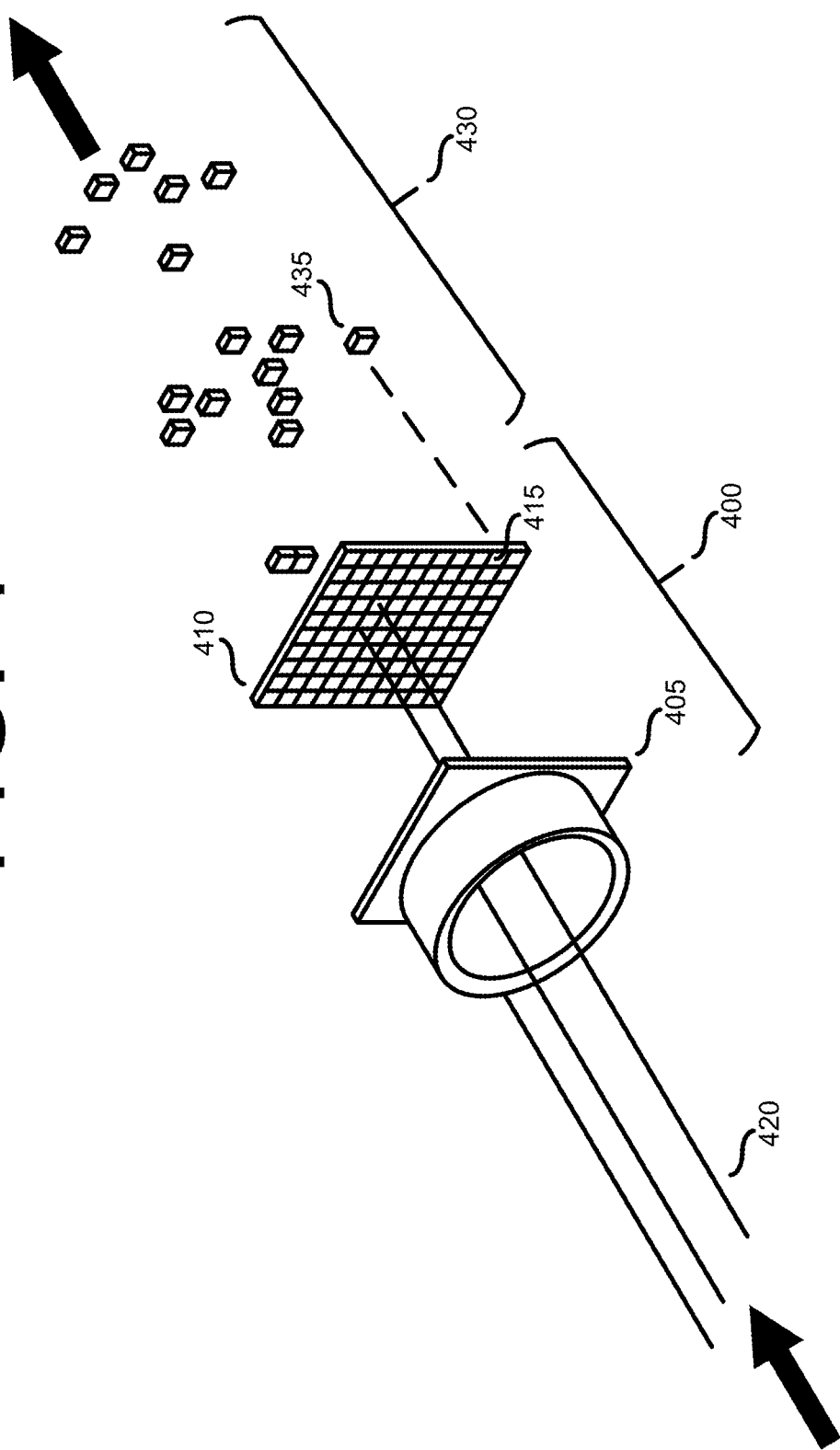
FIG. 4 illustrates aspects of the operation of a dynamic vision sensor ("DVS"), according to certain embodiments of this disclosure.

FIG. 4 illustrates aspects of the operation of a dynamic vision sensor ("DVS") 400 according to certain embodiments of this disclosure. The embodiment shown in FIG. 4 is for illustration only and other embodiments could be used without departing from the scope of the present disclosure.

In the example shown in FIG. 4, DVS 400 is, in certain embodiments, one sensor of a DVS stereo pair. In some embodiments, DVS 400 is one sensor of a set of three or more DVS sensors (for example, a set of DVS sensors disposed along multiple parallax angles, and at multiple sensor spacings). In certain embodiments, DVS 400 is a single DVS sensor.

According to various embodiments, DVS 400 comprises a lens assembly 405, and a pixelated array 410 of light intensity sensors, such as light intensity sensor 415. In some embodiments, lens assembly 405 comprises an optical lens having a focal length corresponding to a distance between lens assembly 405 and pixelated array 410. In various embodiments according to this disclosure, lens assembly 405 comprises an aperture for adjusting (such as by stepping down an f-stop) the overall intensity of light provided to pixelated array 410.

As shown in the non-limiting example of FIG. 4, pixelated array 410 of light intensity sensors comprises an array of light intensity sensors (for example, light intensity sensor 415) substantially covering an area in the focal plane of a lens in lens assembly 405. Further, the output each light intensity sensor of pixelated array 410 is mapped to a spatial coordinate value.

In some embodiments, light intensity sensor 415 comprises a photo sensor configured to output a signal corresponding to a direction of change in the measured intensity of light received at light intensity sensor 415. According to certain embodiments, the output of light intensity sensor is a binary signal, for example "1" for an increase in the measured intensity of light, and "0" for a decrease in the measured intensity of light. When there is no change in the measured intensity of light at light intensity sensor 415, no signal is output. According to certain embodiments, signals output by light intensity sensor 415 are time-coded or time-mapped to a time value by pixelated array 410 or by another downstream component (such as processor 225 in FIG. 2).

Referring to the non-limiting example of FIG. 4, at a high level, DVS 400 operates by receiving light 420 through lens assembly 405, and converting the received light into an asynchronous event stream 430, by using the output of the constituent light intensity sensors of pixelated array 410.

According to various embodiments, asynchronous event stream 430 comprises a time-coded stream of light intensity change events output by light intensity sensors of pixelated array 410. An individual light intensity change event 435 comprises data indicating a change (for example, an increase or decrease) in the measured intensity of the light measured at a particular light intensity sensor (e.g., a pixel) of pixelated array 410. For example, in this illustrative example, light intensity change event 435 corresponds to a change in the measured light intensity at light intensity sensor 415. Further, each individual light intensity change event 435 is time-coded or otherwise mapped to an event time based on a common timescale for each sensor of pixelated array 410. In some embodiments, each individual light intensity change event 435 is also mapped to a value in a spatial coordinate system (for example, a coordinate system based on the rows and columns of pixelated array 410).

According to certain embodiments, by outputting an asynchronous stream of sensor event data associated with changes in the intensity of received light, DVS sensor 400 consumes significantly less power than image sensors (for example, complementary metal oxide semiconductor (CMOS)) which generate frames of data for each pixel of the sensor. In some embodiments, DVS sensor 400 draws approximately ~25-100 mW of power, as compared to 100-800 mW for certain CMOS sensors. Additionally, in contrast to sensors which generate image frames over predetermined imaging periods (e.g., digital "exposure times"), by outputting an asynchronous stream of change event data, DVS sensor 400 is more sensitive to high speed events and less sensitive to the overall brightness of a scene being exposed to DVS sensor 400. Accordingly, DVS sensor 400 can have a higher dynamic range and less latency than a CMOS, or other image-frame type sensor. As such, DVS sensor 400 can be kept in an "on" state on a device for providing inside-out tracking on a low-power AR platform (for example, device 100 in FIG. 1), while a CMOS sensor is, in some embodiments, intermittently turned on to initialize a tracking platform, and to provide additional visual data (for example, when the device is very still and an asynchronous stream of change event data from DVS sensor 400 slows or dries up) as necessary.

Figure 5:
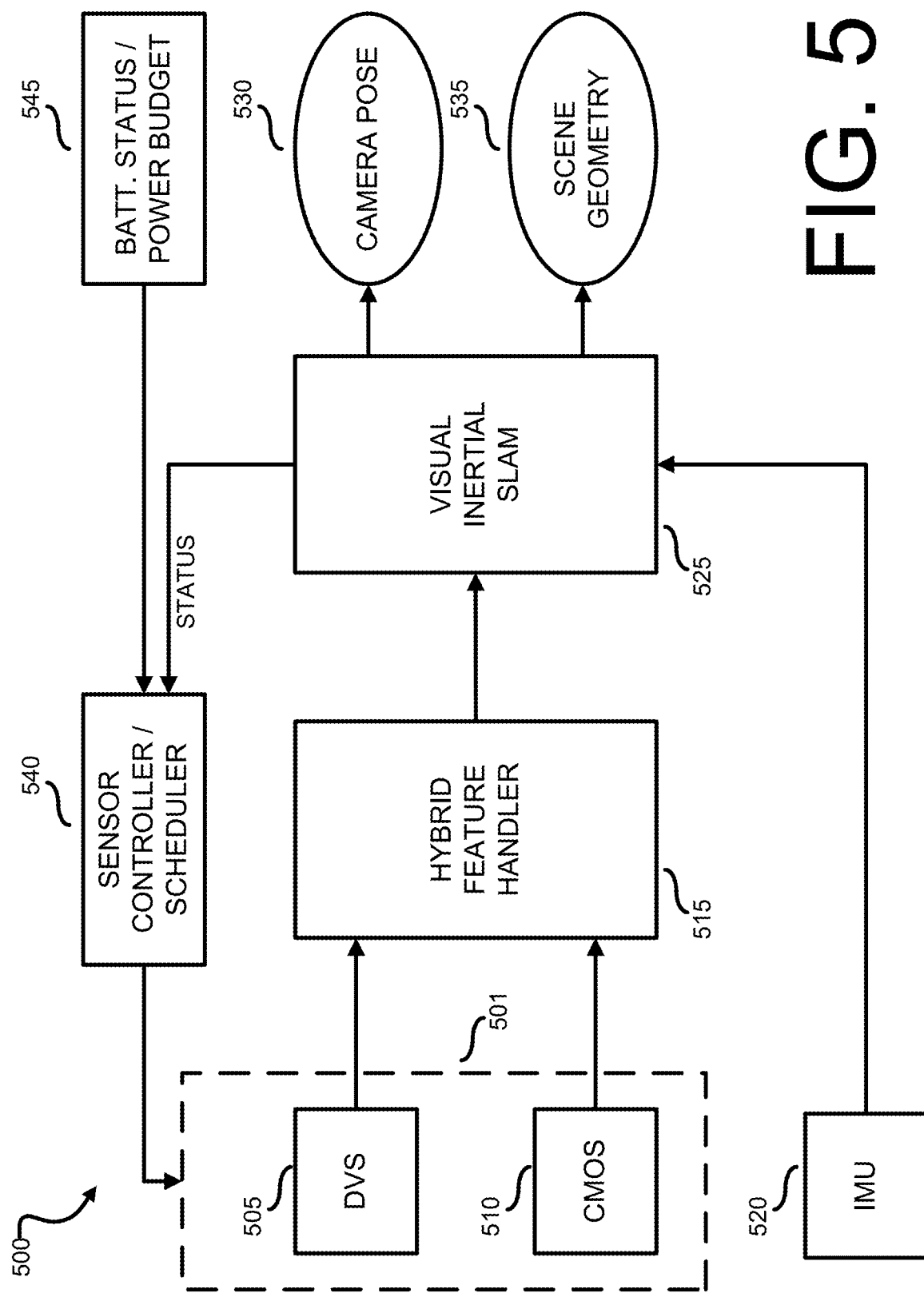
FIG. 5 illustrates an example of a system for performing CMOS-assisted inside-out DVS tracking on a low-power mobile platform according to certain embodiments of this disclosure.

FIG. 5 illustrates an example of a system 500 for performing CMOS-assisted inside-out DVS tracking on a low-power mobile platform (for example, device 100 in FIG. 1 or low-power AR platform 305 in FIG. 3) according to certain embodiments of this disclosure. The embodiment of the system 500 shown in FIG. 5 is for illustration only and other embodiments could be used without departing from the scope of the present disclosure.

According to various embodiments, system 500 is configured to obtain data for developing an inside-out world understanding based on DVS sensor data, in conjunction with intermittent (e.g., the CMOS sensor is not always on) assistance from a CMOS sensor. As such, by selectively adding the output of a CMOS image sensor to the output of one or more DVS sensor, certain embodiments of system 500 achieve an optimal tradeoff between power efficiency and robustness of environment tracking.

In the example shown in FIG. 5, system 500 includes a sensor package 501, which comprises the sensors for obtaining the visual data for generating a world understanding which includes information regarding the mobile platform's position, pose and the geometry of relevant scene elements (for example, walls of a room). According to various embodiments, sensor package 501 comprises a single piece of hardware (such as a chip). In some embodiments, sensor package 501 comprises multiple pieces of hardware connected to a processor (for example, main processor 140 in FIG. 1) of the mobile platform.

According to certain embodiments, sensor package 501 comprises one or more DVS sensors 505 (for example, DVS sensor 400 in FIG. 4) which are powered by a battery of the mobile platform (for example, battery 199 in FIG. 1), and configured to output one or more asynchronous streams of sensor event data to hybrid feature handler 515. As used in this disclosure, the term "asynchronous streams" encompasses the fact that the one or more DVS sensors 505 output sensor events when events occur (e.g., when a change of light is detected), rather than at a predetermined image capture time.

As shown in FIG. 5, sensor package 501 further comprises one or more complementary metal oxide semiconductor (CMOS) image sensors 510. According to various embodiments, CMOS image sensor 510 is powered by the battery of the mobile platform (for example, battery 199 in FIG. 1) and is configured to generate frames of image data from exposing all of the pixels of the sensor over a predetermined capture time. According to certain embodiments, CMOS image sensor 510 can capture visual data regarding the colors of objects in a field of view, as well as visual data in regions of a frame where the intensity of the light does not change over the predetermined time. According to certain embodiments, by collecting data across every pixel of the sensor (as opposed to only those pixels where a light value has changed), CMOS image sensor 510 draws more energy than a DVS sensor 505. In some cases, DVS sensor 505 and CMOS image sensor 510 may have different resolutions and sensor aspect ratios (for example, one sensor may have a square pixelated array, while another may have a pixelated array proportioned according to the 3:2 standard). Additionally, depending on the configuration of the mobile platform, DVS sensor 505 and CMOS image sensor 510 may cover different fields of view. For example, in some embodiments, DVS sensor 505 and CMOS image sensor 510 may be disposed, arranged or positioned at different locations on the mobile platform, and as a result of their locations, have different view angles, and by implication, cover different fields of view.

According to various embodiments, system 500 includes an inertial measurement unit (IMU) sensor 520, which detects and measures the direction and magnitude of the mobile platform's movements. In some embodiments, IMU 520 is a six degree of freedom IMU, which detects the movement of the mobile platform along three orthogonal transverse axes (to measure lateral and up-and-down movement) as well as three orthogonal axes of rotation (for example, to measure the pitch, roll and yaw of the mobile platform). Additionally, IMU sensor may include a gravity sensor to determine, as a reference axis for a coordinate system, a local gravity vector (e.g., the direction in which objects fall under the effect of gravity). Although not explicitly shown in FIG. 5, in some embodiments, the sensor package 501 can further comprise the IMU sensor or at least a portion or component thereof.

Referring to the illustrative example of FIG. 5, system 500 comprises hybrid feature handler 515. According to some embodiments, hybrid feature handler 515 is embodied as software executing on a processor of the mobile platform. According to various embodiments, hybrid feature handler 515 is embodied as hardware (for example, as a graphics processor), or as a combination of hardware and software. In various embodiments, hybrid feature handler 515 is configured to receive as inputs, one or more of the output of DVS sensor(s) 505 or the output of CMOS image sensor 510, and transmit, provide, or output tracked features (for example, corners of identified objects in data from sensor package 501) to visual-inertial simultaneous location and mapping (SLAM) pipeline 525. Further, as described elsewhere in this disclosure, hybrid feature handler 515 aligns and converts the outputs of DVS sensor 505 and CMOS image sensor 510 to a common representation. According to some embodiments, the common representation has one or more of a single resolution, single aspect ratio and a single field of view.

In various embodiments, system 500 includes visual-inertial SLAM pipeline 525, which performs inside-out device tracking for the mobile platform. According to certain embodiments, visual-inertial SLAM pipeline 525 receives tracked features, in particular, feature tracks from hybrid feature handler 515, as well as positional data from IMU 520 and outputs data associated with the mobile platform's world understanding. Specifically, according to various embodiments, visual-inertial SLAM pipeline outputs camera pose data 530 and scene geometry data 535. Referring to the non-limiting example of FIG. 5, camera pose data 530 comprises coordinate values indicating a view direction of the mobile platform for the purposes of providing an AR experience. Put differently, camera pose data 530 indicates the direction in which the mobile platform, as an extension of a user's eyes, is looking in. According to certain embodiments, scene geometry data 535 comprises data indicating the coordinate positions of identified surfaces and other tracked features of an operating environment of the mobile platform are located. According to certain embodiments, visual-inertial SLAM pipeline 525 outputs scene geometry data 535 in a potentially data-intense format, such as a point cloud.

Depending on the surfaces (for example, the availability of trackable features in the operating environment) and current light conditions, the robustness of the output of visual-inertial SLAM pipeline 525 can fluctuate. As used in this disclosure, the term "robustness" encompasses a metric of confidence that the raw data provided by sensor package 501 to hybrid feature handler 515 is sufficient for visual inertial SLAM pipeline 525 to generate an accurate world understanding. By way of example, the robustness of the output of visual-inertial SLAM pipeline 525 in a softly lit room with smooth white walls will be less than in a well-lit room with discernable features (for example, cabinets, pictures, and changes of color). According to certain embodiments, the robustness of the output of visual-inertial SLAM pipeline 525 can be increased by providing hybrid feature handler 515 with additional data from CMOS image sensor 510, which, in contrast to DVS sensor 505, can detect colors, and resolve features without changes in the intensity of received light. However, in most cases, improving the robustness of visual-inertial SLAM pipeline 525 by adding CMOS image data comes at the cost of significantly increased power usage.

According to certain embodiments, system 500 includes sensor controller/scheduler 540, which is configured to negotiate a tradeoff between improving the robustness of the visual-inertial SLAM pipeline by providing hybrid feature handler 515 with image data from CMOS image sensor 510, and minimizing the power consumption of system 500 by avoiding unnecessary use of CMOS image sensor 510. According to various embodiments, sensor controller/scheduler 540 receives information associated with one or more CMOS control factors, such as status information from visual-inertial SLAM pipeline 525, or information 545 on the current status of the mobile platform's battery and power budget, and switches CMOS image sensor 510 on or off based on a current value of one or more CMOS control factors. According to certain embodiments, the CMOS control factors can include, without limitation, a current value of remaining battery power, a power budget for the apparatus, a current value of a representation of robustness of feature tracking, a current value of a tracking accuracy confidence value, an initialization state, or a mode of operation of the mobile platform (for example, the type(s) of AR applications currently executing on the mobile platform).

Figure 6:
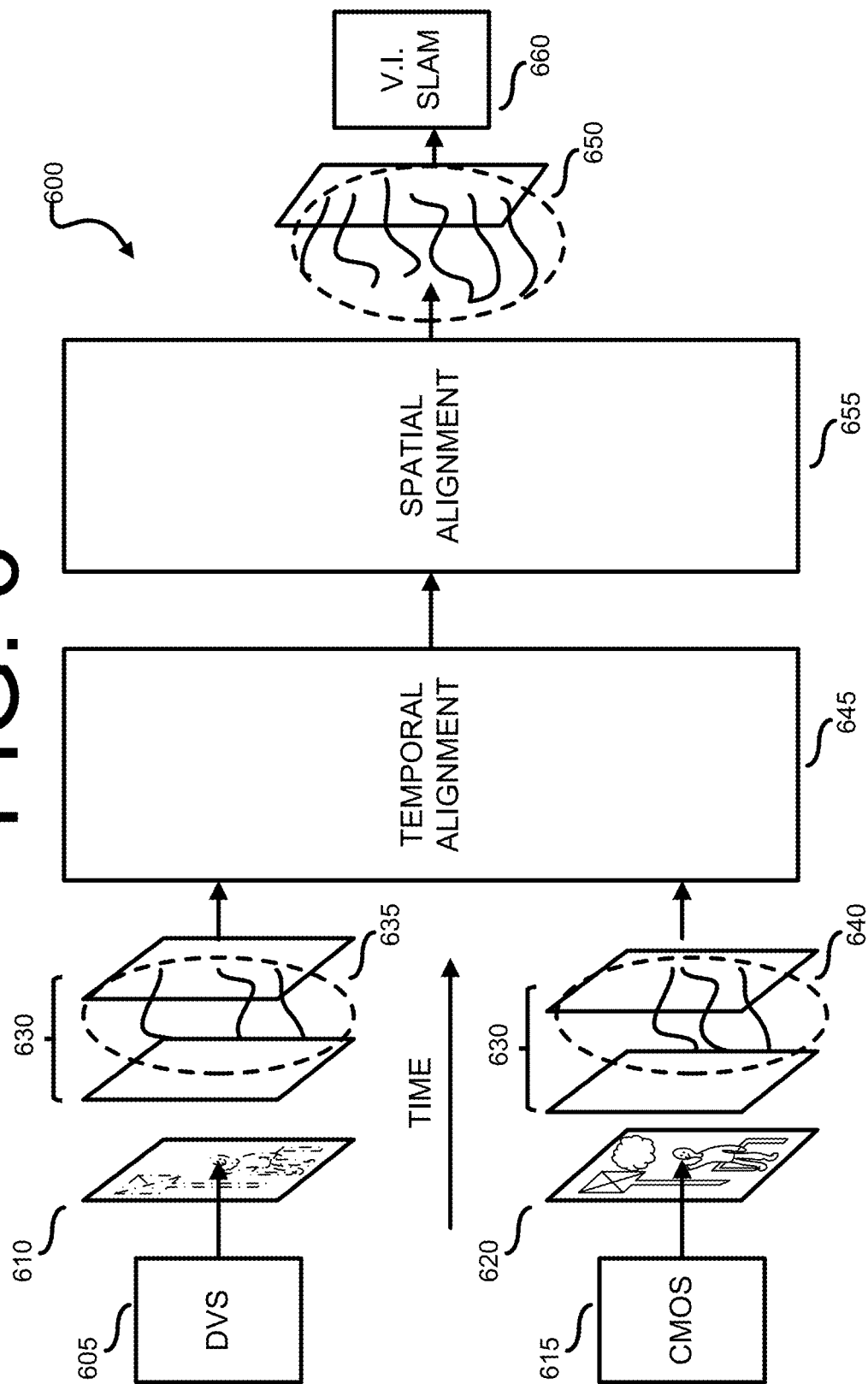
FIG. 6 illustrates aspects of an example of a pipeline for generating hybrid feature tracks, according to certain embodiments of this disclosure.

FIG. 6 illustrates aspects of an example of a pipeline 600 for generating hybrid feature tracks according to various embodiments of this disclosure. The embodiment of the pipeline 600 shown in FIG. 6 is for illustration only and other embodiments could be used without departing from the scope of the present disclosure.

According to various embodiments, pipeline 600 described with reference to FIG. 6 can be implemented as part of a system for implementing CMOS-assisted inside-out tracking on a low-power mobile platform (for example, by hybrid feature handler 515 in FIG. 5). In some embodiments, generating hybrid feature tracks (for example, feature tracks based on multiple types of visual data) contributes to the overall robustness of the tracking outputs (for example, scene geometry 535 in FIG. 5) of a visual-inertial SLAM pipeline, in that DVS sensors and CMOS image sensors have complementary detection properties. For example, DVS sensors frequently provide better performance in difficult lighting situations (for example, scenes with low light, or scenes that are saturated in light) than CMOS image sensors. Additionally, DVS sensors are able to capture image data from fast-moving scene elements which would appear blurry in a CMOS image. At the same time, the output of a CMOS image sensor (for example, CMOS image sensor 510 in FIG. 5) can capture changes in color across areas of equivalent brightness, and static details which may not be reliably included in the output of a DVS sensor.

Referring to the illustrative example of FIG. 6, a component implementing hybrid feature generation (for example, hybrid feature handler 515 in FIG. 5) receives, as a first input, a set of DVS sensor events 605, which are IMU-stabilized (to compensate for movement of the DVS sensor over the capture period) to generate one or more DVS "frames" 610. According to some embodiments, DVS frames 610 comprise two dimensional histograms of IMU stabilized data collected over a time window. In certain embodiments, the histograms show the pixels of the DVS sensor where a change in the intensity of received light was detected by the DVS sensor during the time window.

According to various embodiments, the component generating hybrid feature tracks (for example, hybrid feature handler 515 in FIG. 5) receives, as a second input, one or more available images 615 from a CMOS image sensor. Depending on the conditions and power usage status of the mobile platform, CMOS image sensor images 615 may not always be available for feature tracking, and only DVS sensor events 605 are used for feature tracking. The CMOS image sensor images 615 are, in some embodiments, used "as is" as frames 620 for feature tracking. According to some embodiments, CMOS image sensor images 615 are pre-processed (for example, by performing a file conversion to a raw sensor output) before being passed as frames 620 for feature tracking.

As shown in the explanatory example of FIG. 6, a feature tracking algorithm (for example, a Lukas-Kanade tracking algorithm 630) is applied to DVS frames 610 to identify features (for example, corners of recognized objects) within the set of DVS sensor events 605 and track the identified features over time to generate DVS feature tracks 635.

Similarly, according to various embodiments, where frames 620 of CMOS image sensor data are available, the feature tracking algorithm is applied to frames 620 to generate CMOS feature tracks 640. According to various embodiments, at temporal alignment stage 645, a determination is made whether there are any CMOS feature tracks 640 which align temporally (e.g., were captured within an analogous temporal window) to DVS feature tracks 635. If there are DVS feature tracks 635 which terminate at timestamps to CMOS feature tracks 640 satisfying predetermined proximity criteria, then the DVS feature tracks 635 are grouped with the CMOS feature tracks 640 to create hybrid feature tracks 650.

In various embodiments according to this disclosure, spatial alignment 655 may be performed on DVS feature tracks 635 or the DVS components of hybrid feature tracks 650, before they are provided to a visual-inertial SLAM pipeline 660 (for example, visual-inertial SLAM pipeline 525 in FIG. 5).

According to certain embodiments, where the DVS sensor(s) and CMOS image sensor of a mobile platform have different focal lengths or resolution, spatial alignment 655 includes determining a scale factor to apply to provide a common scale for CMOS feature tracks 640 and DVS feature tracks 635, thereby aligning the CMOS and DVS components of hybrid feature tracks 650 in the image space of visual-inertial SLAM pipeline 660. For a given set of focal lengths (f) and resolutions (w), a scale factor (s) can be calculated as:

$$s = \frac{f_{DVS} \times w_{DVS}}{f_{CMOS} \times w_{CMOS}} \quad (1)$$

According to certain embodiments, where the CMOS image sensor is significantly offset from the DVS image sensor (for example, in mobile platforms with stereoscopic DVS sensors), spatial alignment 655 further entails correcting for the offset in viewing position between the CMOS image sensor and DVS image sensor(s).

Figure 7:
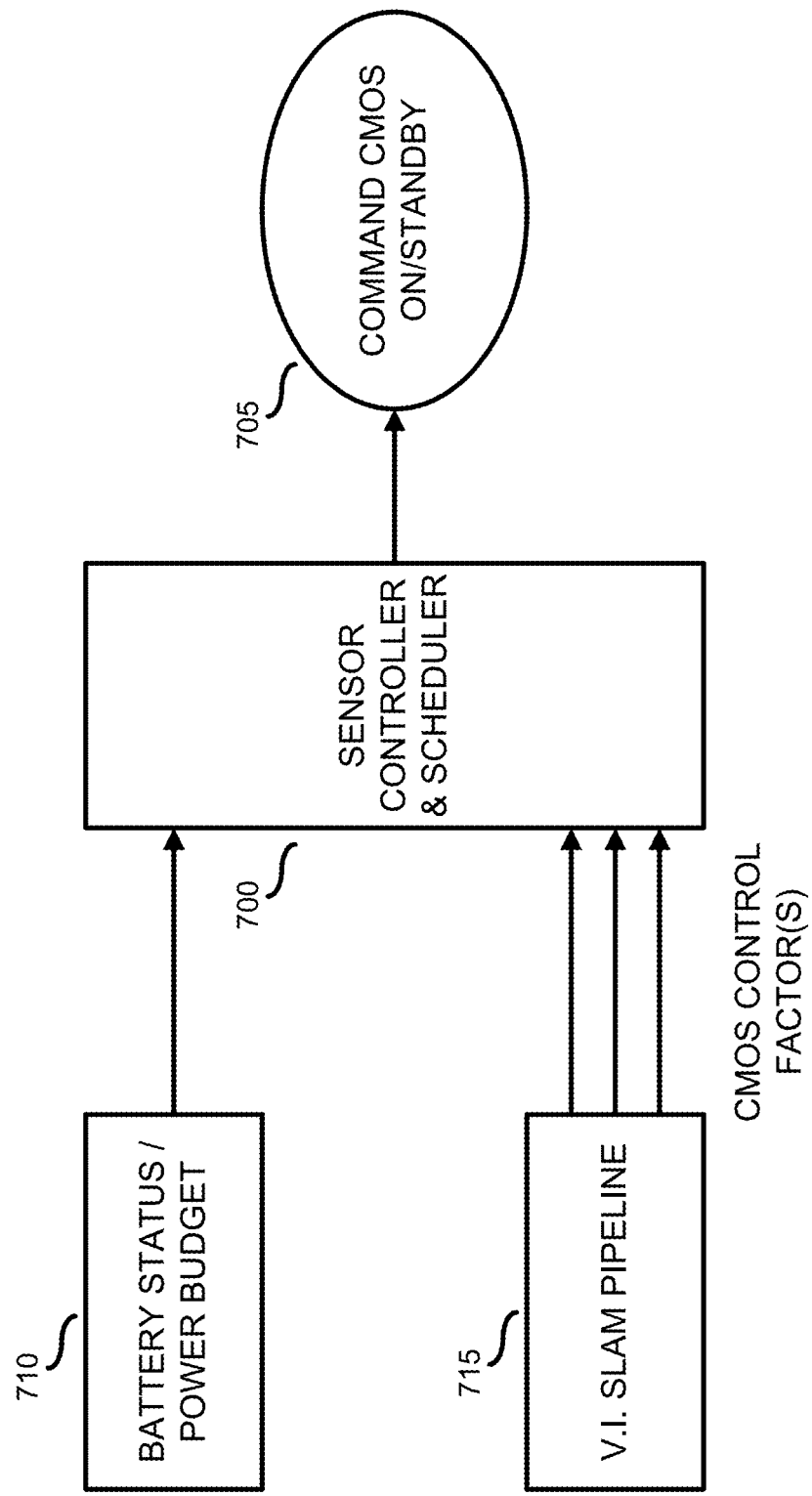
FIG. 7 illustrates aspects of the operation of a sensor controller and scheduler, according to certain embodiments of this disclosure.

FIG. 7 illustrates aspects of the operation of a sensor controller and/or scheduler 700 (for example, sensor controller/scheduler 540 in FIG. 5) according to certain embodiments. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

As discussed elsewhere in this disclosure, one of the technical challenges associated with implementing CMOS-assisted inside-out tracking and semantic mapping for augmented reality on a low-power platform is managing the tradeoff between utilizing a DVS sensor to obtain additional scene feature information for a more robust world understanding, and minimizing power consumption to extend battery life and minimize heat buildup. According to certain embodiments, sensor controller and/or scheduler 700 implements control logic for regulating the operation of a CMOS image sensor (for example, CMOS image sensor 510 in FIG. 5) by issuing "CMOS On" and "CMOS Standby" (or "CMOS Inactive", "CMOS Off", etc.) commands 705.

Referring to the example of FIG. 7, sensor controller and/or scheduler 700 receives, as inputs, battery status and power budget information 710, which, as described herein, operate as factors for controlling the on/standby state of a CMOS image sensor. Sensor controller and scheduler 700 also receives, as factors for controlling the on/standby state of the CMOS, information 715 from a visual-inertial SLAM pipeline (for example, information indicating a current number of feature tracks determined from the DVS sensor data). In certain embodiments, sensor controller and scheduler 700 processes the received inputs and outputs commands 705 for controlling the power consumption state of the CMOS sensor. At a macro-level, battery status and power budget information 710 informs sensor controller and scheduler 700 of how much power is, and will be, available for generating sensor data to be provided to the visual-inertial SLAM pipeline, and the information 715 from the visual-inertial SLAM pipeline informs sensor controller and scheduler 700 of the extent to which visual-inertial SLAM pipeline needs, or is expected to need CMOS image sensor data.

According to certain embodiments, battery status and power budget information 710 comprises, at a minimum, battery status information and information indicating a power budget for the mobile platform. In the non-limiting example of FIG. 7, the battery status represents the amount of charge remaining in the mobile platform's battery (for example, battery 199 in FIG. 1). According to various embodiments, the battery status is expressed as a value of b, which is a continuous variable representing the extent to which the battery is charged (for example, b=1 when the battery is fully charged, and b=0 when there is no battery left). In some embodiments, the power budget is as setting which a user (for example, user 301 in FIG. 3) or the system can adjust to regulate how much energy (for example, X mW, where X is a numerical value) the sensors feeding a visual-inertial SLAM pipeline can consume at any one time.

Referring to the non-limiting example of FIG. 7, information 715 from the visual-inertial SLAM pipeline comprises, at a minimum, information regarding the initialization state of the visual-inertial SLAM pipeline, and one or more representations of a current tracking accuracy of the visual-inertial SLAM pipeline. In certain embodiments, the output of the CMOS image sensor is used to initialize the SLAM system (i.e., the visual-inertial SLAM pipeline), and the first few frames passed to the visual-inertial SLAM pipeline need to include CMOS image sensor data. Accordingly, in some embodiments, the initialization status of the visual-inertial SLAM pipeline is represented as the discrete variable t (e.g., t=0 when the visual-inertial SLAM pipeline is uninitialized, and t=1 when the pipeline is initialized).

In some embodiments according to this disclosure, information 715 from the visual-inertial SLAM pipeline comprises values associated with the current state of variety of factors associated with the current tracking accuracy of a visual-inertial SLAM pipeline, including without limitation, a number of features currently being tracked, a value of a visual-inertial SLAM optimization function, magnitude of the outputs of an IMU (for example, IMU 520 in FIG. 5) and a quantification of blur found in the output of the CMOS image sensor. According to certain embodiments, a representation of a confidence value c in the accuracy of the tracking performed by the visual-inertial SLAM pipeline is represented as a vector f of two or more the above mentioned factors, and the values of c for given f vectors are determined based on a predictive model applied by sensor controller and scheduler 700, wherein the predictive model maps the feature vector f to values of tracker confidence c.

In certain embodiments, the predictive model associating the vector of factors f and a predicted confidence value c can be populated using a number of possible techniques, such as linear regression, or machine learning techniques, such as neural networks, random forests, support vector machines (SVM) or boosting. According to some embodiments, each of the above-described machine learning models can utilize a number of parameters, which can be learned from training data. In various embodiments, the training data is collected by running a mobile platform implementing the visual-inertial SLAM pipeline in a controlled environment where its location and pose can be determined with relatively trustworthy accuracy, such as in a motion capture system, or an environment implementing "outside-in" device tracking. During the training period the input data to the visual-inertial SLAM pipeline is known, and serves as a ground truth against which the calculated values of the pose and position output by the visual-inertial SLAM pipeline can be compared to identify the parameters associated with error in the output of the visual-inertial SLAM pipeline. According to various embodiments, the parameters of the trained predictive model are stored in a memory (for example, memory 160 in FIG. 1) of the device for use by sensor controller and scheduler 700.

According to various embodiments, sensor controller and scheduler 700 switches the CMOS sensor on and off in response to the CMOS control factors by passing the values of the factors for controlling the power state of the CMOS sensor through a non-linear function of the form set forth in Equation 2 below:

$$p(\bullet) = \sigma(\Sigma_i(w_i \times f_i)) \quad (2)$$

Where $f_i$ is the $i^{th}$ factor for controlling the power state of the CMOS sensor, and $w_i$ is a weighting assigned to $f_i$, and p is a contextually dependent probability associated with the need to turn the CMOS image sensor on to ensure the robustness of the output of the visual-inertial SLAM pipeline relative to the need to conserve battery resources. As described in further detail with respect to the example of FIG. 8 of this disclosure, when sensor controller and scheduler 700 determines that the value of p exceeds a predetermined threshold, sensor controller and scheduler 700 issues a command 705 to switch the CMOS image sensor on. Similarly, when sensor controller and scheduler 700 determines that the value of p has fallen below the predetermined threshold, sensor controller and scheduler 700 issues a command 705 to return the CMOS image sensor to a standby state.

According to certain embodiments, in addition to turning on the CMOS controller when the value of p exceeds the predetermined threshold, sensor controller and scheduler 700 may also turn on the CMOS image sensor periodically to obtain image data for semantic segmentation.

Figure 8:
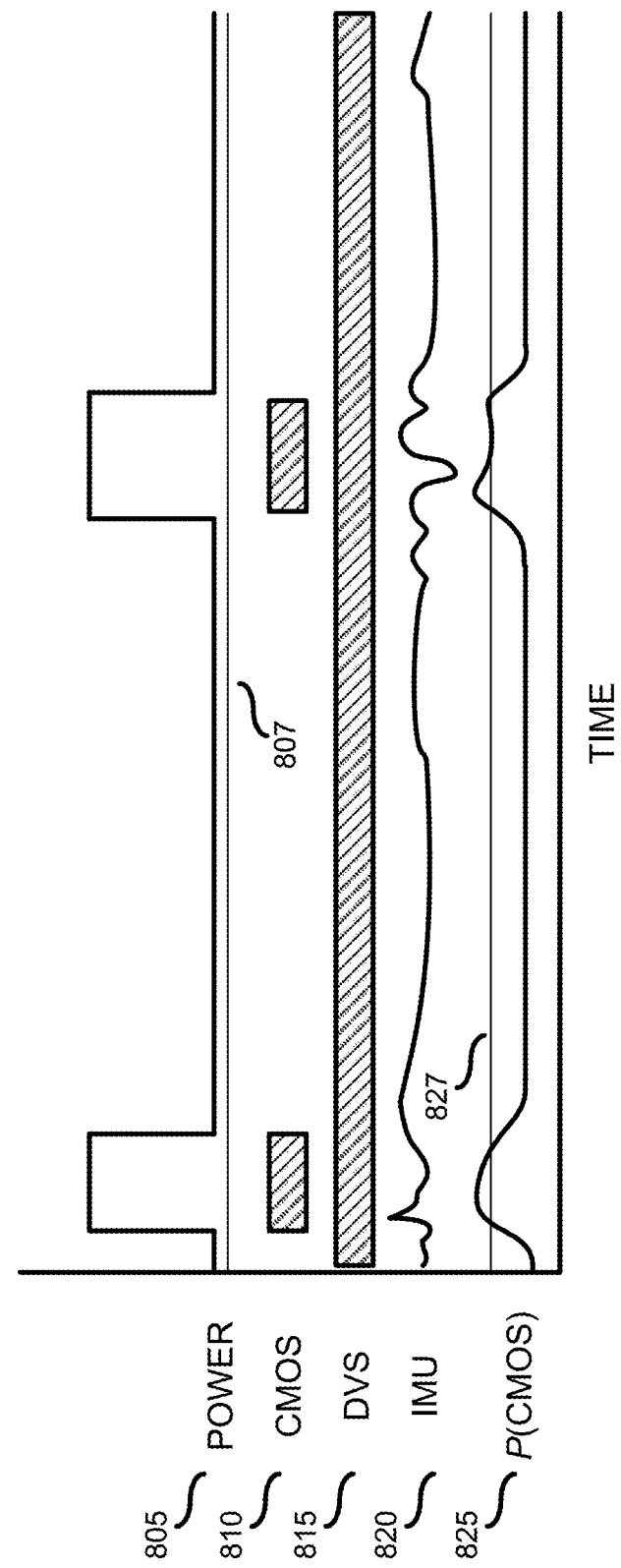
FIG. 8 illustrates an example of the values of certain operational parameters of a low-power mobile platform implementing CMOS-assisted inside-out DVS tracking over time, according to certain embodiments of this disclosure.

FIG. 8 illustrates an example 800 of values of certain operational parameters of a low-power mobile platform implementing CMOS-assisted inside-out DVS tracking over time, according to various embodiments of this disclosure. The graph 800 shown in FIG. 8 is for illustration only and other graphs having different values could be used without departing from the scope of the present disclosure.

Referring to the example of FIG. 8, values of the following parameters over time are shown: mobile platform power consumption 805, CMOS image sensor on/off state 810, DVS sensor on/off state 815, MU sensor output 820, and P(CMOS) 825.

According to certain embodiments, P(CMOS) 825 comprises a probabilistic representation of the need to supply a virtual-inertial SLAM pipeline (for example, virtual-inertial SLAM pipeline 525 in FIG. 5) with image data from a CMOS sensor relative to the need to minimize power consumption on the mobile platform (for example, device 100 in FIG. 1 or low-power AR platform 305 in FIG. 3). As shown in this illustrative example, when the value of P(CMOS) 825 exceeds threshold 827, the CMOS image sensor on/off state 810 is in an "on" state. According to various embodiments, the value of P(CMOS) is determined by a sensor controller (for example, sensor controller and scheduler 700 in FIG. 7) on the mobile platform based on one or more CMOS control factors. In this illustrative example, the one or more CMOS control factors include the IMU sensor output 820. As shown in this explanatory example, for much of the period depicted in FIG. 8, IMU sensor output 820 is relatively flat, except for two periods which generally coincide with increased values of P(CMOS) and the "on" state of CMOS image sensor on/off state 810.

As shown in the non-limiting example of FIG. 8, the status box for DVS sensor on/off state 815 shows that the DVS sensor remains on throughout the period shown in FIG. 8. During the periods where only the DVS sensor is on, mobile platform power consumption 805 (shown relative to a zero value 807) is low, and surges during the periods when CMOS image sensor on/off state 810 shows the CMOS image sensor in the on state. Accordingly, by applying control logic to keep the CMOS image sensor in an "off" or "standby" state, certain embodiments according to this disclosure significantly improve the power efficiency of low-power mobile platforms, by reducing the power consumption by implementing CMOS-assisted inside-out DVS tracking on a mobile platform.

According to various embodiments, threshold 827 is dynamic and can be adjusted in response to changes in the power budget for the mobile platform, or in response to a power consumption history during runtime for the mobile platform. For example, if the value of P(CMOS) exceeds threshold 827 more than a certain number of times within a predetermined time interval, the CMOS sensor control logic (for example, sensor controller and scheduler 700 in FIG. 7) may determine that a higher value of threshold 827 is needed to ensure the power efficiency gains associated with intermittent CMOS assistance. As another illustrative example, the average power consumption of the system is tracked over a predetermined period of time (for example, a minute), and when the average power consumption over the tracking window exceeds the value of threshold 827, threshold 827 is adjusted upwards to keep the system within a power budget. Similarly, in some embodiments, where the average power consumption over the tracking window is significantly below threshold 827, threshold 827 may be revised downwards to allow for greater utilization of the CMOS sensor. Moreover, in some embodiments, threshold 827 can be static.

Figure 9:
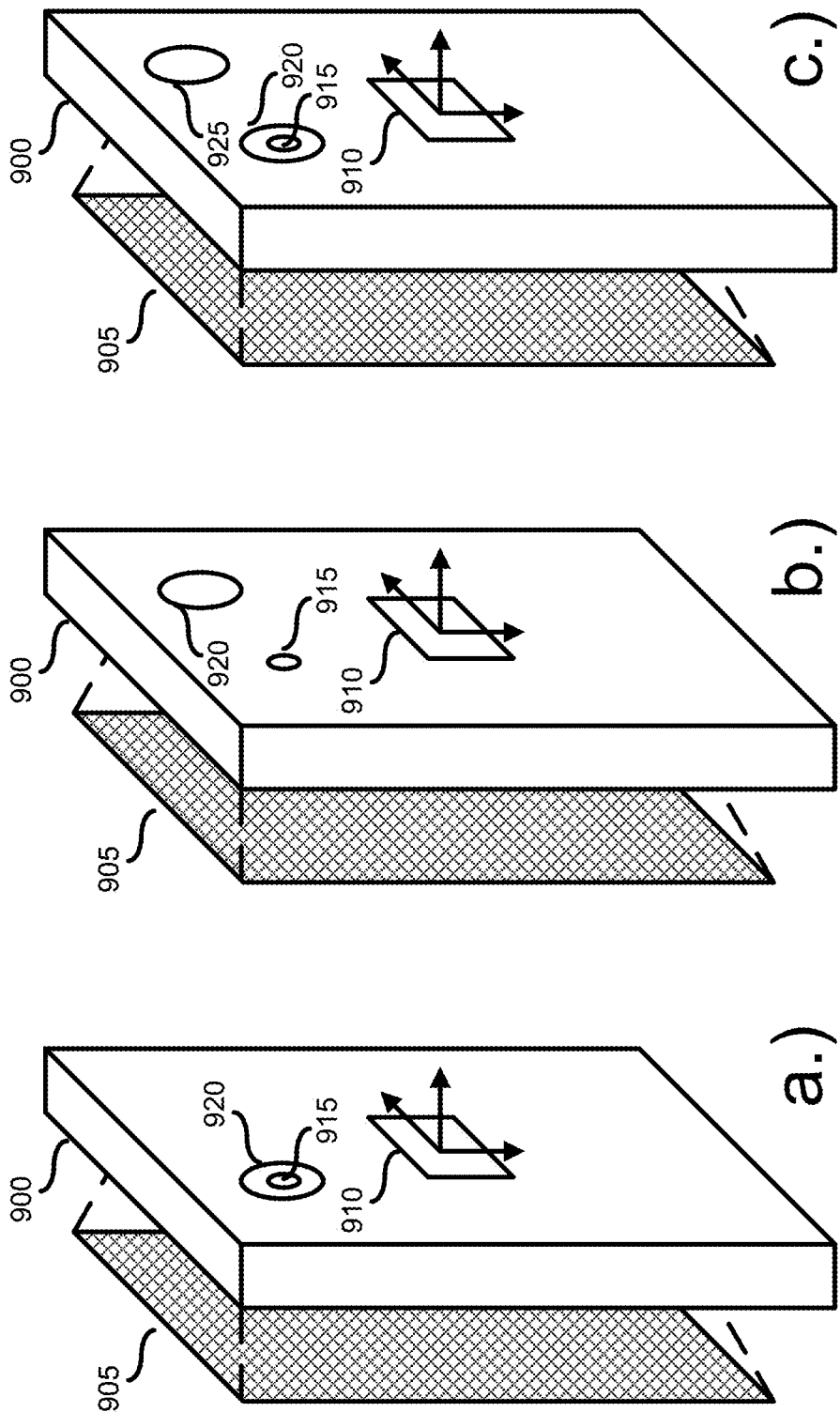
FIG. 9 illustrates examples of sensor hardware configurations for implementing CMOS-assisted inside-out DVS tracking and semantic mapping for augmented reality on a low-power mobile platform, according to certain embodiments of this disclosure.

FIG. 9 illustrates three examples (designated a-c) of sensor hardware configurations for implementing CMOS-assisted inside-out DVS tracking and semantic mapping for augmented reality on a low-power mobile platform 900. The examples shown in FIG. 9 are for illustration only and other examples could be used without departing form the scope of the present disclosure.

According to various embodiments, mobile platform 900 is an electronic device (for example, device 100 in FIG. 1) configured to receive, through at least one DVS sensor (for example, DVS sensor 400 in FIG. 4) and at least one CMOS image sensor (for example, CMOS image sensor 510 in FIG. 5) visual data from a field of view associated with a pose of the mobile platform and output a display 905 associated with the pose of the mobile platform comprising an item of AR content positioned within display 905 on an element of a stable semantic map. Put simply, in certain embodiments, mobile platform 900 provides an AR experience characterized by display 905 appearing as viewing window to the operating environment of mobile platform 900, through which a user sees the operating environment, as well as AR content placed in the display based on mobile platform 900's world understanding of the operating environment.

According to some embodiments, the sensor hardware of mobile platform 900 comprises an IMU 910 (for example, inertial measurement unit 520 in FIG. 5), which, in certain embodiments, provides time-stamped motion data for event frame synthesis of DVS sensor event data, image stabilization of CMOS sensor data, and/or information to assist the visual-inertial SLAM pipeline determine pose data (for example, camera pose data 530 in FIG. 5) for mobile platform 900.

As shown in the non-limiting example of FIG. 9, the sensor hardware of mobile platform 900 comprises a CMOS image sensor 915, which is configured to output frames of image data. According to certain embodiments, the image data from CMOS image sensor is used to assist in developing the visual-inertial SLAM pipeline to generate information associated with a world understanding of its operating environment (for example, scene geometry information 535 in FIG. 5). According to some embodiments, the sensor hardware of mobile platform 900 comprises a first DVS sensor 920, which remains in an always-on state while the visual-inertial SLAM pipeline is running, and obtains sensor event data from which DVS feature tracks (for example, DVS feature tracks 635), which can, where necessary, be spatially aligned to the output of CMOS image sensor 915 and provided to the visual-inertial SLAM pipeline. In some embodiments, such as the examples designated "a.)" and "b.)" CMOS image sensor 915 and first DVS sensor 920 can be provided on a common piece of hardware, and are co-located, or positioned sufficiently closely that their locations can be treated as equivalent by mobile platform 900 (for example, where there is no need to perform a parallax correction between their outputs). According to some embodiments, CMOS image sensor 915 and first DVS sensor 920 are spatially separated, and the difference in viewing position is corrected as part of generating hybrid feature tracks (for example, as part of spatial alignment 655 in FIG. 6). According to certain embodiments, such as in example "c.", the sensor hardware configuration of mobile platform 900 comprises a second DVS sensor 925, which, combination with first DVS sensor 920, form a stereo pair of DVS sensors, facilitating the determination of depth and distance information of tracked objects in the field of view of mobile platform 900.

Additional configurations of sensor hardware on mobile platform 900 beyond those described with reference to FIG. 9 are possible, and within the scope of the present disclosure. For example, according to some embodiments, mobile platform 900 may include one or more DVS sensors on the display side of mobile platform 900, to track objects which may be entering the field of view of one or more of first DVS sensor 920 or CMOS image sensor 915. Additionally, the one or more DVS sensors on the display side of mobile platform 900 may operate to track a user's gaze, or track faces for determining AR content to present to users as part of an AR experience.

Figure 10:
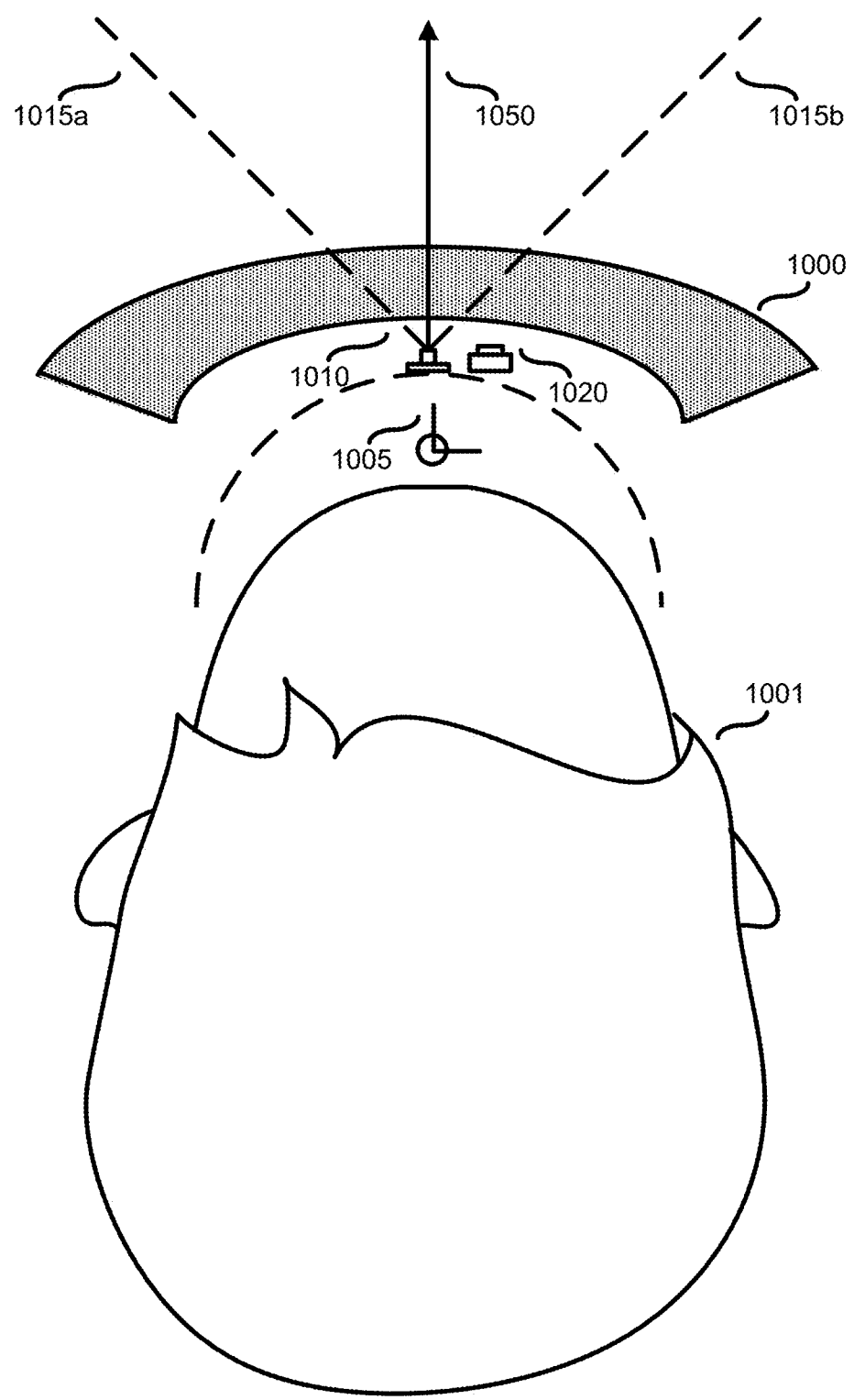
FIG. 10 illustrates examples of sensor hardware configurations for implementing CMOS-assisted inside-out DVS tracking and semantic mapping for augmented reality on a low-power mobile platform, according to certain embodiments of this disclosure.

FIG. 10 illustrates examples of sensor hardware configurations for implementing CMOS-assisted inside-out DVS tracking and semantic mapping for augmented reality on a low-power mobile platform 1000. The example shown in FIG. 10 is for illustration only and other examples could be used without departing form the scope of the present disclosure.

Referring to the example of FIG. 10, low-power mobile platform 1000 is a head mounted display (such as, for example, certain embodiments of device 100 in FIG. 1 or AR platform 305 in FIG. 3) configured to be worn on a user's head 1001 and provide the user with a view of the operating environment of mobile platform 1000 which includes one or more items of AR content rendered according to locations on a stable semantic map of the operating environment accessible to low-power mobile platform 1000.

According to certain embodiments, the sensor configuration of mobile platform 1000 includes an IMU 1005 (for example, MU 182 in FIG. 1). As shown in the non-limiting example of FIG. 10, IMU 1005 provides time-stamped motion data for event frame synthesis of DVS sensor event data, image stabilization of CMOS sensor data, and/or information to assist the visual-inertial SLAM pipeline determine pose data (for example, camera pose data 530 in FIG. 5) for mobile platform 1000.

In some embodiments, mobile platform 1000 includes a CMOS image sensor 1010 disposed along a centerline of the mobile platform 1000 and having a field of view comprising the angular area between first boundary 1015a and second boundary 1015b. As shown in the illustrative example of FIG. 1, CMOS image sensor 1010 is associated with an optical vector 1050, which is, in certain embodiments, is a vector whose coordinates in a three-dimensional ("3D") coordinate system can indicate or be used to determine the current pose of mobile platform 1000.

Referring to the non-limiting example of FIG. 10, according to various embodiments, mobile platform 1000 comprises a DVS sensor 1020, which provides an always-on source of image data for tracking features of the operating environment of mobile platform 1000. According to certain embodiments, the output of DVS sensor 1020 is combined with an intermittently-generated output of CMOS image sensor 1010 to generate hybrid feature tracks (for example, hybrid feature tracks 650 in FIG. 6) to be provided to a visual-inertial SLAM pipeline (for example, visual-inertial SLAM pipeline 660 in FIG. 6).

Figure 11:
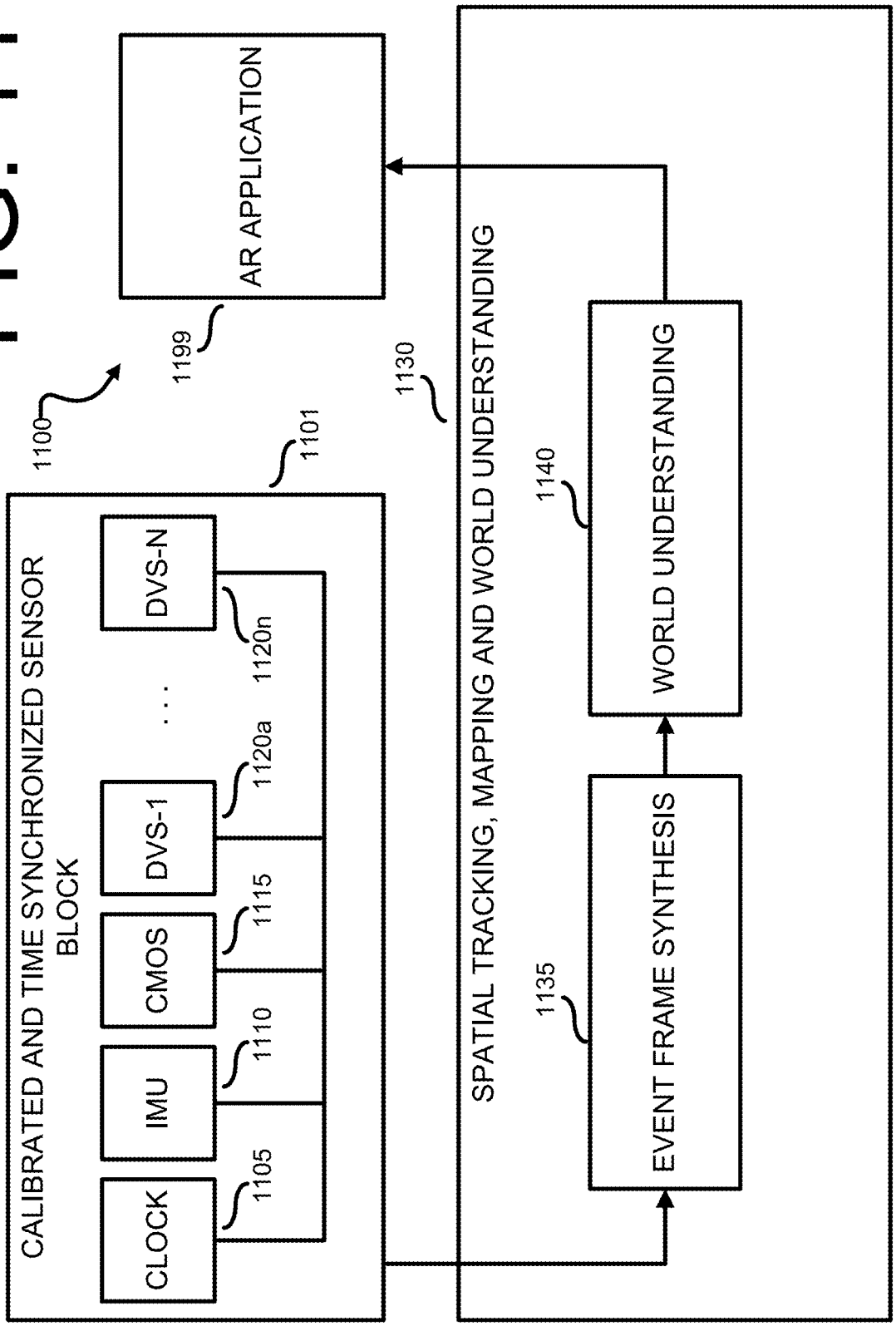
FIG. 11 illustrates an example of a system pipeline for performing CMOS-assisted inside-out DVS tracking on a mobile platform, according to certain embodiments of this disclosure.

FIG. 11 illustrates an example of a system pipeline 1100 for performing CMOS-assisted inside-out DVS tracking on a mobile platform (for example, certain embodiments of mobile platform 900 in FIG. 9) comprising a plurality of DVS sensors (for example, DVS sensor 400 in FIG. 4) according to various embodiments of this disclosure. The embodiment of the pipeline 1100 shown in FIG. 11 is for illustration only and other embodiments could be used without departing form the scope of the present disclosure.

According to certain embodiments, the efficiency gains associated with CMOS-assisted (as opposed to using an always-on CMOS sensor) inside-out device tracking can be extended by equipping the mobile platform with a plurality of DVS sensors with overlapping fields of view. With multiple DVS sensors, tracked DVS features (for example, feature points tracked to generate DVS feature tracks 635 in FIG. 6) can be tracked as they move from the field of view of one DVS sensor to the next. By contrast, in certain embodiments utilizing only a single DVS sensor, if a feature point moves out of the field of view of the DVS sensor, it is lost, and a feature handler (for example, hybrid feature handler 515 in FIG. 5) needs to re-detect the feature point, which is not only computationally expensive, but can also increase the utilization of the CMOS image sensor, in embodiments in which the number of tracked features is a CMOS control factor.

Additionally, by providing a mobile platform with a plurality of DVS sensors, the robustness of pose data (for example, camera pose data 530 in FIG. 5) and scene geometry data (for example, scene geometry data 535 in FIG. 5) output by a visual-inertial SLAM pipeline running on the mobile platform is improved in operating environments with highly variable distributions of trackable features. As an illustrative example of such an environment, consider a hypothetical four sided room in an art gallery in which three of the walls are, to maintain a museum-appropriate aesthetic, smooth and painted white, while a painting or other source of feature points hangs on the fourth wall. In such an operating environment where three of the four walls look identically featureless, the robustness of the output of a visual-inertial SLAM pipeline fed by a single DVS sensor drops whenever the single DVS sensor looks away from the fourth wall. By contrast, in embodiments where the mobile platform has a plurality of DVS sensors with different, but overlapping fields of view, the visual-inertial SLAM pipeline is more consistently provided image data from the fourth wall of the hypothetical room.

According to various embodiments, system platform 1100 can be implemented as part of a wide range of end-devices, including, without limitation, a head-mounted display (for example, AR platform 305 in FIG. 3), a drone, a smartphone, a tablet, or an electronic toy. In some embodiments, each of the above-described devices can leverage the computational savings and tracking robustness associated with providing a visual-inertial SLAM pipeline with image data (for example, DVS sensor event data, DVS synthesized-frame "image" data, DVS "image" frame data, etc.) from multiple DVS sensors. As an illustrative example, consider a drone executing a maneuver causing the drone to pitch upward relative to the plane of the ground (for example, simultaneously ascending and accelerating backwards). During such a maneuver, a significant portion of the drone's field of view may face upwards, towards a blue sky. While the sight of the blue sky is, from a drone pilot's perspective, a helpful indicia of the drone's direction of travel, a blue sky is a poor source of feature points for tracking. By providing the drone with a plurality of DVS sensors across a range of viewing angles, the drone's ability to perform inside-out DVS device tracking during pitching maneuvers is enhanced, as there is a greater probability of a DVS sensor capturing image data from the ground or other feature-rich regions away from the sky.

Referring to the non-limiting example of FIG. 11, in certain embodiments, system pipeline 1100 comprises sensor block 1101, wherein the individual sensors of sensor block 1101 are configured to assign time stamps to their respective outputs which are synchronized and calibrated to reference clock 1105. According to certain embodiments, reference clock 1105 is a tick counter.

As shown in the illustrative example of FIG. 11, sensor block 1101 further comprises inertial measurement unit (IMU) 1110 which provides time-stamped motion data for event frame synthesis of DVS sensor event data, image stabilization of CMOS sensor data, and information to assist in determining pose data (for example, camera pose data 530 in FIG. 5) which can, for example be consumed by AR application 1199. Additionally, sensor block 1101 comprises a CMOS image sensor 1115 (for example, CMOS image sensor 915 in FIG. 9), which can intermittently (for example, under the control of sensor controller and scheduler 700 in FIG. 7) provide a visual-inertial SLAM pipeline image data to assist with inside-out tracking. Further, as shown in the explanatory example of FIG. 11, sensor block 1101 further comprises a plurality of DVS sensors, DVS-1 (1120a) through DVS-N (1120n). According to various embodiments, N is an integer having a value of two or greater and selected based on, at least in part, a required degree of tracking robustness for a specified AR application and the power resources of the mobile platform.

According to some embodiments of this disclosure, system pipeline 1100 comprises a spatial tracking, mapping and world understanding pipeline 1130, which provides the outputs of the constituent sensors of sensor block 1101 to an event frame synthesis pipeline 1135. In some embodiments according to this disclosure, event frame synthesis pipeline 1135 processes the output of DVS sensors in real time to convert the asynchronous streams of sensor event data from DVS sensors 1120a through 1120n into spatial histograms of events (also referred to herein as "frames" or "event frames") with sharp edge structures from which features within the spatial histograms can be accurately tracked.

Referring to the non-limiting example of FIG. 11, the event frames generated by event frame synthesis pipeline 1135 are output to a world understanding pipeline 1140. According to various embodiments, world understanding pipeline 1140 is a processing pipeline (or system of processing pipelines) which processes event frame and other data to obtain a representation of the operating environment of the mobile platform implementing system pipeline 1100 which can be utilized by AR application 1199 to control the positional behavior of visual assets of an AR experience provided by AR application 1199. According to various embodiments, world understanding pipeline 1140 performs at least one of generating feature tracks (for example, hybrid feature tracks 650 in FIG. 6), determining the pose of the mobile platform, generating data regarding the geometry of the operating environment of the mobile platform (for example, by generating camera pose data 530 and/or scene geometry data 535 in FIG. 5), or outputting a digital representation of the world understanding to AR application 1199. In some embodiments, for example, embodiments in which heat buildup or battery life are secondary considerations, the digital representation of the world understanding may be large and data-intense, such as a point cloud of labeled and tracked features of the operating environment of the mobile devices. In certain embodiments, for example, embodiments where minimizing power consumption and facilitating a collaborative AR experience are primary considerations, a more compact digital representation of the world understanding, such as a stable semantic map may be output to AR application 1199.

Figure 12:
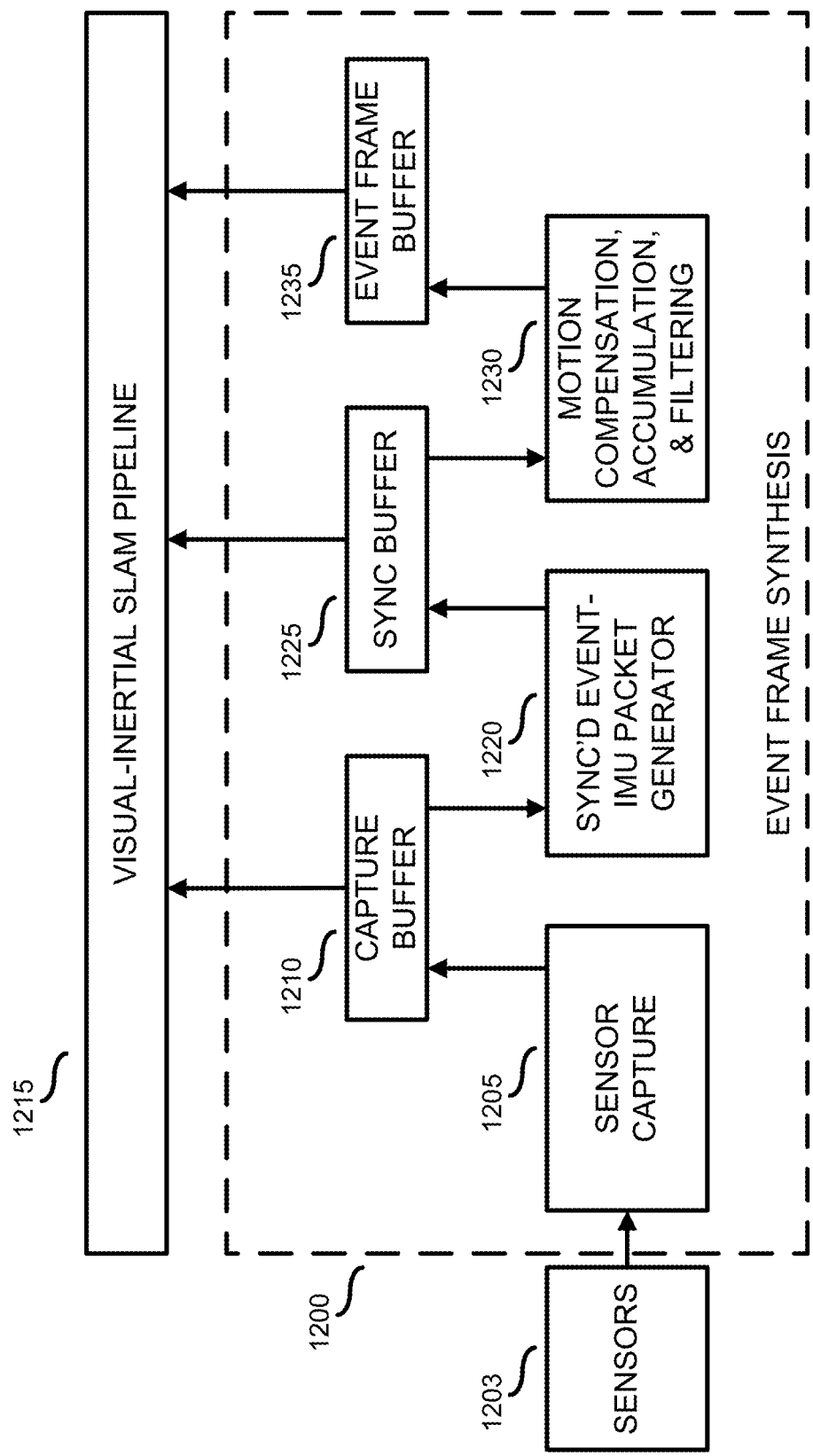
FIG. 12 illustrates an example of an event frame synthesis pipeline for real-time processing outputs of a plurality of DVS sensors, according to certain embodiments of this disclosure.

FIG. 12 illustrates an example of an event frame synthesis pipeline 1200 for real-time processing of the outputs of a plurality of DVS sensors (for example, DVS sensors 1120a through 1120n in FIG. 11) according to some embodiments of this disclosure. As noted elsewhere in this disclosure, in certain embodiments, the output of a DVS sensor is an asynchronous event stream. In many cases, in order to generate sharp, edge like-images which can be used for positional tracking and mapping in a mobile AR platform (for example, AR platform 305 in FIG. 3), DVS sensor events must be aggregated over a space-time interval to generate a spatial histogram, or event-frame histogram. In some embodiments, the temporal size of the space-time interval (also referred to herein as a "sliding time window") needs to be adjusted, or predetermined relative to the operational conditions of the mobile platform to ensure the production of sharp, edge-like images.

In some cases, if the temporal size of the space-time interval is too small, edge structures may appear thin. By the same token, if the temporal size of the space-time interval is too large, edge structures may appear blurry, particularly when the one or more DVS sensors are experiencing fast rotational motion. In such cases, motion correction based on IMU data may need to be applied to the DVS sensor events to reduce blur and sharpen edges. According to certain embodiments, event frame synthesis pipeline 1200 addresses these issues and provides an algorithm which can process, in real-time, over six million DVS sensor events per second, to produce motion-compensated event frames.

Referring to the non-limiting example of FIG. 12, event frame synthesis pipeline 1200 can, in some embodiments, be implemented as hardware (for example, as a dedicated chip, or through a field-programmable gate array ("FPGA")). In various embodiments, event frame synthesis pipeline 1200 can be implemented as software running on a device (for example, device 100 in FIG. 1), or as a combination of software or hardware.

In certain embodiments, sensor capture module 1205 receives the outputs of a set of sensors 1203 which includes one or more DVS sensors (for example, the sensors of sensor block 1101 in FIG. 11) and stores them in a capture buffer 1210 implemented on a memory of a mobile AR platform (for example, device 100 in FIG. 1), which makes one or more pieces of sensor data, such as time-stamped IMU data available to visual-inertial SLAM pipeline 1215. Further, the buffered sensor event data is passed from capture buffer 1210 to synchronized DVS event/IMU packet generator to generate time-synchronized event-IMU packets.

In certain embodiments, motion correction of DVS sensor events can be performed by collecting a set of DVS sensor events across a reference time frame and calculating an individual transformation to "warp" (or correct, based on IMU data) each event to the reference time frame. However, depending on the number of DVS sensors and volume of data, this approach does not necessarily scale well. Accordingly, to facilitate scalability in the motion compensation of DVS sensor, in certain embodiments according to this disclosure, synchronized event-MU packet generator 1220 creates packets of DVS sensor events to which the same motion-compensation transformation can be applied.

As shown in the non-limiting example of FIG. 12, synchronized DVS event/IMU packet generator 1220 creates time-synchronized event-IMU packets which contains DVS sensor events $e \in \mathfrak{E}$ whose timestamps span the interval between two adjacent IMU messages at times $t_0$ and $t_1$. For each event-IMU packet, a single transformation to time $t_1$ (assuming a pure rotation of $R_j$), around the optical axis of the DVS sensor generating the event packet, can be calculated by midpoint-integrating the IMU-measurements.

According to various embodiments, time synchronized DVS event/IMU packets generated by synchronized DVS event/IMU packet generator 1220 are stored in sync buffer 1225, where they are available to visual-inertial SLAM pipeline 1215 and compensation, accumulation and filtering module 1230. In the non-limiting example of FIG. 12, synchronized DVS event/IMU packet generator 1220 packetizes DVS sensor events such that, for the set of DVS events within a packet, a single transformation to time $t_1$ (assuming a pure rotation, $R_j$), around the optical axis of the DVS sensor generating the event packet, can be calculated by midpoint-integrating the IMU-measurements. Given $R_j$, (which, in certain embodiments, is a rotational matrix based on time-stamped IMU data) compensation, accumulation and filtering module 1230 calculates a homographic transformation for each event-MU packet to create a superset of motion-compensated DVS event packets which can be accumulated over a sliding time window to generate event-frame histograms which are ready for further processing by visual inertial SLAM pipeline 1215.

According to certain embodiments, compensation, accumulation and filtering module 1230 calculates the homographic transformation H of each event packet based on the rotational matrix $R_j$.

As an illustrative example, consider two DVS sensor events e and $e_j$ associated with the same scene point X—before and after a pure rotation $R_j$ around the optical axis of the DVS sensor. Applying the pinhole camera assumption and ignoring any lens distortions in the DVS sensor, the DVS sensor event's position on the image plane in homogeneous coordinates is, in certain embodiments, $e \cong KX$, and $e_j \cong KR_jX$, where indicates equality up to an unknown scale factor, and K is the matrix of camera intrinsic parameters. Accordingly, it follows that $e_j = KR_jK^{-1}e$, or $e_j = H_je$, where $H_j = KR_jK^{-1}$. Thus, from the IMU-calculated rotation matrix, compensation, accumulation and filtering module 1230 can obtain a homography $H_j$ which it uses to warp packets of DVS sensor events, rather than discrete DVS sensor events.

In some embodiments according to this disclosure, compensation, accumulation and filtering module 1230 pre-warp several packets at once to the latest time in the packet-set, and store the resulting sparse partial histogram in a cache. Each pre-warped partial histogram may be accumulated as a 2D array generated based on Equation 3, below:

$$I_p(u) = \Sigma_j \Sigma_k \delta(u - u'_{jk}), \quad (3)$$

Where $u'_{jk}$ is the warped event 'k' in packet 'j' using homography $H_j$, and $\delta$ is an indicator function which is unity when $u=u'$, and zero otherwise.

According to various embodiments, to facilitate the creation of event frames with sharp edges at a high frame rate, motion-compensated (for example, by applying the above-described homographic transformation of time synchronized event-IMU packets) compensation, accumulation and filtering module 1230 accumulates DVS event packets over a sliding time window which is determined to accumulate a target number (E) of events in a spatial histogram, or event-frame histogram. In certain embodiments, compensation, accumulation and filtering module 1230 applies noise filtering and scaling corrections to the event-frame histogram, which can effect slight changes in the number of DVS sensor events in the event-frame histogram. Thus, post-filtering and scaling, the number of DVS sensor events in a given event-frame histogram is ~E.

Referring to the non-limiting example of FIG. 12, compensation, accumulation and filtering module 1230 applies a spatial histogram filter to remove noise artifacts in the event-frame. In certain embodiments, the spatial histogram filter removes one or more DVS sensor events with a small frequency count and DVS sensor events with no spatial neighbors. According to certain embodiments, For the latter, compensation, accumulation and filtering module 1230 convolves I(u), with a neighbor counting kernel K=[1 1 1; 1 0 1; 1 1 1].

According to various embodiments, compensation, accumulation and filtering module 1230 combines and thresholds the result of the above-described convolution to form a binary mask used to filter noisy events. Referring to the non-limiting example of FIG. 12, compensation, accumulation and filtering module 1230 obtains a spatial histogram (e.g., a filtered event-frame based on Equation 4 below:

$$\hat{I}(u) := [(I(u) > C_1) \circ ((K * I(u)) > C_2)] \circ I(u) \quad (4)$$

Setting the constants $C_1=1$, $C_2=3$, has been shown, in certain embodiments, to reliably remove unwanted artifacts without eating into scene edges. In certain embodiments, the spatial histogram $\hat{I}$ is scaled and clipped to form an event-frame which is passed to event frame buffer 1235, where it can be obtained and further processed by visual-inertial SLAM pipeline 1215.

Figure 13C:
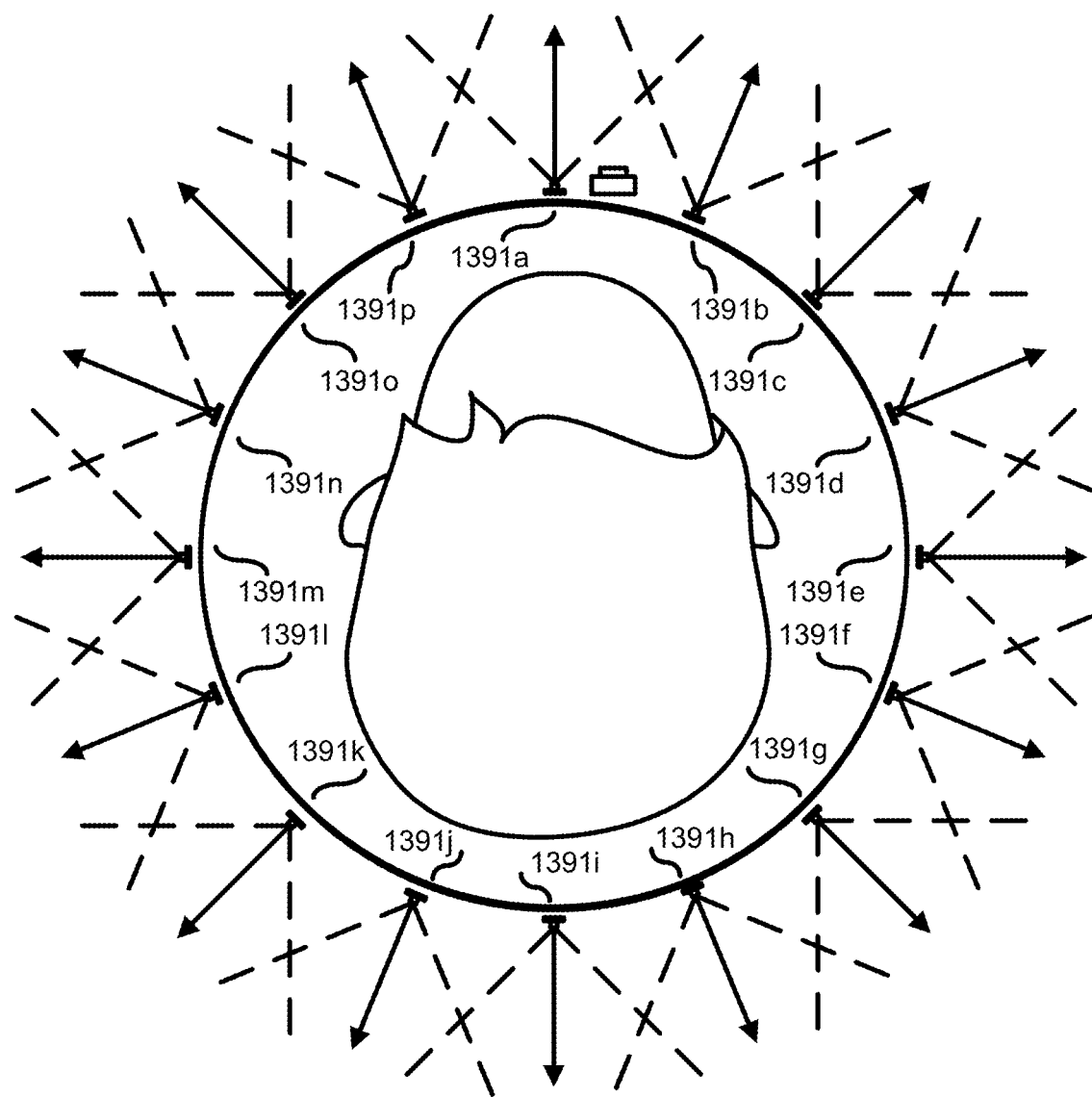

FIGS. 13A, 13B and 13C illustrate examples of hardware configurations for mobile platforms for implementing CMOS-assisted inside-out tracking utilizing multiple DVS sensors, according to some embodiments of this disclosure. The examples shown in FIGS. 13A through 13C are for illustration only and other examples could be used without departing from the scope of the present disclosure.

Referring to the non-limiting example of FIG. 13A, a first example of a device (for example, device 100 in FIG. 1 or AR platform 305 in FIG. 3) operating as a mobile platform 1300 for performing inside-out DVS tracking is shown on the left side of FIG. 13A. According to certain embodiments, mobile platform 1300 implements a pipeline (for example, spatial tracking, mapping and world understanding pipeline 1130 in FIG. 11) for converting visual sensor information (for example, events from one or more DVS sensors or image frames output from a CMOS image sensor) for generating a digital representation of a world understanding which can be used, for example, to determine the positional properties (for example, location, size and viewing angle) of visual assets inserted in an AR display presented by mobile platform 1300 to viewer 1301.

As shown in the illustrative example of FIG. 13A, mobile platform 1300 comprises an IMU sensor 1305, which detects and measures the direction and magnitude of the angular and transverse motion of mobile platform 1300. Mobile platform 1300 further comprises at least one CMOS image sensor 1310 covering a field of view that overlaps that of first DVS sensor 1315 and second DVS sensor 1320. According to various embodiments, CMOS image sensor 1310 operates under the control of a sensor controller and scheduler (for example, sensor controller and scheduler 700 in FIG. 7) to operate intermittently, or only as needed, to supplement the image data obtained from first DVS sensor 1315 and second DVS sensor 1320.

In certain embodiments according to this disclosure, the accuracy of the output of a visual-inertial SLAM pipeline implemented on mobile platform 1300 can be extended by using multiple DVS sensors (for example, first DVS sensor 1315 and second DVS sensor 1320). Referring to the non-limiting example of FIG. 13A, first DVS sensor 1315 forms one half of a DVS stereo pair with second DVS sensor 1320. As shown by the illustrative example of FIG. 13A, first DVS sensor 1315 is associated with a first optical angle 1316, and second DVS sensor 1320 is associated with second optical angle 1321, and first optical angle 1316 and second optical angle 1321 are parallel. Further, the field of view of first DVS sensor 1315 overlaps with the field of view of second DVS sensor 1320. As such, mobile platform 1300 is able to track a feature (for example, feature 1330) across the region of overlap between the fields of view of first DVS sensor 1315 and second DVS sensor 1320. By simultaneously tracking feature 1330 across two views with parallel optical axes, mobile platform 1300 can generate depth estimation data associated with feature 1330, which can be provided to a visual-inertial SLAM pipeline, thereby enhancing the spatial precision of inside-out CMOS-assisted DVS tracking on mobile platform 1300.

Referring to the example of FIG. 13A, a second example of a device (for example, device 100 in FIG. 1 or AR platform 305 in FIG. 3) operating as a mobile platform 1350 for performing inside-out DVS tracking is shown on the right side of FIG. 13A. According to certain embodiments, mobile platform 1300 implements a pipeline (for example, spatial tracking, mapping and world understanding pipeline 1130 in FIG. 11) for converting visual sensor information (for example, events from one or more DVS sensors or image frames output from a CMOS image sensor) for generating a digital representation of a world understanding which can be used, for example, to determine the positional properties (for example, location, size and/or viewing angle) of visual assets inserted in an AR display presented by mobile platform 1350 to viewer 1351.

As shown in the illustrative example of FIG. 13A, mobile platform 1350 comprises an IMU sensor 1355, which detects and measures the direction and magnitude of the angular and transverse motion of mobile platform 1350. Mobile platform 1350 further comprises at least one CMOS image sensor 1360 covering a field of view that includes, at a minimum, that of a first DVS sensor 1365. According to various embodiments, CMOS image sensor 1360 operates under the control of a sensor controller and scheduler (for example, sensor controller and scheduler 700 in FIG. 7) to operate intermittently, or only as needed, to supplement the image data obtained from first DVS sensor 1365.

In certain embodiments according to this disclosure, the power efficiency of an visual-inertial SLAM pipeline implemented on mobile platform 1350 can be extended by using multiple DVS sensors (for example, first DVS sensor 1365, second DVS sensor 1370, and third DVS sensor 1375). Referring to the non-limiting example of FIG. 13A, each of first DVS sensor 1365, second DVS sensor 1370 and third DVS sensor 1375, are disposed on mobile platform 1350 at locations associated with first optical angle 1366, second optical angle 1371 and third optical angle 1376, respectively. As shown in the illustrative example of FIG. 13A, optical angles 1366, 1371 and 1376 are not parallel, but rather, associated with three overlapping fields of view covering an approximate angular distance of 180 degrees. Accordingly, mobile platform 1350 is able to track a feature (for example, feature 1380) across the region of overlap between the fields of view of first DVS sensor 1365 and third DVS sensor 1375. By simultaneously tracking feature 1380 in an area of overlap in the fields of view of two DVS sensor, mobile platform 1300 can track feature 1380 as it moves into a portion of the field of view of third DVS sensor 1375 which does not overlap with the field of view of first DVS sensor 1365, without having to reacquire, or re-detect feature 1380. As feature detection can, in certain embodiments, be computationally expensive, avoiding re-detection by providing mobile platform 1350 with multiple DVS sensors with overlapping views, translates, in at least some embodiments, to reducing the power consumption associated with implementing inside-out tracking on mobile platform 1350.

Specifically, in certain embodiments, feature 1380 can be tracked as it moves from a region covered by first DVS sensor, through a region of overlap between first DVS sensor 1365 and third DVS sensor 1375 to a region only covered by third DVS sensor 1375 by assigning an estimated position of feature 1380 in a three-dimensional space. According to various embodiments, since the geometry (for example, the physical spacing and the angle between first optical angle 1366 and third optical angle 1376) are known, mobile platform 1350 can test whether feature point 1380 is visible in the field of view of DVS sensors adjacent to first DVS sensor 1365 (for example, third DVS sensor 1375) by, for example, checking whether feature point 1380 lies within a region of overlap in a view frustum (for example, the three dimensional region of an operational environment visible to a camera) of first DVS sensor 1365 and third DVS sensor 1375. Where feature 1380 falls in the view frustum of first DVS sensor 1365 and third DVS sensor 1375, a visual-inertial SLAM pipeline tracks the feature based on the outputs of both the first DVS sensor 1365 and the third DVS sensor 1375. This way, when feature 1380 falls out of the view frustum of first DVS sensor 1365, it is already being tracked with data from third DVS sensor, and thus, does not need to be re-acquired.

While FIG. 13A describes an example of a mobile platform of with a DVS stereo pair, and an example of a mobile platform with three overlapping DVS sensors, embodiments according to this disclosure are not limited to the examples provided in FIG. 13A. The improvements in tracking robustness and power efficiency described with reference to the examples of FIG. 13A can be realized in hardware implementing different combinations of DVS sensors, including, without limitation, mobile platforms with multiple stereo pairs of DVS sensors, such as illustrated in the example of FIG. 13B. In some implementations, the distance between a pair of DVS sensors (for example, a stereoscopic pair of DVS sensors) can be based on an interpupillary distance 1399 of a user (for example, an average interpupillary distance for humans). Referring to the non-limiting example of FIG. 13B, a DVS HMID comprising three stereoscopic pairs of DVS sensors is shown, wherein each pair of stereoscopic sensors is spaced at distances 1397a, 1397b, and 1397c. In certain embodiments, each of distances 1397a, 1397b and 1397c is the same as interpupillary distance 1399. Additionally, in certain embodiments, mobile platforms can comprise sets of DVS sensors covering a 360 degree field of view across one or more rotational axes, thereby further minimizing the need to reacquire tracking targets, such as illustrated in the example of FIG. 13C. Referring to the non-limiting example of FIG. 13C, the sensor coverage of a DVS HMID with sixteen DVS sensors is illustrated. As shown in this example, the overlapping fields of view of DVS sensors 1391a through 1391p provide 360 degrees of DVS sensor coverage, which, in certain embodiments significantly increases the likelihood of continuously capturing at least one distinctive scene element in view to facilitate tracking. Again, many variations are possible and within the contemplated scope of this disclosure.

Figure 14:
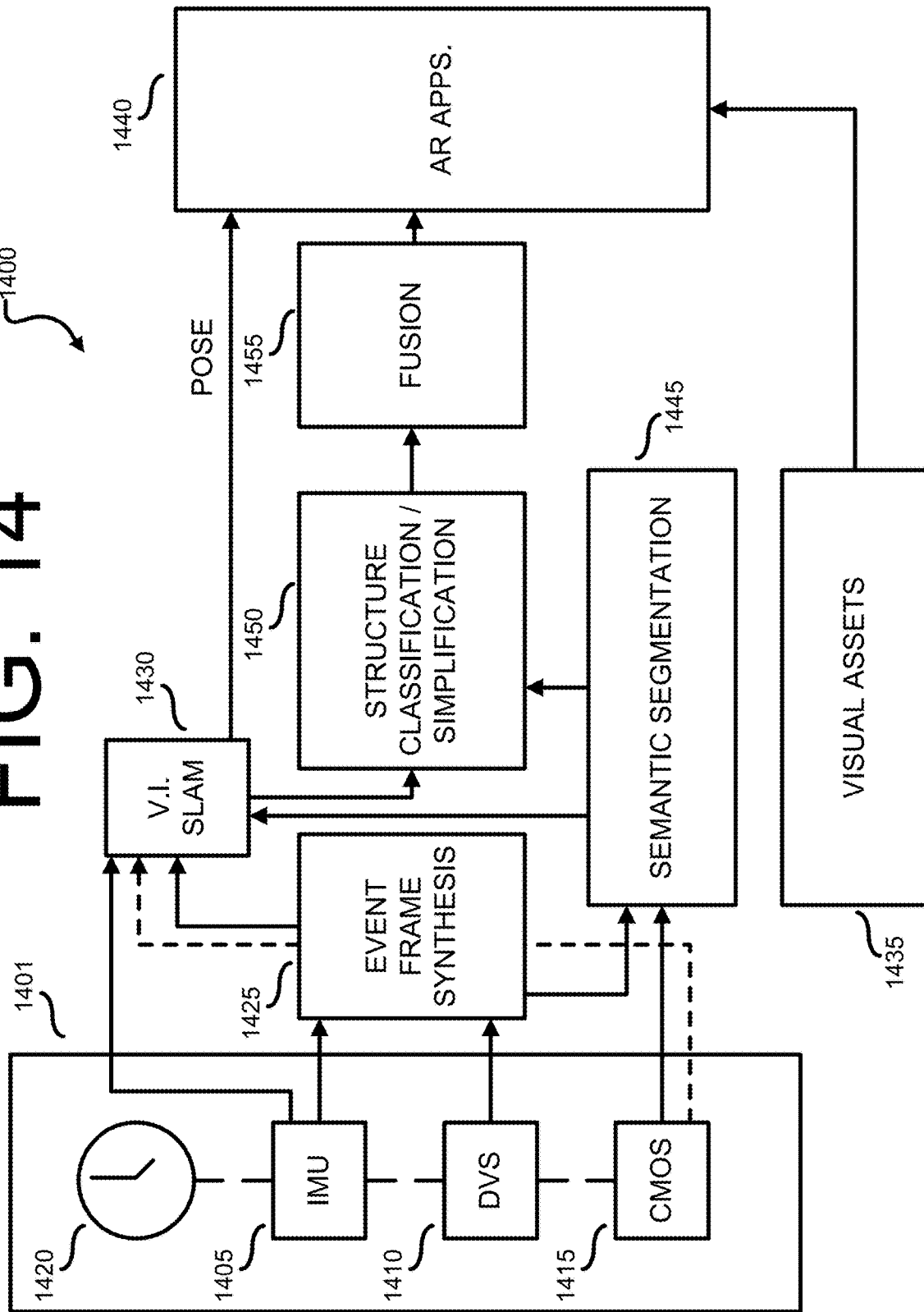
FIG. 14 illustrates an example of a system architecture for implementing semantic mapping for low-power augmented reality (AR) using one or more DVS sensors, according to certain embodiments of this disclosure.

FIG. 14 illustrates an example of an architecture 1400 for implementing semantic mapping for low-power augmented reality (AR) using one or more DVS sensors, according to some embodiments of this disclosure. As discussed elsewhere in this disclosure, the constraints imposed by, for example, the finite power resources (for example, the limited charge retained by battery 199 in FIG. 1), limited processing resources (for example, low-power mobile platforms such as smartphones do not have the same processing power as a liquid-cooled graphics processing unit in a desktop computer), and operational factors (for example, to be a viable AR platform, a head mounted display (HMD) cannot be excessively heavy, or generate large amounts of heat), present a variety of technical challenges to implementing AR on low-power mobile devices. These technical challenges include, without limitation, developing a digital representation of a world understanding based on inside-out DVS tracking that is robust and accurate enough to support a positive AR experience, and at the same time, does not burden other resources of the AR platform.

By way of illustrative example, consider an operating environment of an AR platform, wherein the operating environment comprises a hypothetical room, which is rich in ornamental detail (for example, a room in a building constructed in the Renaissance architectural style). In addition to the planes of the walls, ceiling, and floor, this hypothetical room can include many thousands of additional sources of visual texture (for example, pilasters, moldings, shapes in mosaics, faces and forms in paintings and frescos, etc.) which can be captured by a DVS sensor and/or CMOS image sensor to generate tracked features of the operating environment of the mobile platform. Theoretically, all tracked features from the many sources of visual texture of the hypothetical room can be incorporated into a highly detailed, data-intense, digital representation of the AR platform's world understanding.

In certain AR platforms, which are not constrained by concerns regarding weight, power consumption or heat generation, items of AR content can be positioned within an AR display generated based on such a highly detailed, data-intense digital representation of the AR platform's environment which includes all, or most of the tracked features of the operating environment. With enough processing power and cooling power, a digital representation of a world understanding comprising millions of redundant or inessential feature points can be continuously updated, and can be consumed by an AR application. However, in the context of low-power, lightweight mobile platforms (for example, AR platform 305 in FIG. 3), attempting to provide an AR experience based on such a data-intense digital expression of the mobile platform's world understanding can result in an AR experience that is degraded by one or more of heat buildup in the device, excessive battery consumption, or latency, as the mobile platform attempts to process all of the data in the digital representation of the mobile platform's world understanding to set the positional behavior of items of AR content or other visual assets within an AR display.

According to certain embodiments, architecture 1400 generates a digital representation of a mobile platform's world understanding, also referred to herein as a semantic map, or stable semantic map, which distills the structural essence of a mobile platform's operating environment into a compact digital representation which can be processed using the limited resources of a low-power mobile platform to provide an AR experience characterized by, without limitation, stable, accurate positional behavior of items of AR content, extensibility (for example, the stable semantic map of one mobile platform can be combined with that of another mobile platform), and reduced power consumption.

Referring to the example of FIG. 14, architecture 1400 is implemented on a mobile platform performing inside-out CMOS-assisted DVS tracking and semantic mapping (for example, AR platform 305 in FIG. 3). The embodiment of the architecture 1400 shown in FIG. 14 is for illustration only and other examples could be used without departing from the scope of the present disclosure.

According to some embodiments, architecture 1400 comprises a sensor block 1401 (for example, sensor block 1101 in FIG. 11), which includes a suite of time-synchronized and calibrated sensors whose outputs can be used to generate time-stamped frames based on one or more of DVS sensor data which has been synthesized into event frames (for example, by event frame synthesis pipeline 1200 in FIG. 12), time-stamped CMOS image frames, or frames based on combinations of DVS sensor data and CMOS image frames.

According to certain embodiments, sensor block 1401 includes an IMU 1405 (for example, IMU 182 in FIG. 1), which detects and measures the direction and magnitude of the angular and transverse motion of sensor block 1401. As shown in the non-limiting example of FIG. 14, sensor block 1401 further comprises one or more DVS sensors 1410 (for example, DVS sensor 400 in FIG. 4), each of which is configured to output an asynchronous steam of sensor event data in response to changes in detected light from a view of the operating environment of the mobile platform (for example, low-power mobile platform 1000 in FIG. 10) hosting architecture 1400. In various embodiments according to this disclosure, architecture 1400 also includes a CMOS image sensor 1415 (for example, certain embodiments of camera 186 in FIG. 1) which are configured to receive light from the operating environment of the mobile platform and output frames of image data based on the color, position and intensity of the light received at the CMOS image sensor 1415. According to various embodiments, the outputs of IMU sensor 1405, DVS sensor 1410 and CMOS image sensor 1415, are all time stamped with time values synchronized to common clock 1420. According to certain embodiments, common clock 1420 is a system clock or tick counter.

Referring to the example of FIG. 14, architecture 1400 includes an event frame synthesis pipeline 1425 (for example, event frame synthesis pipeline 1200 in FIG. 12), which receives the output of IMU sensor 1405 and DVS sensor 1410, and accumulates motion compensated DVS sensor data across time windows associated with the appearance of sharp edges in spatial histograms of accumulated DVS sensor data. According to various embodiments, event frame synthesis pipeline 1425 rescales spatial histograms of accumulated DVS sensor to a common representation and/or performs noise filtering on the spatial histograms. As shown in FIG. 14, in some embodiments, event frame synthesis pipeline 1425 outputs the processed spatial histograms to visual inertial SLAM pipeline 1430.

According to certain embodiments, architecture 1400 comprises a visual-inertial SLAM pipeline 1430 (for example, visual-inertial SLAM pipeline 525 in FIG. 5), which, in certain embodiments, is configured to receive feature tracks (for example, hybrid feature tracks 650 in FIG. 6), and output one or more of pose data (for example, camera pose data 530 in FIG. 5) or scene geometry data (for example, scene geometry data 535 in FIG. 5). As shown in the illustrative example of FIG. 14, the scene geometry data output by visual-inertial SLAM pipeline 1430 may be in the form of a point cloud indicating the present determined coordinate values of tracked points in the operating environment of the mobile platform. In certain embodiments, visual-inertial SLAM pipeline 1430 is configured to intermittently (as indicated by the dotted line in the figure) receive image frames from CMOS image sensor 1415. In various embodiments, visual-inertial SLAM pipeline 1430 may further comprise a feature handler (for example, hybrid feature handler 515) for generating tracked features (for example, spatially and temporally aligned DVS feature tracks or hybrid feature tracks 650 in FIG. 6) to provide as pre-processed inputs to visual-inertial SLAM pipeline 1430.

Referring to the example of FIG. 14, architecture 1400 also comprises visual assets 1435. According to various embodiments, visual assets 1435 comprise AR objects or containers for AR content (for example, speech bubbles) which can be rendered by AR application 1440, based in part on positional information provided in a stable semantic map output by fusion module 1455. In some embodiments, visual assets 1435 are associated with positional criteria (for example, criteria specifying the apparent "size" of the visual asset in an AR display, or criteria specifying rules regarding the visual asset's placement relative to elements of the stable semantic map (for example, certain objects should not appear to "float" above a ground plane of the stable semantic map)).

As shown in the illustrative example of FIG. 14, architecture 1400 comprises AR application 1440. According to some embodiments, AR application 1440 is an application which provides a user of a mobile platform with an AR experience based on a world understanding (for example, a semantic mapping) of an operating environment generated based on CMOS-assisted inside-out tracking performed at the mobile platform. AR application 1440 can be, without limitation, an AR game, a virtual workspace (for example, an application where users collaborate on a document or 3D model presented as a visual asset), a communication application, or a photography or imaging application.

According to some embodiments, architecture 1400 comprises a semantic segmentation pipeline 1445, which is configured to receive a time stamped frame, and identify and associate at least one semantic label (for example, "floor" or "wall #1") with a region of image data of the time stamped frame. According to some embodiments, the time stamped frame received by semantic segmentation pipeline 1445 is a frame of image data output by CMOS sensor 1415. In certain embodiments, the time stamped frame received by semantic segmentation pipeline 1445 is a synthesized event frame generated by event frame synthesis pipeline 1425 from sensor event data from DVS sensor 1410.

Referring to the example of FIG. 14, structure classification and simplification pipeline 1450 receives, as inputs, the outputs of visual-inertial SLAM pipeline 1430 (for example, a point cloud of tracked features) and semantic segmentation pipeline 1445 and processes the inputs to generate a series of one or more simplified object representations of semantically labeled objects and/or surfaces of interest (for example, the floor and walls) of the operating environment of the mobile platform over time. According to certain embodiments, the simplified object representations comprise geometrical primitives (for example, boxes, planes or prisms) representing the relevant surfaces (for example, the size and location of the top of a table is, for positioning AR content, a more relevant datum than the curve of its legs). By simplifying the mobile platform's world understanding of its operating environment as a collection of simplified object representations, rather than as a potentially data-intense set of tracked feature points, the digital representation of the mobile platform's world understanding becomes similarly less data-intense.

Referring to the example of FIG. 14, the series of simplified object representations generated by structure classification and simplification pipeline 1450 are provided to fusion module 1455. At a macro level, fusion module 1455 "calms down," or "smooths out" the short term variations in simplified object representations provided by structure classification and simplification pipeline 1450 to generate and update a compact digital representation of a world understanding of the operating environment (for example, a stable semantic map) based on persistent and/or confidently identified trends within the output of classification and simplification pipeline 1450.

As an illustrative example of aspects of the functionality of fusion module 1455, consider an operating environment which includes a square table. At time t=0, structure classification and simplification pipeline 1450 outputs a first simplified object representation of the table which comprises a square plane measuring 50 centimeters across and labeled "table" at a given coordinate value. At time t=20 ms, structure classification and simplification pipeline 1450 outputs a second simplified object representation of the table, this time comprising a square plane labeled "table," measuring 49.5 centimeters across, and having a coordinate value 1 cm to the right of the coordinate value at time t=0. Similarly, at time t=40 ms, structure classification and simplification pipeline 1450 outputs a third simplified object representation of the table, this time comprising a square plane labeled "table," measuring 50.5 cm across, and having a coordinate value 0.5 cm to the left of the coordinate value at time t=0.

In some embodiments, feeding the output of structure classification and simplification pipeline 1450 directly to AR application(s) 1440 as a digital representation of a world understanding of the operating environment of the mobile platform may result in a poor AR experience, as the positional behavior of AR objects in an AR display may reflect the short term variations in the instantaneous output of structure classification and simplification pipeline 1450. For example, an AR object "placed" on the table may appear to move back and forth in response to the variations in the assigned coordinate of the plane labeled "table" between times t=0 and t=40 ms. According to various embodiments, fusion module "smooths out" the above-described variations in the output of structure classification and simplification module 1450 by fusing the instantaneous geometry (for example, dimensions and coordinates of planes and boxes) over time to create a consistent semantic stable map of the operating environment of the mobile platform.

Figure 15:
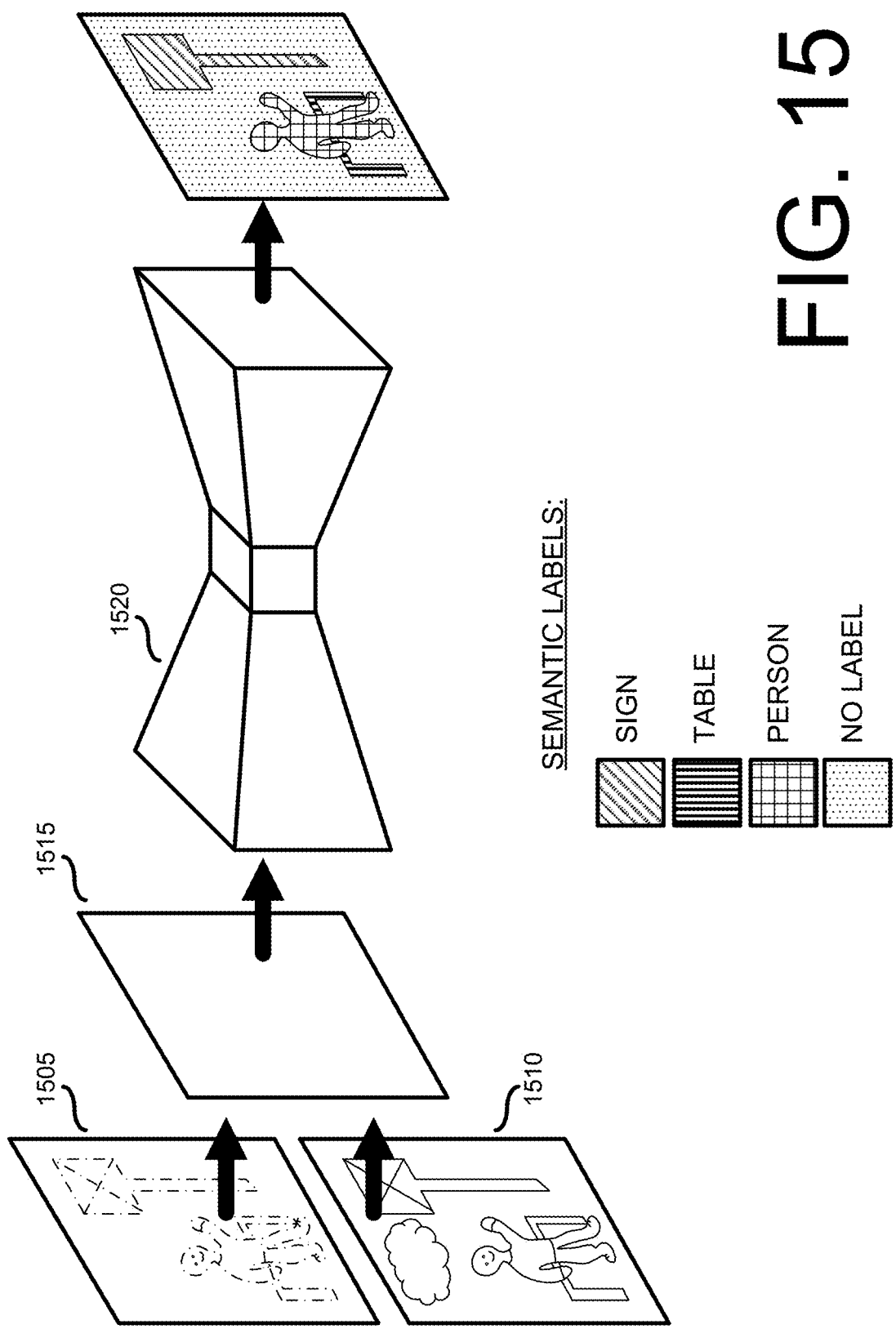
FIG. 15 illustrates aspects of generating a semantic segmentation of a time stamped frame, according to certain embodiments of this disclosure.

FIG. 15 illustrates aspects of generating a semantic segmentation of a time stamped frame (for example by semantic segmentation pipeline 1445 in FIG. 14) according to certain embodiments of this disclosure. The embodiment shown in FIG. 15 is for illustration only and other examples could be used without departing from the scope of the present disclosure.

According to certain embodiments, semantic segmentation is performed by concatenating a time-stamped synthesized DVS event frame 1505 (for example, an event frame generated by event frame synthesis pipeline 1425 in FIG. 14) with a time-stamped frame of CMOS image data 1510 output from a CMOS sensor (for example, CMOS sensor 1415 in FIG. 14) to generate a time stamped frame 1515. In some embodiments, the time stamp of time-stamped synthesized DVS event frame 1505 and the time stamp of time-stamped frame of CMOS image data 1510 satisfy predetermined proximity criteria. In some embodiments, instead of comprising a concatenation of a synthesized DVS event frame and a CMOS image frame, time stamped frame 1515 is based on the output of only one sensor. According to certain embodiments, the accuracy of the semantic labeling is significantly improved when a CMOS image frame is available, and the control logic for the mobile platform only performs semantic segmentation on time-stamped frames 1515 which include data from a CMOS image frame 1510. In some embodiments, to assist semantic segmentation, control logic for the mobile platform (for example, sensor controller and scheduler 700 in FIG. 7) turns the CMOS image sensor on for brief, periodic intervals.

Referring to the illustrative example of FIG. 15, time stamped frame 1515 is passed through a deep convolutional neural network (CNN) 1520, which has been trained to associate semantic labels with regions of image data. According to certain embodiments, the regions of image data comprise ranges of pixels within time stamped frame 1515.

As shown in the non-limiting example of FIG. 15, CNN 1520 assigns semantic labels to regions comprising some, but not all, of the pixels of time stamped frame. Data identifying the semantically labeled regions of time stamped frame 1515 and the semantic labels assigned to each region is, in certain embodiments, passed to a structure classification and simplification pipeline (for example, structure classification and simplification pipeline 1450 in FIG. 14).

Figure 16:
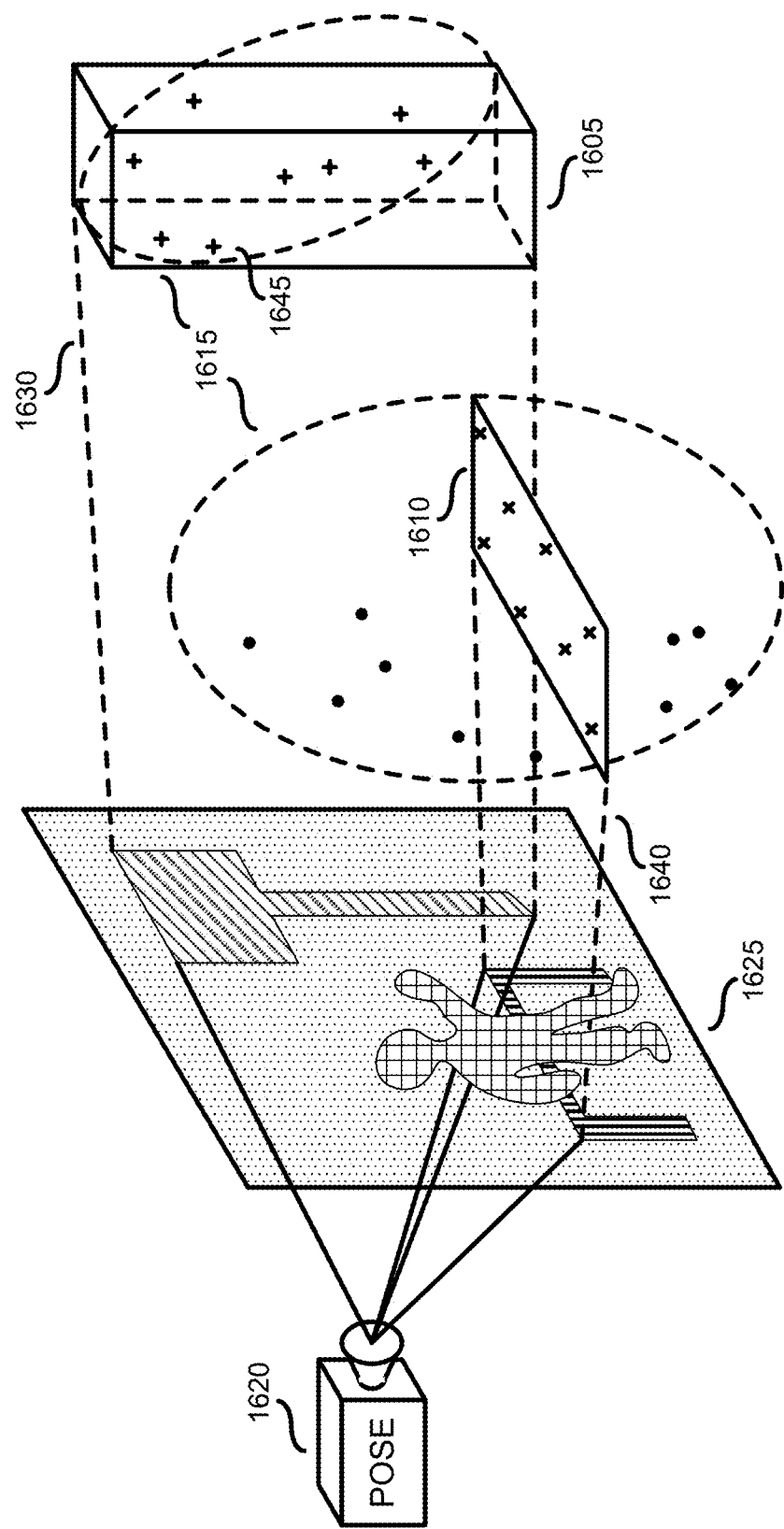
FIG. 16 illustrates aspects of structure classification and simplification, according to certain embodiments of this disclosure.

FIG. 16 illustrates aspects of structure classification and simplification (as performed by, for example, structure classification and simplification pipeline 1450 in FIG. 14) according to various embodiments of this disclosure. The embodiment shown in FIG. 16 is for illustration only and other examples could be used without departing from the scope of the present disclosure.

According to certain embodiments, having a three-dimensional world understanding of the operating environment of a mobile AR platform is crucial for implementing AR applications (for example, AR application 1440 in FIG. 14). While it is possible, for a time, at least, for a mobile platform to utilize, as its world understanding, a map based on features identified and tracked by visual-inertial SLAM pipeline, updating such a map in real-time can involve matching and updating the coordinates of thousands of points. This can be computationally expensive and can quickly drain the power resources (for example, battery 199 in FIG. 1) of a mobile platform. According to certain embodiments, structure classification and simplification provides a mechanism for re-expressing a digital expression of a world understanding in a way that is much simpler than a point cloud, and accordingly, much less computationally expensive and demanding of the power resources of a mobile platform.

Referring to the example of FIG. 16, structure classification and simplification comprises generating simplified object representations (for example, geometric primitives, such as bounding box 1605 and plane 1610 using point cloud 1615 and camera pose data 1620 associated with a point in time. According to certain embodiments, structure classification and simplification comprises positioning (for example, by using plane fitting) and categorizing the simplified object representations based on semantic segmentation data 1625 associated with the same point in time (for example, data associating semantic labels with regions in a time-stamped image frame).

Additionally, according to certain embodiments, as part of structure classification and simplification, points in point cloud 1615 are assigned semantic labels based on spatial correspondences between projections (represented by projection lines 1630 and 1640) of semantically labeled regions of a time stamped frame and points in the point cloud. As shown in the non-limiting example of FIG. 16, certain points in point cloud 1615 (for example, first point 1645) are labeled with a "+," representing their spatial proximity to a projection of the region of an image frame associated with the semantic label for "sign." Similarly, other points in point cloud 1615 are labeled with an "x" representing their spatial proximity to a projection of the region of the image frame associated with the semantic label for "table."

Figure 17:
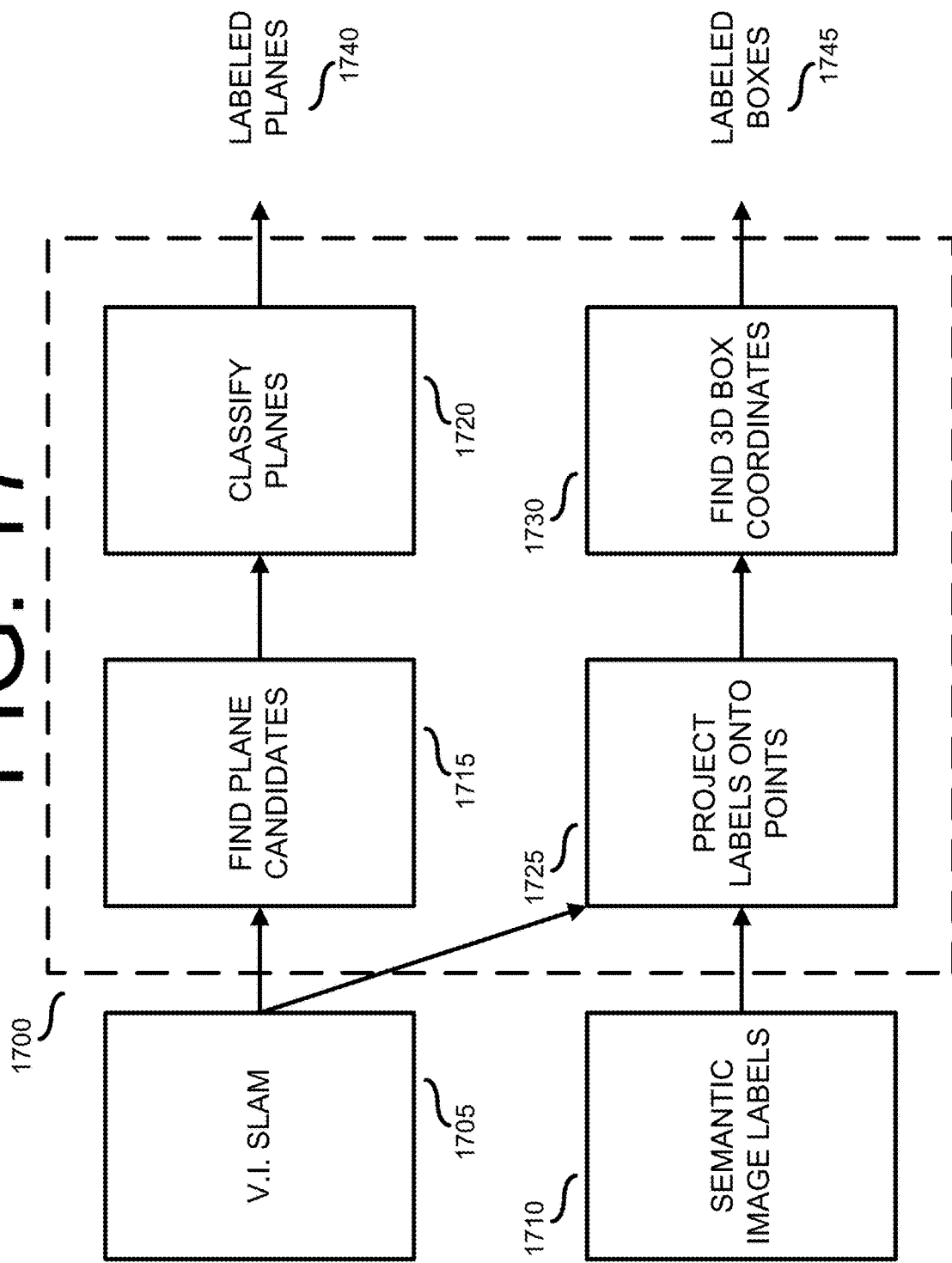
FIG. 17 illustrates elements of a structure classification and simplification pipeline, according to certain embodiments of this disclosure.

FIG. 17 illustrates elements of a structure classification and simplification pipeline 1700 (for example, structure classification and simplification pipeline 1450) according to certain embodiments of this disclosure. According to various embodiments, structure classification and simplification pipeline 1700 is embodied as hardware on an untethered low-power mobile platform (for example, device 100 in FIG. 1 or AR platform 305 in FIG. 3). In some embodiments, structure classification and simplification pipeline 1700 is embodied as software stored in a memory of a mobile platform and executed by a processor of the platform. According to various embodiments, structure classification and simplification pipeline 1700 is implemented through a combination of software and hardware (for example, main processor 140 and GPU 170 in FIG. 1).

Referring to the non-limiting example of FIG. 17, structure classification and simplification pipeline 1700 receives, as inputs, the outputs 1705 of a visual-inertial SLAM pipeline (for example, visual-inertial SLAM pipeline 1430 in FIG. 14) and semantic image labels 1710 (for example, semantic labels determined by convolutional neural network 1520 in FIG. 15). According to certain embodiments, outputs 1705 of a visual-inertial SLAM pipeline comprise pose data (for example, an optical vector of a DVS sensor or CMOS image sensor of a mobile platform) of the mobile platform, and scene geometry data (for example, scene geometry data 535 in FIG. 5) determined by the visual-inertial SLAM pipeline. In the non-limiting example of FIG. 17, the scene geometry data from the visual-inertial SLAM pipeline is provided to structure classification and simplification pipeline 1700 as a point cloud of tracked features in the operating environment of the mobile platform implementing structure classification and simplification pipeline 1700. Additionally, in various embodiments, structure classification and simplification pipeline 1700 receives, from the visual-inertial SLAM pipeline, or another component (for example, directly from an IMU with a gravity sensor) gravity information identifying a local down vector. According to various embodiments, a gravity-based down vector is helpful for establishing a coordinate system in which to position simplified object representations.

As shown in the illustrative example of FIG. 17, structure classification and simplification pipeline 1700 also receives semantic image label data 1710, which in certain embodiments, comprises data associating regions of a time stamped frame (for example, time-stamped frame 1515 in FIG. 15) with semantic labels determined by a convolutional neural network or other computer-implemented image recognition process.

In some embodiments according to this disclosure, structure classification and simplification pipeline 1700 performs a plane candidate-finding operation 1715 to find plane candidates in scene geometry data (for example, a point cloud) from the visual-inertial SLAM pipeline. According to various embodiments, as part of plane candidate-finding operation 1715, the point-cloud is clustered into bounded planar regions by sampling plane hypotheses and evaluating consensus using one or more plane fitting techniques (for example, random sample consensus, or "RANSAC" which has been shown to be effective on noisy, or potentially noisy data sets). Further, in certain embodiments, each identified plane in the point cloud data is parametrized by its normal n and distance d to the origin of the coordinate system. Additionally, in some embodiments, as part of plane-candidate finding operation 1715, structure classification and simplification pipeline 1700 parameterizes the center-point c, and its boundary points $\{b_1, b_2, \ldots b_K\}$ of plane candidates which are bounded planes (for example, the flat surface of a table top).

As shown in the explanatory example of FIG. 17, structure classification and simplification pipeline 1700 further comprises a plane classification operation 1720. According to various embodiments, in plane classification operation 1720, each plane candidate found in operation 1715 is classified by comparing its normal to the gravity vector to determine a classification, (e.g., ground, horizontal, vertical, other). While not shown in the illustrative example of FIG. 17, in certain embodiments, as part of plane classification operation 1720, classified plane candidates may also be assigned a semantic label based on semantic labels assigned to point cloud data as part of label projection operation 1725.

According to certain embodiments, structure classification and simplification pipeline 1700 performs a label projection operation 1725 in which elements of a point cloud provided as one of the outputs 1705 of a visual-inertial SLAM pipeline are labeled based on spatial correspondences between projections of labeled regions of a time stamped frame and point cloud data.

Referring to the non-limiting example of FIG. 17, structure classification and simplification pipeline 1700 comprises operation 1730, wherein three-dimensional coordinates are determined for objects whose simplified object representation comprises a bounding box. At operation 1730, clusters within the point cloud associated with objects in the operating environment (for example, points shown with "+" signs in point cloud 1615 in FIG. 16) are clustered, and the dimensions and spatial coordinates of the minimum three dimensional bounding box for the point cloud cluster are determined. According to certain embodiments, the minimum 3D bounding box enclosing the labelled point clusters is found to produce the final simplified object representation: $\{v_1, v_2, \ldots v_8, C, O_{id}, C_{id}\}$, where $v_j$ denotes one of the box vertices, and the identifiers $O_{id}, C_{id}$ denote the object and category labels.

As shown in the explanatory example of FIG. 17, structure classification and simplification pipeline 1700 outputs a set of labeled planes 1740 and labeled boxes 1745 which are considered by a fusion module (for example, fusion module 1455 in FIG. 14) in generating and updating a stable semantic map of the operating environment of the mobile platform.

Figure 18:
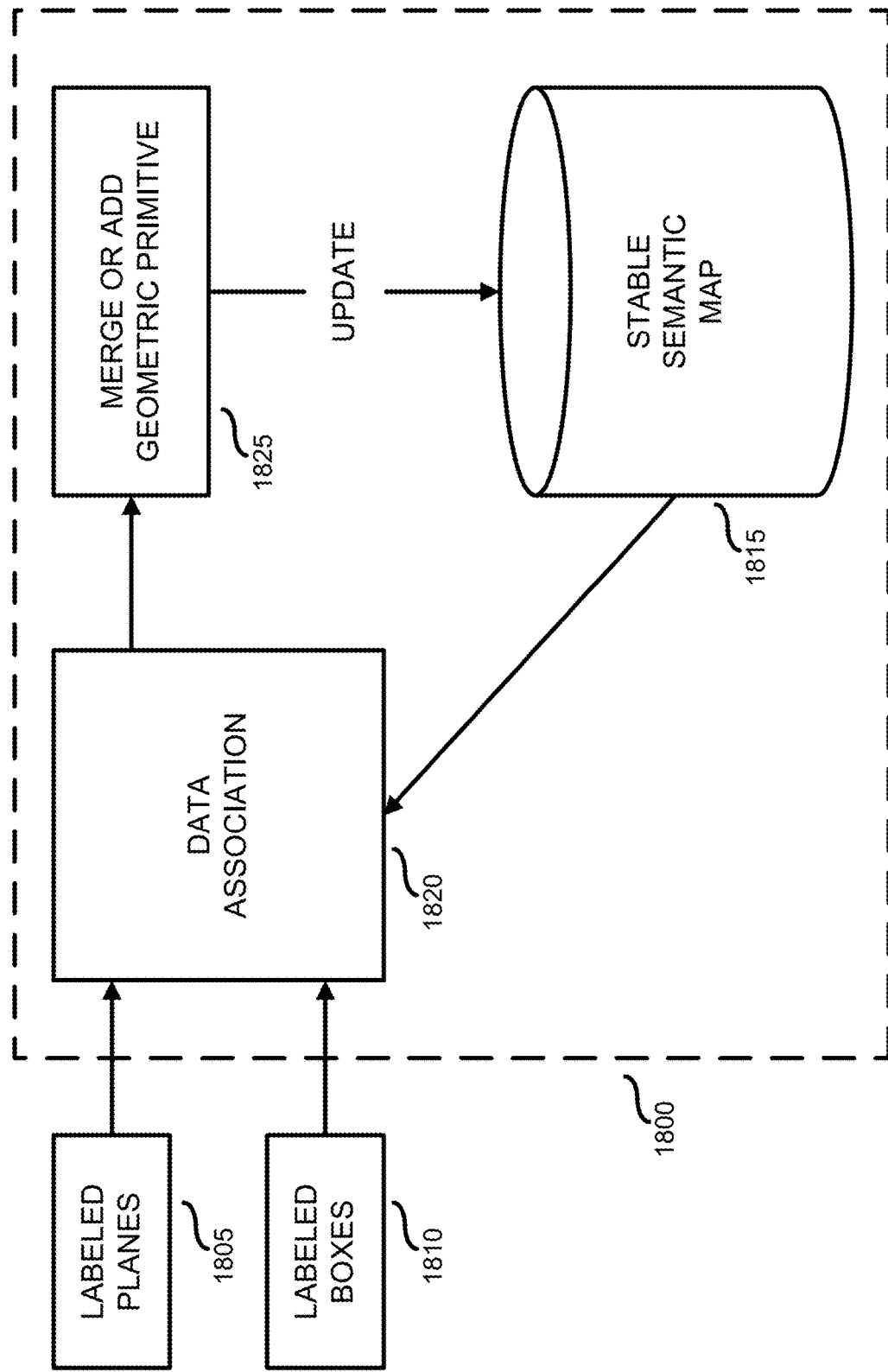
FIG. 18 illustrates aspects of the operational architecture of an intradevice fusion module 1800, according to certain embodiments of this disclosure.

FIG. 18 illustrates aspects of the operational architecture of an intradevice fusion module 1800 (for example, fusion module 1455 in FIG. 14) according to certain embodiments of this disclosure. The embodiment of the intradevice fusion module 1800 shown in FIG. 18 is for illustration only and other examples could be used without departing from the scope of the present disclosure.

Referring to the non-limiting example of FIG. 18, intradevice fusion module 1800 receives, as inputs, simplified object representations. In this particular example, intradevice fusion module receives, as simplified object representations, labeled planes 1805 and labeled boxes 1810 generated by a structure classification and simplification pipeline (for example, structure classification and simplification pipeline 1700 in FIG. 17). According to certain embodiments, labeled planes 1805 and labeled boxes 1810 comprise an instantaneous (e.g., associated with a particular instant, or, at a minimum, a short interval in time) representation, through geometric primitives and labels, of the mobile platform's world understanding. According to various embodiments, intradevice fusion module 1800 fuses instantaneous representations of world understanding over time to construct a consistent, or stable, map of the operating environment in which a mobile platform is moving and operating.

According to certain embodiments, certain simplified object representations, such as labeled planes 1805 and labeled boxes 1810 comprise high-level geometric primitives which are associated with the following five attributes: position, orientation, extent, a confidence counter and timestamp. In various embodiments according this disclosure, elements are stored in a sparse hierarchical data structure (for example, a set of nodes comprising a tree) for fast search and retrieval. Each node in the tree represents a particular spatial location and contains a set of possible element hypotheses. As described in greater detail herein, these high-level primitives are variously merged or removed from element sets which define the primitives of a stable semantic map based on mathematical expressions of their association with other elements already received by intradevice fusion module 1800.

As shown in the non-limiting example of FIG. 18, intradevice fusion module 1800 performs one or more data association operations 1820, wherein intradevice fusion module 1800 queries one or more element hypotheses, by obtaining elements with closest Euclidean distance between center points $\|c^1 - c^2\|_2$ to the query are retrieved from the map. If there are no previous elements at that spatial location, a new unstable element is added to the map. Next, the hypothesis most similar to the query is found using an element-specific distance function $d_e(\cdot)$. For planes, $d_e^p(\cdot) = n^1 \cdot n^2$, where $n^1$ is the normal of each respective plane, can be used. For bounding boxes, $d_e^b(\cdot) = IoU(V^1, V^2)$, where $V^j$ are the concatenated vertices of each respective box, and IoU is the intersection over union of the two cuboids, can be used.

According to various embodiments, data association operation 1820 determines a distance between query elements and element sets within the tree. In some embodiments, a merge operation 1825 is performed, wherein new element sets are created if the closest set is further than a specified distance. The query element is then merged with the group with smallest distance. In this case, intradevice fusion module 1800 maintains a moving average of the value of the element. Each time an element is added to an element set, the confidence counter of that set is incremented. Unstable primitives become stable after the confidence counter reaches a specified threshold. In various embodiments, this approach of maintaining multiple hypotheses for each spatial location helps to suppress outliers and avoids averaging several competing hypotheses, which results in a more stable output. For each element set, only the element set with the highest confidence score at a particular spatial location operates as the element of stable semantic map 1815.

While not separately shown in the explanatory example of FIG. 18, according to various embodiments, intradevice fusion module 1800 performs a post-processing step to "prune" or manage the data size of the sparse hierarchical data structure comprising the elements. According to certain embodiments, the pruning and post-processing step pruning step removes elements which are too large, too small, or too old. For those elements such as planes, which are only ever partially visible in the scene at one particular time, a post-processing procedure groups bounded planes which overlap in 3D if the following two criteria are satisfied. First the average perpendicular distance between the two planes must be small (for example, where $[½(|c^1-c^2|·n^1)+½(|c^1-c^2|·n^2)]<\alpha,$) second, the overlap between approximate sphere radii fitting inside each plane must greater than zero, (for example, where $$\left[\|c^1 - c^2\|_2 - \sqrt{2}\left(\frac{1}{K}\sum(c^1 - b_k^1)\right) - \sqrt{2}\left(\frac{1}{K}\sum(c^2 - b_k^2)\right)\right] > 0\right].$$

FIGS. 19A through 19D visually illustrate certain aspects of inside-out device tracking and generation of a stable semantic map according to some embodiments of this disclosure.

Figure 19A:
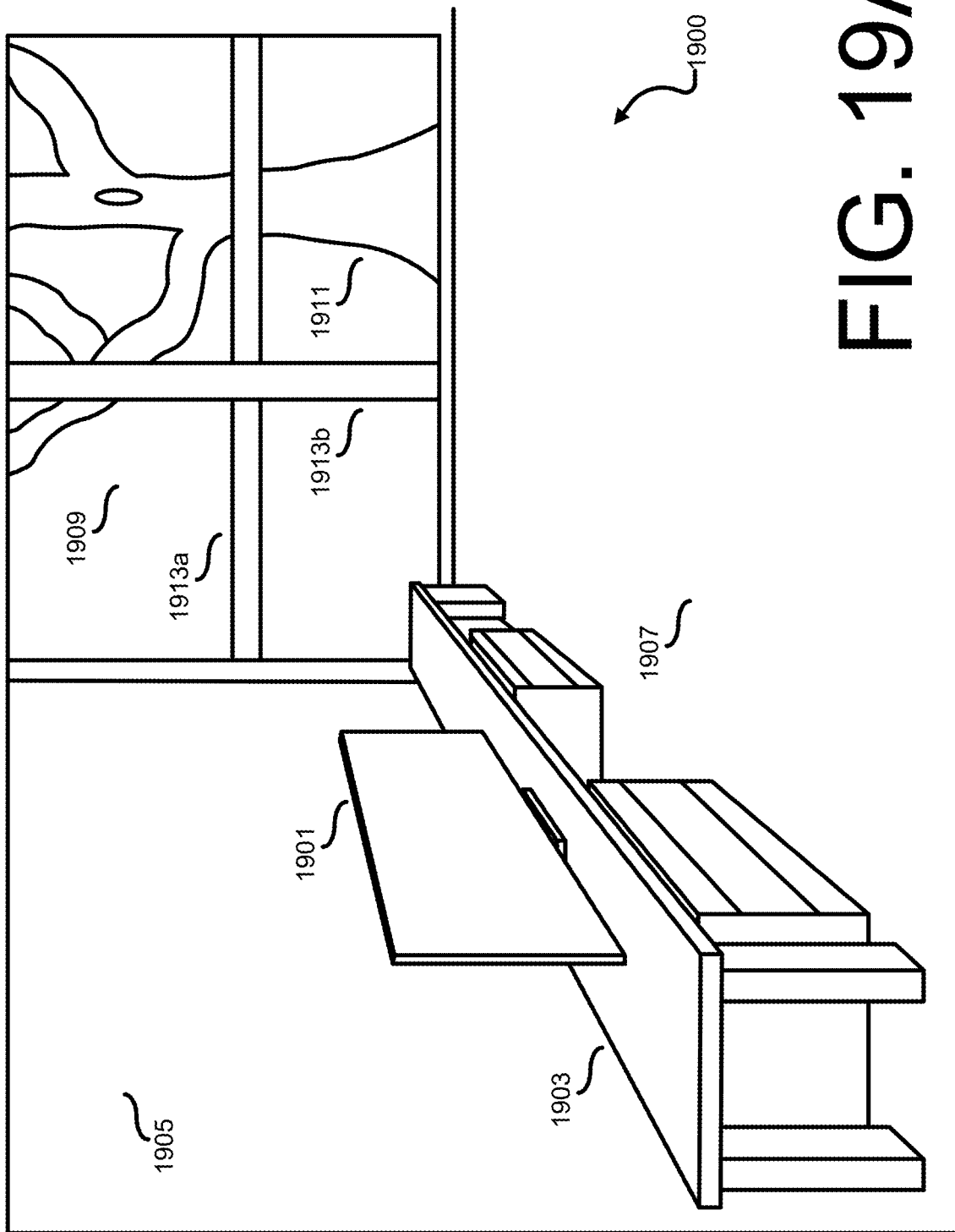

Referring to the non-limiting example of FIG. 19A, a section of an operating environment 1900 of a low-power mobile AR platform (for example, device 100 in FIG. 1 or AR platform 305 in FIG. 3) is shown as it would appear to the human eye or in an image frame output by a CMOS image sensor. As shown in this illustration, operating environment 1900 includes a television (or monitor) 1901, a desk 1903, a wall 1905, a floor 1907, and a window 1909, through which a tree 1911 can be seen. Note that, in this explanatory example, the view of tree 1911 is broken up into quadrants by horizontal mullion 1913a and vertical mullion 1913b.

Figure 19B:
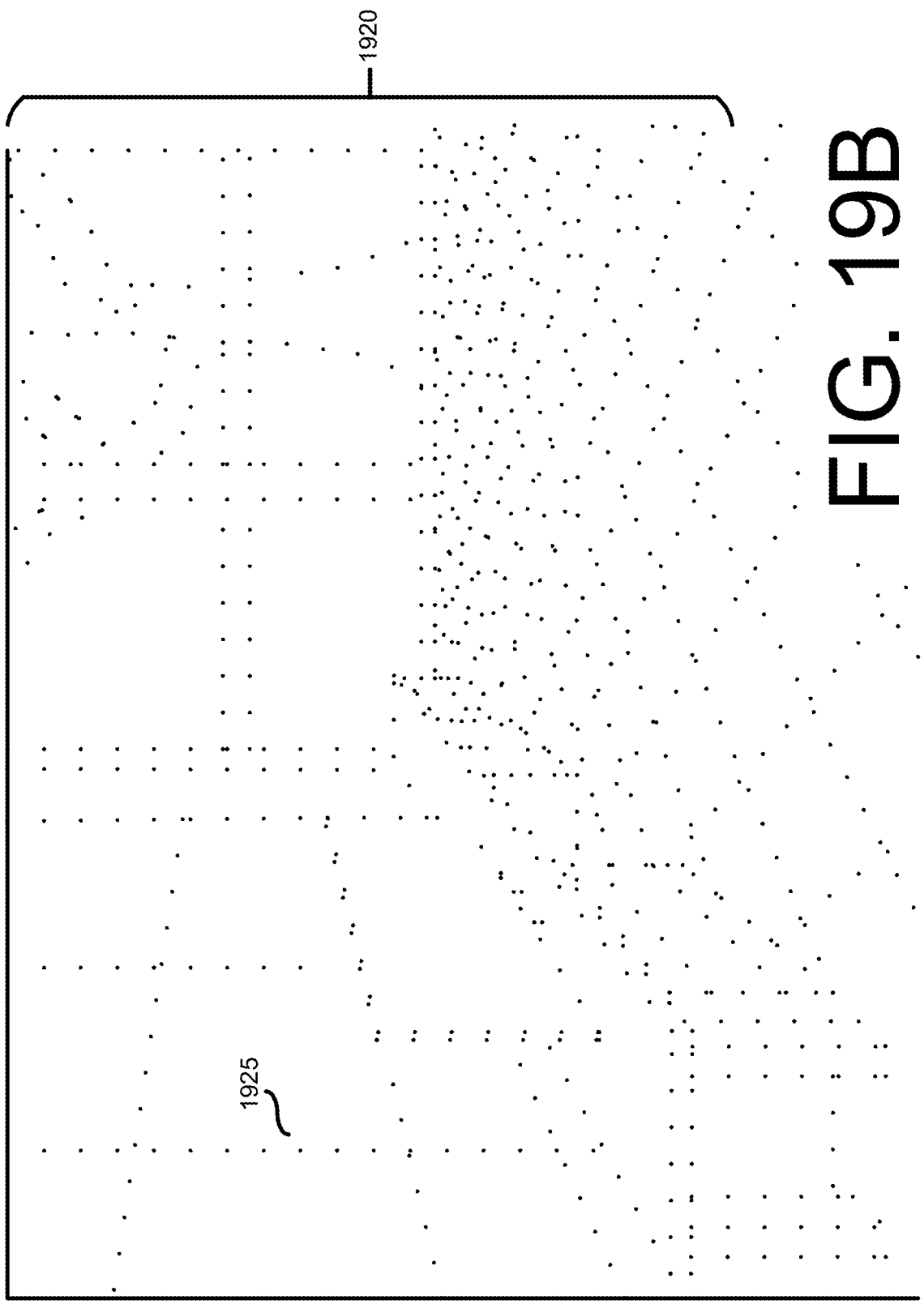

Referring to the non-limiting example of FIG. 19B, a representation of operating environment 1900 as an instantaneous (e.g., based on DVS sensor event data and/or CMOS image data collected associated with a particular instant in time) point cloud 1920 output by a visual-inertial SLAM pipeline (for example, visual-inertial SLAM pipeline 1430 in FIG. 14). According to certain embodiments, each "dot" in FIG. 19B (for example, "dot" 1925) represents an instantaneous coordinate value of a visual feature tracked by the visual-inertial SLAM pipeline. As the abundance of "dots" in FIG. 19B suggests, depending on embodiments, point cloud 1920 can present a representation of a world understanding of operating environment 1900 which is too data-intense to update and process in real-time with the limited processing and power resources of a low-power mobile AR platform.

FIG. 19C provides a visualization of an instantaneous output of a structure classification and simplification pipeline (for example, structure classification and simplification pipeline 1450 in FIG. 14) according to various embodiments of this disclosure. As shown in the illustrative example of FIG. 19C, a structure classification and simplification pipeline according to various embodiments of this disclosure, can generate a representation of a world understanding of an operating environment of a mobile platform which is significantly less data-intense than a point cloud provided by a visual-inertial SLAM pipeline. In contrast to FIG. 19B, which depicts an instantaneous representation of operating environment 1900 as a cloud of hundreds of points, in FIG. 19C, operating environment 1900 has been described as a set of five simplified object representations (e.g., semantically labeled geometric primitives 1925a through 1925e) having positional and dimensional values in a three dimensional coordinate system 1930. As indicated by the motion arrows in FIG. 19C (for example, rotational arrow 1935), the positional and dimensional coordinates of the simplified object representations can be unstable, and vary across the outputs of the structure classification and simplification pipeline at different instants. For example, the bounded plane 1925b with the semantic label "wall" may, in a second instantaneous output of the structure classification and simplification pipeline, move slightly upwards from its position in a first instantaneous output of the structure classification and simplification pipeline.

Attention is directed to the non-limiting example of FIG. 19D, which provides a visualization of a stable semantic map 1950 of operating environment 1900 created and updated by fusing (for example, by fusion module 1800 in FIG. 18) the instantaneous outputs of a structure classification and simplification pipeline. As shown in this illustrative example, stable semantic map 1950 comprises a lightweight (e.g., not data intense) digital representation of operating environment 1900, which comprises five semantically labeled geometric primitives with stable dimensional and positional coordinate values in a three-dimensional coordinate system. As used in this disclosure, the term "stable" encompasses a decoupling of the coordinate values of geometric primitives from small, instantaneous fluctuations in coordinate values in the instantaneous outputs of a structure classification and simplification pipeline. By way of a simple explanatory example, were someone to move the T.V. in operating environment 1900 closer to the window, the positional coordinate values of bounding box 1955 in stable semantic map 1950 would be updated by a fusion module to reflect this fact. At the same time, stable semantic map 1950 would not be updated in response to individual fluctuations in the coordinate values in the instantaneous outputs of a structure classification and simplification pipeline. Thus, in an AR display positioning an item of AR content (for example, a banner indicating the start time of a user's favorite T.V. show) in bounding box 1955, the item of AR content would appear in the display as a static object, rather than "jiggling" in response to variations in the outputs of a classification and simplification pipeline.

While performing inside-out tracking and generation of a lightweight digital representation of a world understanding on a low-power mobile platform has, heretofore, been described with reference to embodiments implementing tracking and generation of stable semantic maps at an intradevice (e.g., on a single piece of hardware, such as AR platform 305 in FIG. 3) level, embodiments according to this disclosure are not so limited. According to various embodiments, pipelines for inside-out collection of visual data, simplifying and classifying elements of the data, and fusing the simplified and classified data to create a stable semantic map can be extended to the interdevice level. As a non-limiting example of such an extension according to embodiments of this disclosure, local stable semantic maps of an operating environment (or multiple operating environments) can be generated on individual mobile platforms, and then fused to create a global stable semantic map which is accessible to each of the mobile platforms, and provides, for each mobile platform, a semantic map of enhanced robustness (for example, errors in one platform's local semantic map of an operating environment may be "fused out" by local semantic maps of the operating environment generated on other mobile platforms) and enhanced scope (for example, a mobile platform can access stable semantic maps of areas outside of its own operating environment). According to various embodiments, stitching local stable semantic maps into a consistent global stable semantic map may facilitate the realization of enhanced AR experiences based on a shared global stable semantic map. Examples of such enhanced AR applications include, without limitation, augmented reality games which involve multiple users on multiple mobile platforms viewing and manipulating the same virtual objects, as well as AR messaging applications, wherein a user can leave messages on surfaces or three dimensional objects represented in the global stable semantic map, which other users can view when they are close to the surfaces or objects.

FIG. 20 illustrates two illustrative examples of system architectures for generating and updating a global stable semantic map, according to various embodiments of this disclosure. The examples shown in FIG. 20 are for illustration only and other examples could be used without departing from the scope of the present disclosure.

According to various embodiments, a global stable semantic map can be generated and updated by periodically combining local stable semantic maps generated at mobile devices, and processing the combined local maps with a fusion module (for example, fusion module operating according to the principles described with reference to fusion module 1800 in FIG. 18) to generate a global stable semantic map.

Referring to the example of FIG. 20, an system architecture 2000 comprises a first plurality of devices 2005 (for example, two or more instances of device 100 in FIG. 1) operating as mobile AR platforms in a shared operating environment, or separate operating environments (for example, operating environment 300 in FIG. 3, or operating environment 1900 in FIG. 19A). Each device of first plurality of devices 2005 periodically provides to a peer device 2010 (for example, a mobile AR platform with similar power and processing resources as the devices of first plurality of devices 2005) operating as a master device, a time stamped instance of a local stable semantic map of its respective operating environment. According to various embodiments, peer device 2010 performs one or more of device grouping, map optimization or fusion of the received local stable semantic maps to generate and update a global semantic stable map 2015 which is updated on peer device 2010 and provided to each device of first plurality of devices 2005.

As shown in FIG. 20, a second non-limiting example of a system architecture 2050 comprises a second plurality of devices 2055 (for example, two or more instances of AR platform 305 in FIG. 3) operating as mobile AR platforms in a shared operating environment or separate operating environments (for example, operating environment 300 in FIG. 3, or operating environment 1900 in FIG. 19A). Each device of second plurality of devices 2055 periodically provides to a cloud computing platform 2060 (for example, GOOGLE CLOUD™) a time stamped instance of a local stable semantic map of its operating environment. According to various embodiments, cloud platform 2060 performs one or more of device grouping, map optimization and fusion of the received local stable semantic maps to generate and update a global semantic stable map 2065 which is updated on cloud computing platform 2060 and provided to each device of second plurality of devices 2055.

While not specifically shown in the explanatory example of FIG. 20, other system architectures are possible and within the contemplated scope of this disclosure. As an example, system architecture 2000 could, in certain embodiments, be implemented with a server (for example, server 200 in FIG. 2) in place of peer device 2010.

FIG. 21 illustrates an example of an architecture 2100 for generating and updating a multi-platform based global stable semantic map 2110, according to various embodiments of this disclosure. The embodiment of the architecture 2100 shown in FIG. 21 is for illustration only and other embodiments could be used without departing from the scope of the present disclosure.

Referring to the non-limiting example of FIG. 21, architecture 2100 comprises a master platform 2105, and one or more mobile AR platforms, including mobile AR platforms 2150a and 2150n. According to various embodiments, master platform 2105 can be embodied on, without limitation, a mobile platform (for example, device 100 in FIG. 1), a hardware server (for example, server 200 in FIG. 2) or a cloud computing server (for example, cloud computing platform 2060 in FIG. 20). As shown in FIG. 21, mobile AR platforms 2150a and 2150n comprise networked electronic devices capable of receiving and processing a stable semantic map to provide an AR display, including without limitation, smartphones, tablets and head mounted displays. According to various embodiments, mobile AR platforms 2150a to 2150n belong to a group of devices which are identified by master platform 2105 through an initialization phase in which mobile AR platforms 2150a to 2150n identify themselves to a virtual server running on master platform 2105. In certain embodiments according to this disclosure, mobile AR platforms 2150a to 2150n identify themselves to master platform 2105 using a user datagram protocol (UDP) broadcast, though other protocols can be used. Additionally, mobile AR platforms 2150a to 2150n may communicate with one another via one or more wireless communication protocols, including, without limitation, WI-FI or BLUETOOTH protocols.

According to various embodiments, once initialized and connected to each of mobile AR platforms 2150a to 2150n, master platform 2105 periodically receives, from each mobile AR platform, time stamped instances of local pose data 2155a through 2155n showing the pose of the respective mobile AR platform at a specified time (for example, mobile AR platform 2150a provides instance of local pose data 2155a) and a time stamped instance of a local stable semantic map generated associated with the same time as the instance of local pose data (for example, mobile platform 2150n provides instance of local stable semantic map 2160n).

Referring to the explanatory example of FIG. 21, having received instances 2160a to 2160n of local stable semantic maps from each of mobile platforms 2150a to 2150n, master platform 2150 performs device grouping 2115, grouping instances of local semantic maps based on how many common map elements (for example, a particular geometric primitive associated with a particular desk) are present in each local stable semantic map. According to various embodiments, updates to global semantic map 2110 may be pushed out to groups of mobile AR platforms. That is, groups of mobile AR platforms looking at the same desk will all receive the same updates to the positional and dimensional coordinates in global stable semantic map 2110. According to various embodiments, each local stable semantic map is composed of simplified object representations (for example, semantically tagged geometric primitives, such as planes and bounding boxes in a coordinate system). In various embodiments, device grouping 2115 comprises identifying correspondences between common elements of local stable semantic maps, for example, by matching descriptors of the elements (for example, semantic labels) using a distance metric, such as a Euclidean distance between coordinate values of the common elements (for example, where the Euclidean distance between an instance of a "chair" and "desk" in a first local stable semantic map corresponds with the Euclidean distance between the instance of "chair" and "desk" in a second local stable semantic map, the two local stable semantic maps are grouped together as part of device grouping 2115).

In certain embodiments, once instances of local stable semantic maps are grouped, map optimization 2120 is performed as a first step in combining the local semantic maps to generate and update global stable semantic map 2110. According to various embodiments, map optimization 2125 comprises utilizing instances of local pose data 2155*a* to 2155*n* to perform a transformation (for example, by least squares optimization) mapping the coordinate systems of instances of local stable semantic maps 2160*a* to 2160*n* to the global coordinate system used in global stable semantic map 2110.

According to certain embodiments, the optimized and grouped local stable semantic maps are passed through a fusion module 2120 (for example, fusion module 1800 in FIG. 17) to smooth out low-level variations (for example, variations in the positional and dimensional coordinates of geometric primitives) between combined local semantic maps, and merge and subtract elements from global stable semantic map 2110.

Figure 22:
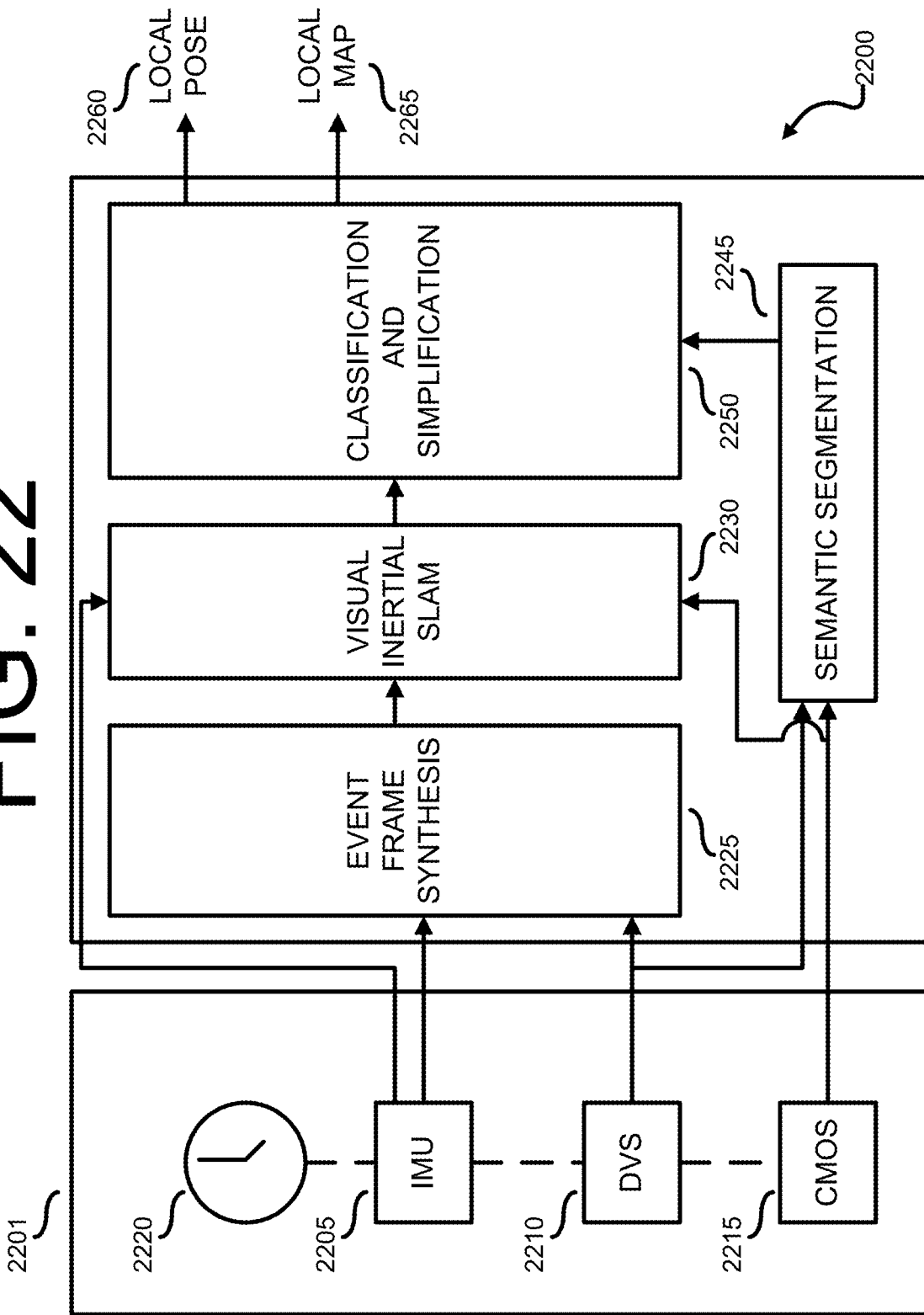
FIG. 22 illustrates an example of an architecture for performing intradevice operations associated with the generation and updating of a global stable semantic map; according to certain embodiments of this disclosure.

FIG. 22 illustrates an example of an architecture 2200 for performing intradevice operations associated with the generation and updating of a global stable semantic map (for example, global stable semantic map 2110 in FIG. 21) according to various embodiments of this disclosure. The embodiment of the architecture 2200 shown in FIG. 22 is for illustration only and other embodiments could be used without departing from the scope of the present disclosure.

Referring to the example of FIG. 22, architecture 2200 comprises a sensor block 2201 (for example, sensor block 1101 in FIG. 11), which includes a suite of time-synchronized and calibrated sensors for generating time-stamped frames based on one or more of DVS sensor data which has been synthesized into event frames (for example, by event frame synthesis pipeline 1200 in FIG. 12), time-stamped CMOS image frames, or frames based on combinations of DVS sensor data and CMOS image frames.

According to certain embodiments, sensor block 2201 comprises an IMU sensor 2205 (for example, IMU 182 in FIG. 1), which detects and measures the direction and magnitude of the angular and transverse motion of sensor block 2201 or architecture 2200 (for example, a mobile platform hosting architecture 2200). As shown in the non-limiting example of FIG. 22, sensor block 2201 further comprises one or more DVS sensors 2210 (for example, DVS sensor 400 in FIG. 4), each of which is configured to output an asynchronous steam of sensor event data in response to changes in detected light from a view of the operating environment of the mobile platform (for example, low-power mobile platform 1000 in FIG. 10) hosting architecture 2200. In various embodiments according to this disclosure, architecture 2200 also includes one or more CMOS image sensors 2215 (for example, certain embodiments of camera 186 in FIG. 1) which are configured to receive light from the operating environment of the mobile platform and output frames of image data based on the color, position and intensity of the light received at the CMOS image sensor 2215. According to various embodiments, the outputs of IMU sensor 2205, DVS sensor 2210 and CMOS image sensor 2215, are all time stamped with time values synchronized to common clock 2220. According to certain embodiments, common clock 2220 is a system clock or tick counter.

Referring to the non-limiting example of FIG. 22, architecture 2200 includes an event frame synthesis pipeline 2225 (for example, event frame synthesis pipeline 1200 in FIG. 12), which receives the output of IMU sensor 2205 and DVS sensor 2210, and accumulates motion compensated DVS sensor data across time windows associated with the appearance of sharp edges in spatial histograms of accumulated DVS sensor data. According to various embodiments, event frame synthesis pipeline 2225 rescales spatial histograms of accumulated DVS sensor to a common representation and/or performs noise filtering on the spatial histograms. As shown in FIG. 22, in some embodiments, event frame synthesis pipeline 2225 outputs the processed spatial histograms to visual inertial SLAM pipeline 2230.

According to certain embodiments, architecture 2200 comprises a visual-inertial SLAM pipeline 2230 (for example, visual-inertial SLAM pipeline 525 in FIG. 5), which, in certain embodiments, is configured to receive feature tracks (for example, hybrid feature tracks 650 in FIG. 6, and output one or more of pose data (for example, camera pose data 530 in FIG. 5) or scene geometry data (for example, scene geometry data 535 in FIG. 5). As shown in the illustrative example of FIG. 22, the scene geometry data output by visual-inertial SLAM pipeline 2230 may be in the form of a point cloud indicating the present determined coordinate values of tracked points in the operating environment of the mobile platform. In certain embodiments, visual-inertial SLAM pipeline 2230 is configured to intermittently (as indicated by the dotted line in the figure) receive image frames from CMOS image sensor 2215. In various embodiments, visual-inertial SLAM pipeline 2230 may further comprise a feature handler (for example, hybrid feature handler 515) for generating tracked features (for example, spatially and temporally aligned DVS feature tracks or hybrid feature tracks 650 in FIG. 6) to provide as pre-processed inputs to visual-inertial SLAM pipeline 2230.

According to some embodiments, architecture 2200 comprises a semantic segmentation pipeline 2245, which is configured to receive a time stamped frame, and identify and associate at least one semantic label (for example, "floor" or "wall #1") with a region of image data of the time stamped frame. According to some embodiments, the time stamped frame received by semantic segmentation pipeline 2245 is a frame of image data output by CMOS image sensor 2215. In certain embodiments, the time stamped frame received by semantic segmentation pipeline 2245 is a synthesized event frame generated by event frame synthesis pipeline 2225 from sensor event data from DVS sensor 2210.

Referring to the example of FIG. 22, structure classification and simplification pipeline 2250 receives, as inputs, the outputs of visual-inertial SLAM pipeline 2230 (for example, a point cloud of tracked features) and semantic segmentation pipeline 2245 and processes the inputs to generate a series of one or more simplified object representations of semantically labeled objects and surfaces of interest (for example, the floor and walls) of the operating environment of the mobile platform over time. According to certain embodiments, the simplified object representations comprise geometrical primitives (for example, boxes, planes or prisms) representing the relevant surfaces (for example, the size and location of the top of a table is, for positioning AR content, a more relevant datum than the curve of its legs). By simplifying the mobile platform's world understanding of its operating environment as a collection of simplified object representations, rather than as a potentially data-intense set of tracked feature points, the digital representation of the mobile platform's world understanding becomes similarly less data-intense.

According to various embodiments, architecture 2200 provides local pose data 2260 to a master platform (for example, master platform 2105 in FIG. 21). Similarly, in some embodiments, architecture 2220 provides, as local map 2265, the output of structure classification and simplification pipeline 2250 directly the master platform without performing any fusion operations at the mobile AR platform. In some embodiments, for example, depending on the allocation of processing resources between devices and applications running on mobile platforms, architecture 2200 comprises a fusion module (not explicitly shown in FIG. 22) to "smooth out" and stabilize the output of classification and simplification pipeline 2250. In some embodiments, for example, embodiments where power consumption is the highest priority, it may be preferable to perform all of the fusion operations associated with generating a global stable semantic map on a processing platform which is not operating under any power constraints (for example, server 200 in FIG. 2).

FIGS. 23A, 23B and 23C provide a visual illustration of aspects of device grouping of mobile platforms at a master platform (for example, master platform 2105 in FIG. 21) according to various embodiments of this disclosure. The examples of device groupings shown in FIGS. 23A-23C are for illustration only and other groupings could be used without departing from the scope of the present disclosure.

Referring to the example of FIG. 23A, the entirety of semantic map 2300 of a room is represented as a set of five geometric primitives representing the wall, floor and objects within the room. In this illustrative example, four mobile AR platforms, designated D1, D2, D3 and D4 (for example, device 100 in FIG. 1) are operating in the room, and each of which has generated a local semantic map (for example, the output of each mobile platform's structure simplification and classification pipeline, or a local stable semantic map produced by fusing outputs of each mobile platform's structure simplification and classification pipeline) covering a portion of the room. The extent of each device's local semantic map is represented by circles 2301, 2303, 2305 and 2307.

As illustrated in FIG. 23A, the local semantic map for mobile AR platform D1 includes geometric elements (for example, edges of a bounding box) also present in the local semantic map for D2. Accordingly, the master platform assigns mobile AR platforms D1 and D2 to a first group 2310. Further, in the explanatory example of FIG. 23A, the local semantic map for mobile AR platform D4 includes geometric elements (for example, an edge of a bounded plane) present in the local semantic map for mobile AR platform D4. Accordingly, the master platform assigns mobile the AR platforms designated D3 and D4 to a second group 2315. In certain embodiments, the local semantic maps in first group 2310 are combined at the master platform, (for example, by map optimization 2120 and fusion module 2125 in FIG. 21).

According to certain embodiments, in addition to grouping the local semantic maps of individual mobile AR platforms, previously generated groups can, themselves be grouped as part of device grouping (for example, device grouping 2115 in FIG. 21).

Referring to the illustrative example of FIG. 23B, the pose of mobile AR platform designated D4 has moved down and to the left from its initial position depicted in FIG. 23A, and a portion of its local semantic map (shown by circle 2305) overlaps with a portion of the local semantic map of the device designated D2 (shown by circle 2303). Accordingly, first group 2310 and second group 2315 are merged to form new, third group of mobile AR platforms 2320.

According to various embodiments, the device grouping performed at a master platform (for example, device grouping 2115 in FIG. 21) can be subtractive, as well as additive.

Referring to the example of FIG. 23C, the pose of mobile AR platform designated D4 has moved up from the position depicted in FIG. 23B, resulting in a loss of overlap between the local semantic map of D4 (shown by circle 2305) and the local semantic map of the mobile AR platform designated D3 (shown by circle 2307). Accordingly, third group 2320 is split in response to this change of pose, and a new, fourth group 2325 is formed.

Figure 24:
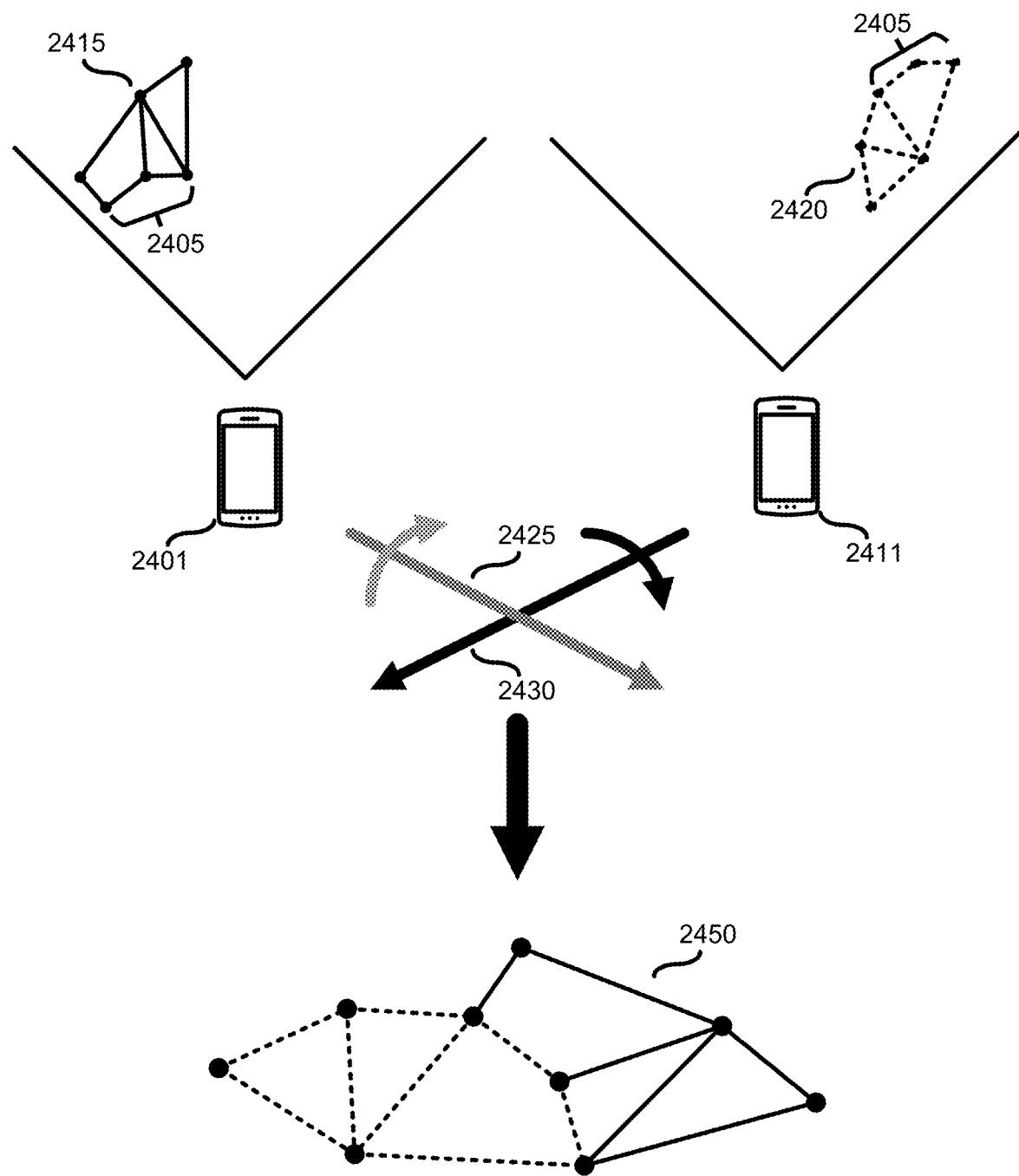
FIG. 24 provides a visual illustration of aspects of map optimization, according to certain embodiments of this disclosure.

FIG. 24 provides a visual illustration of aspects of map optimization (for example, map optimization 2120 in FIG. 21) according to various embodiments of this disclosure. The embodiment of the map optimization shown in FIG. 24 is for illustration only and other embodiments could be used without departing from the scope of the present disclosure.

Referring to the example of FIG. 24, first mobile AR platform 2401 has been grouped (for example by device grouping 2115 in FIG. 21) with second mobile AR platform 2411 based on a determined correspondence between common elements 2405 of a first local semantic map 2415 generated by first mobile AR platform 2401 and a second local semantic map 2420 generated by second mobile AR platform 2411. According to various embodiments, first local semantic map 2415 is expressed in a local coordinate system of first mobile platform 2401. Similarly, as shown in the illustrative example of FIG. 24, second local semantic map 2420 is expressed in a local coordinate system of second mobile platform 2411.

To facilitate combining first local semantic map 2415 with second local semantic map 2420 to form a global semantic map 2450, a map optimization process of a master platform (for example, map optimization 2120 in FIG. 21) performs a first relative transformation 2425 to re-express first local semantic map 2415 according to the global coordinate system of global semantic map 2450. Similarly, according to certain embodiments, the map optimization process of the master platform performs a second relative transformation 2430 to re-express second local semantic map 2420 according to the global coordinate system of global semantic map 2450.

Figure 25:
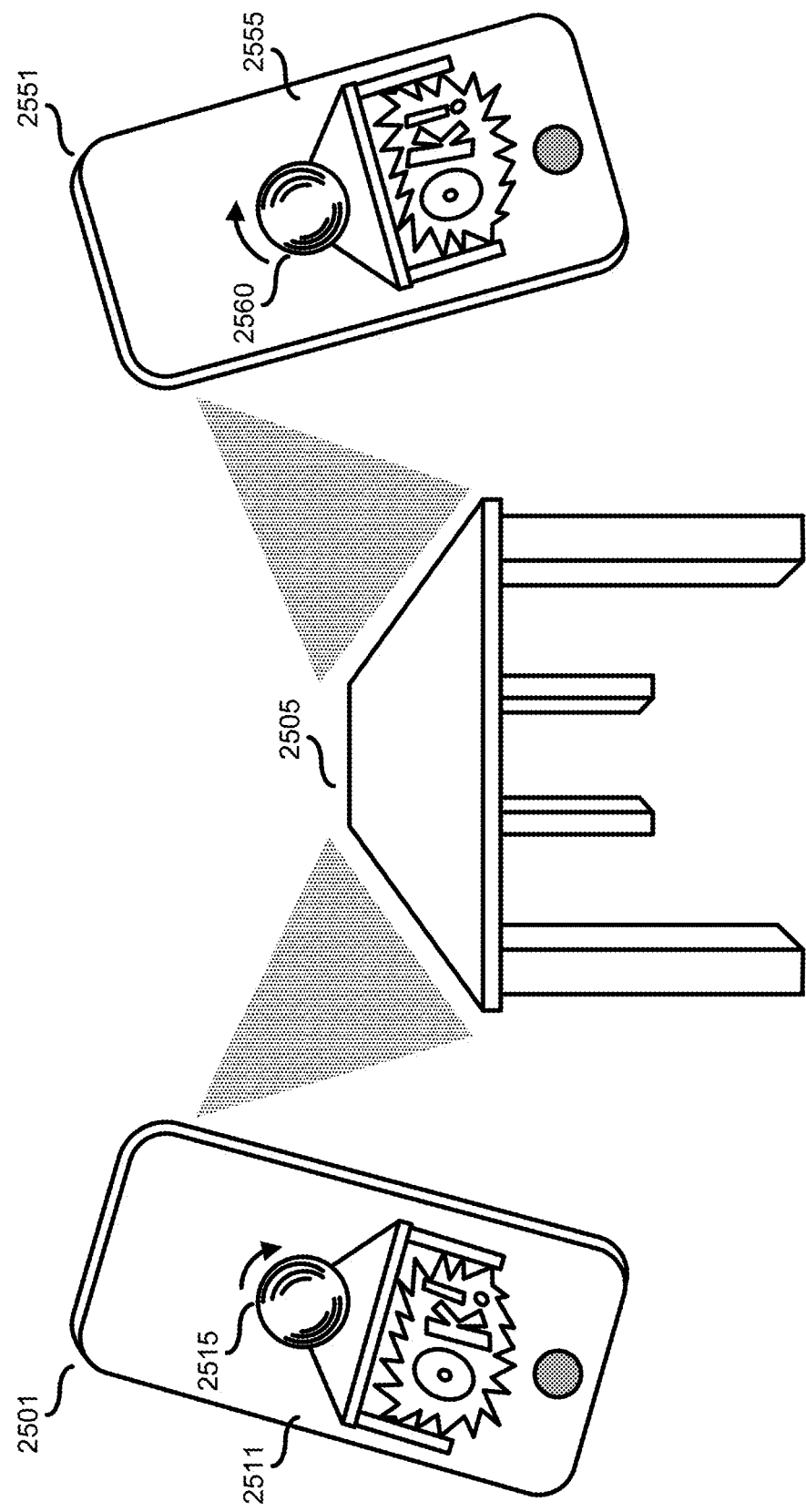
FIG. 25 illustrates an example of an AR application which leverages the consistent world understanding provided by a global semantic map generated according to certain embodiments of this disclosure.

FIG. 25 illustrates an example of an AR application that leverages the consistent world understanding provided by a global semantic map generated according to embodiments of this disclosure. The embodiment shown in FIG. 25 is for illustration only and other embodiments could be used without departing from the scope of the present disclosure.

Referring to the example of FIG. 25, a first mobile AR platform 2501 is posed such that its visual sensors (for example, DVS sensor 400 in FIG. 4 and CMOS sensor 510 in FIG. 5) are directed towards a physical (e.g., not virtual) table 2505. Further, in this illustrative example, first mobile AR platform 2501 is a smartphone running a first instance 2511 of an AR application, which positions a visual asset (in this case, a first instance 2515 of a ball) in an AR display provided on first mobile AR platform 2501. Similarly, second mobile AR platform 2551 is running a second instance 2555 of the AR application running on first mobile AR platform.

In this explanatory example, the AR application running on first mobile AR platform 2501 and second mobile AR platform 2551 is a "soccer-like" game in which the operators of the two devices shown in FIG. 25 move their devices relative to table 2505 to try and cause the "ball" presented in the AR application to fall off a specified edge of table 2505. Put differently, one edge of table 2505 is one player's "goal," and an opposite side of table 2505 is the other player's "goal."

Accordingly, given that the objective of the AR game shown in FIG. 25 is to push an AR "ball" off the edge of table 2505, it is important that the semantic maps utilized by first instance 2511 of the AR application and second instance 2555 of the AR application comprise stable and consistent coordinates for the edges of table 2505. In certain embodiments, first mobile AR platform 2501 and second mobile AR platform 2551 can each generate their own stable semantic maps with coordinate values of a geometric primitive (for example a bounded plane or bounding box) representing the top of table 2505. However, in certain embodiments, the AR experience provided through the AR application may be improved if both first instance 2511 of the AR application and second instance 2555 of the AR application position the "ball" in their AR displays based on the same global semantic map (for example, global semantic map 2110 in FIG. 21). This is because, by positioning AR content based on a single semantic map, the risk of gameplay errors due to inconsistencies in each device's world understanding is avoided. Put differently, the situation where, due to difference in the semantic maps used by the devices, first instance 2511 of the AR application shows "ball" 2515 as having gone over the edge of table 2505, while second instance 2555 shows "ball" 2560 as still in play, does not occur.

FIG. 26 illustrates operations of one example of a method 2600 for performing CMOS-assisted inside-out DVS tracking on a low-power mobile device, according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a mobile device (i.e., a mobile platform).

Referring to the example of FIG. 26, at operation 2605 of method 2600, a processing component (for example, hybrid feature handler 515 in FIG. 5) of a low-power mobile device (for example, device 100 in FIG. 1, or AR platform 305 in FIG. 3) receives the output of a dynamic vision sensor (for example, DVS 400), wherein the DVS is configured output an asynchronous stream (for example, asynchronous event stream 430 in FIG. 4) of sensor event data.

According to various embodiments, at operation 2610, the output of a CMOS image sensor (for example, camera 186 in FIG. 1 or CMOS 1415 in FIG. 14) is received (by, for example, hybrid feature handler 515 in FIG. 5). In some embodiments according to this disclosure the output of the CMOS image sensor comprises a frame (for example, frame 620 in FIG. 6) of image data.

In some embodiments, at operation 2615, the low-power AR platform, or the hybrid feature handler thereof (for example, hybrid feature handler 600 in FIG. 6) determines tracked features based on the output of one or more of the DVS sensor or CMOS image sensor. According to certain embodiments, the tracked features may be DVS feature tracks (for example, DVS feature tracks 635) that have been corrected for temporal alignment and spatial alignment. In some embodiments, the tracked features are CMOS sensor feature tracks (for example, CMOS sensor feature tracks 640 in FIG. 6). In various embodiments according to this disclosure, the tracked features are hybrid feature tracks based on DVS sensor and CMOS sensor data (for example, hybrid feature tracks 650 in FIG. 6).

As shown in the non-limiting example of FIG. 26, at operation 2620, the tracked features are provided to a visual-inertial SLAM pipeline (for example, visual-inertial SLAM pipeline 660 in FIG. 6 or visual-inertial SLAM pipeline 1430 in FIG. 14 for performing inside-out device tracking).

According to certain embodiments, at operation 2625 of method 2600, the low-power mobile platform, or a component thereof (for example, sensor controller and scheduler 700 in FIG. 7) switches the CMOS image sensor off based on one or more CMOS control factors (for example, a current value of P(CMOS) 825 in FIG. 8).

FIG. 27 illustrates operations of methods for performing CMOS-assisted inside-out DVS tracking on a low-power mobile device, according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a mobile device. The operations described with reference to FIG. 27 can, in some embodiments, be performed in addition to operations of another method (for example, method 2600 in FIG. 26 for performing CMOS-assisted DVS tracking). In certain embodiments, the operations described with reference to FIG. 27 can be performed as part of, or instead of operations of other methods for performing CMOS-assisted DVS tracking.

In the example shown in FIG. 27, at operation 2705, a low-power mobile AR platform (for example, device 100 in FIG. 1, or low-power mobile platform 900 in FIG. 9), or a component thereof (for example, hybrid feature handler 515 in FIG. 5) aligns and converts (for example, by passing feature tracks through temporal alignment stage 645 of performing spatial alignment 655 in FIG. 6) the outputs of the DVS sensor(s) and the CMOS image sensor to a common representation (for example, hybrid feature track 650 in FIG. 6). According to various embodiments, the common representation generated at operation 2705 aligns and scales CMOS image data and DVS event frames to a common resolution and aspect ratio.

According to certain embodiments, at operation 2710, an apparatus (for example, low-power mobile platform 1000 in FIG. 10) switches off a CMOS image sensor in response to a current value of a tracking accuracy confidence value (for example c, as described with reference to sensor controller and scheduler 700 in FIG. 7) falling below a threshold value.

FIG. 28 illustrates operations of an example of a method 2800 for performing inside-out device tracking based on visual-inertial SLAM, according to some embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a mobile device.

Referring to the example of FIG. 28, at operation 2805 of method 2800, an untethered mobile AR platform (for example, mobile platform 1300 in FIG. 13A) or a component thereof (for example, event frame synthesis pipeline 1135 in FIG. 11 or event frame synthesis pipeline 1200 in FIG. 12) accumulates DVS sensor events (for example, in motion compensation, accumulation and filtering module 1230 in FIG. 12) over a sliding time window, wherein the sliding time window includes a predetermined interval over which IMU sensor data is also collected.

According to certain embodiments, at operation 2810, the mobile platform applies a motion correction (for example, the motion correction applied by motion compensation, accumulation and filtering module 1230) to the accumulated DVS sensor output. In some embodiments, the motion correction comprises a homographic transformation applied to synchronized packets of DVS sensor events and IMU data (for example, packets generated by synchronized DVS event-IMU packet generator 1220 in FIG. 12).

As shown in the non-limiting example of FIG. 28, at operation 2815, the mobile platform, or a component thereof (for example, motion compensation, accumulation and filtering module 1230 in FIG. 12) generates an event-frame histogram DVS sensor events, which are based on the results of the motion correction of the DVS sensor events over the sliding time window. According to various embodiments, the sliding time window is selected based on a target number of sensor events associated with the appearance of sharp edges in the event-frame histogram. In some embodiments, noise filtering is applied to the event-frame histogram to further sharpen the features in the event frame histogram.

In some embodiments according to this disclosure, at operation 2820, the event frame histogram and IMU data is provided to a visual inertial SLAM pipeline (for example, visual-inertial SLAM pipeline 1215 in FIG. 12). According to various embodiments, the event frame histogram is provided to the visual-inertial SLAM pipeline indirectly, by, for example, providing the event frame histogram to an event frame buffer (for example, event frame buffer 1235 in FIG. 12) to be subsequently pulled from the buffer by the visual-inertial SLAM pipeline.

FIG. 29 illustrates operations of methods for performing inside-out device tracking based on visual-inertial SLAM, according to some embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a mobile device. The operations described with reference to FIG. 29 can, in some embodiments, be performed in addition to operations of another method (for example, method 2800 in FIG. 28 for performing inside-out device tracking based on visual-inertial SLAM). In certain embodiments, the operations described with reference to FIG. 29 can be performed as part of, or instead of operations of other methods for performing inside-out device tracking based on visual-inertial SLAM.

Referring to the example of FIG. 29, at operation 2905, a mobile platform (for example, mobile platform 1350 in FIG. 13A) detects (for example, by recognizing and initiating tracking of) a feature (for example, feature 1380) in a first field of view (for example, the region of overlaps between first DVS 1365 and third DVS 1375 in FIG. 13A) based on at least one of an event frame histogram (for example, an event frame histogram produced by event frame synthesis pipeline 1200 in FIG. 12) of DVS sensor events from a first DVS (for example, first DVS 1365 in FIG. 13A), or an event frame histogram of DVS sensor events from a second DVS (for example, third DVS 1375 in FIG. 13A).

According to certain embodiments, at operation 2910, the mobile platform continues to track the feature in the second field of view without re-detecting the feature.

FIG. 30 illustrates operations of one example of a method 3000 for updating a stable semantic map, according to some embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a mobile device.

Referring to the example of FIG. 30, at operation 3005 of method 3000, a mobile AR platform (for example, first mobile AR platform 2501 in FIG. 25) generates a semantic segmentation (for example, semantic segmentation data 1625 in FIG. 16) of a time stamped frame (for example, time stamped frame 1515 in FIG. 15), wherein the time stamped frame is based on one or more of the output of a CMOS image sensor (for example, time-stamped frame of CMOS image data 1510 in FIG. 15), or a synthesized event frame based on the output of a DVS sensor and an IMU sensor over a time interval (for example, DVS sensor event frame 1505 in FIG. 15). According to various embodiments, the semantic segmentation of the time-stamped frame is generated by passing the time-stamped frame through a convolutional neural network to associate semantic labels with pixels of the frame.

According to various embodiments, at operation 3010, a simplified object representation is generated, based, at least in part on the semantic segmentation. For example, in certain embodiments, the simplified object representation is based on a projection of the semantic segmentation onto a point cloud (for example, as shown in FIG. 16) by a structure classification and simplification pipeline (for example, structure classification and simplification pipeline 1450 in FIG. 14).

As shown in the explanatory example of FIG. 30, at operation 3015, a stable semantic map (for example, stable semantic map 1815 in FIG. 18) is updated based on the simplified object representation. According to some embodiments, updating the stable semantic map is performed by passing the simplified object representation through a fusion module (for example, fusion module 1455 in FIG. 14) to "smooth out" or "quiet down" instantaneous variations and other noise across simplified object representations associated with different time points.

FIG. 31 illustrates operations of one example of a method 3100 for combining local semantic maps as part of a larger process of updating a global semantic map, according to some embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor circuitry in, for example, a server or electronic device.

Referring to the example of FIG. 31, at operation 3105, a master platform (for example, master platform 2105 in FIG. 21 or server 200 in FIG. 2) receives from a first device (for example, mobile AR platform 2150a in FIG. 21), first pose data associated with an image sensor (for example, CMOS image sensor 1010 in FIG. 10), and a first semantic map associated with a common time interval (for example, the instantaneous output of a structure classification and simplification pipeline shown in FIG. 19C) and comprising at least one simplified object representation in a coordinate space of the first device (for example, bounding box 1925d in FIG. 19C).

According to certain embodiments, at operation 3110, the master platform receives second pose data and a second semantic map associated with the common time interval from a second device (for example, second mobile AR platform 2551 in FIG. 25), wherein the second semantic map comprises at least one simplified object representation (for example, a geometric primitive) in a coordinate space of the second device.

As shown in the illustrative example of FIG. 31, at operation 3115, the master platform identifies a shared simplified object representation (or, in some cases, a part thereof, such as a shared edge or corner of a geometric primitive) which is common to the first semantic map and the second semantic map. According to various embodiments, the identification of the shared simplified object representation is performed as part of a device grouping operation (for example, device grouping 2115 in FIG. 21).

Referring to the non-limiting example of FIG. 31, at operation 3120, the first semantic map and second semantic map are combined based on the first pose data and the second pose data. According to certain embodiments, combining the first and second semantic maps is performed as part of a map optimization operation (for example, map optimization 2120 in FIG. 21) to transform each of the first and second semantic maps from their local coordinate systems to a global coordinate system used by a global semantic map.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A computer-implemented method comprising:
receiving, at a master platform from a first device, (i) first pose data associated with an image sensor of the first device and (ii) a first semantic map generated by the first device, the first semantic map comprising at least one simplified object representation in a coordinate space of the first device;
receiving, at the master platform from a second device, a) second pose data associated with an image sensor of the second device and (ii) a second semantic map generated by the second device, the second semantic map comprising at least one simplified object representation in a coordinate space of the second device;
identifying a shared simplified object representation common to the first semantic map and the second semantic map;
performing a transformation of the first semantic map from the coordinate space of the first device to a global coordinate system;
performing a transformation of the second semantic map from the coordinate space of the second device to the global coordinate system;
generating a time-stamped global consistent map, the time-stamped global consistent map comprising a union set of the at least one simplified object representation in the first semantic map and the at least one simplified object representation in the second semantic map; and
combining the first semantic map with the second semantic map based on the first pose data and the second pose data,
wherein one or more elements of the time-stamped global consistent map are assigned coordinates in the global coordinate system,
wherein the first pose data, the first semantic map, the second pose data, and the second semantic map are associated with a common time interval, and
wherein the shared simplified object representation comprises geometric primitives representing surfaces for positioning items of augmented reality (AR) content.

2. The computer-implemented method of claim 1, further comprising:
applying a fusion algorithm to the time-stamped global consistent map to update a global stable semantic map.

3. The computer-implemented method of claim 2, further comprising:
sending the updated global stable semantic map to the first device.

4. The computer-implemented method of claim 1, further comprising:
assigning the first device and the second device to a device group of a plurality of device groups based on the shared simplified object representation; and
applying a fusion algorithm to time-stamped global consistent maps of each device group of the plurality of device groups to update a global stable semantic map.

5. The computer-implemented method of claim 1, wherein the master platform is one or more of: (1) a peer device operating as a master device, (2) a server, or (3) a cloud computing platform.

6. The computer-implemented method of claim 1, wherein the first pose data associated with the image sensor of the first device comprises image data obtained from a dynamic vision sensor (DVS).

7. The computer-implemented method of claim 6, wherein the image data obtained from the dynamic vision sensor comprises a filtered event frame of DVS sensor data obtained over a predetermined interval.

8. An apparatus comprising:
a communication unit configured to:
receive, from a first device, (i) first pose data associated with an image sensor of the first device and (ii) a first semantic map generated by the first device, the first semantic map comprising at least one simplified object representation in a coordinate space of the first device; and
receive, from a second device, (i) second pose data associated with an image sensor of the second device and (ii) a second semantic map generated by the second device, the second semantic map comprising at least one simplified object representation in a coordinate space of the second device; and
a processor configured to:
identify a shared simplified object representation common to the first semantic map and the second semantic map;
perform a transformation of the first semantic map from the coordinate space of the first device to a global coordinate system;
perform a transformation of the second semantic map from the coordinate space of the second device to the global coordinate system;
generate a time-stamped global consistent map, the time-stamped global consistent map comprising a union set of the at least one simplified object representation in the first semantic map and the at least one simplified object representation in the second semantic map; and
combine the first semantic map with the second semantic map based on the first pose data and the second pose data,
wherein the processor is configured to assign one or more elements of the time-stamped global consistent map coordinates in the global coordinate system,
wherein the first pose data, the first semantic map, the second pose data, and the second semantic map are associated with a common time interval, and
wherein the shared simplified object representation comprises geometric primitives representing surfaces for positioning items of augmented reality (AR) content.

9. The apparatus of claim 8, wherein the processor is further configured to:
apply a fusion algorithm to the time-stamped global consistent map to update a global stable semantic map.

10. The apparatus of claim 9, wherein the processor is further configured to:
send, via the communication unit, the updated global stable semantic map to the first device.

11. The apparatus of claim 8, wherein the processor is further configured to:
assign the first device and the second device to a device group of a plurality of device groups based on the shared simplified object representation; and
apply a fusion algorithm to time-stamped global consistent maps of each device group of the plurality of device groups to update a global stable semantic map.

12. The apparatus of claim 8, wherein the apparatus is one or more of: (1) a peer device operating as a master device, (2) a server, or (3) a cloud computing platform.

13. The apparatus of claim 8, wherein the first pose data associated with the image sensor of the first device comprises image data obtained from a dynamic vision sensor (DVS).

14. The apparatus of claim 13, wherein the image data obtained from the dynamic vision sensor comprises a filtered event frame of DVS sensor data obtained over a predetermined interval.

15. A non-transitory computer-readable medium comprising program code that, when executed by a processor of an apparatus, causes the apparatus to:
receive, from a first device, (i) first pose data associated with an image sensor of the first device and (ii) a first semantic map generated by the first device, the first semantic map comprising at least one simplified object representation in a coordinate space of the first device;
receive, from a second device, (i) second pose data associated with an image sensor of the second device and (ii) a second semantic map generated by the second device, the second semantic map comprising at least one simplified object representation in a coordinate space of the second device;
identify a shared simplified object representation common to the first semantic map and the second semantic map;
perform a transformation of the first semantic map from the coordinate space of the first device to a global coordinate system;
perform a transformation of the second semantic map from the coordinate space of the second device to the global coordinate system;
generate a time-stamped global consistent map, the time-stamped global consistent map comprising a union set of the at least one simplified object representation in the first semantic map and the at least one simplified object representation in the second semantic map; and
combine the first semantic map with the second semantic map based on the first pose data and the second pose data,
wherein one or more elements of the time-stamped global consistent map are assigned coordinates in the global coordinate system,
wherein the first pose data, the first semantic map, the second pose data, and the second semantic map are associated with a common time interval, and
wherein the shared simplified object representation comprises geometric primitives representing surfaces for positioning items of augmented reality (AR) content.

16. The non-transitory computer-readable medium of claim 15, wherein the program code, when executed by the processor, is further configured to cause the apparatus to:
apply a fusion algorithm to the time-stamped global consistent map to update a global stable semantic map.

17. The non-transitory computer-readable medium of claim 16, wherein the program code, when executed by the processor, is further configured to cause the apparatus to:
send the updated global stable semantic map to the first device.

18. The non-transitory computer-readable medium of claim 15, wherein the program code, when executed by the processor, is further configured to cause the apparatus to:
assign the first device and the second device to a device group of a plurality of device groups based on the shared simplified object representation; and
apply a fusion algorithm to time-stamped global consistent maps of each device group of the plurality of device groups to update a global stable semantic map.

19. The non-transitory computer-readable medium of claim 15, wherein the first pose data associated with the image sensor of the first device comprises image data obtained from a dynamic vision sensor (DVS).

20. The non-transitory computer-readable medium of claim 19, wherein the image data obtained from the dynamic vision sensor comprises a filtered event frame of DVS sensor data obtained over a predetermined interval.

* * * * *